(12) United States Patent

Schimmels et al.

(10) Patent No.: US 12,560,118 B2

(45) Date of Patent: Feb. 24, 2026

(54) GAS TURBINE ENGINE HAVING A HEAT EXCHANGER LOCATED IN AN ANNULAR DUCT

(71) Applicant: General Electric Company, Schenectady, NY (US)

(72) Inventors: Scott Alan Schimmels, Miamisburg, OH (US); Jeffrey Douglas Rambo, Mason, OH (US); Timothy Richard DePuy, Liberty Township, OH (US); Steven B. Morris, Mason, OH (US)

(73) Assignee: General Electric Company, Evendale, OH (US)

( * ) Notice: Subject to any disclaimer, the term of this patent is extended or adjusted under 35 U.S.C. 154(b) by 33 days.

(21) Appl. No.: 18/434,128

(22) Filed: Feb. 6, 2024

(65) Prior Publication Data

US 2025/0035038 A1 Jan. 30, 2025

Related U.S. Application Data

(63) Continuation-in-part of application No. 18/430,907, filed on Feb. 2, 2024, which is a continuation-in-part (Continued)

(51) Int. Cl.
*F02C 7/12* (2006.01)
*F02C 3/06* (2006.01)
*F02C 7/24* (2006.01)

(52) U.S. Cl.
CPC .................. *F02C 7/12* (2013.01); *F02C 3/06* (2013.01); *F02C 7/24* (2013.01)

(58) Field of Classification Search
CPC .. F01N 3/0205; F02C 3/04; F02C 3/12; F02C 3/24; F02C 3/045; F05D 2240/14; F05D 2260/213; F05D 2220/323; F05D 2220/32
See application file for complete search history.

(56) References Cited

U.S. PATENT DOCUMENTS 3,981,466 A 9/1976 Shah
5,386,689 A 2/1995 Bozich et al.
(Continued)

FOREIGN PATENT DOCUMENTS

CN 108603442 B * 9/2020 ............. F02C 7/045
EP 2615275 B1 * 3/2015 ............. F01D 25/12
(Continued)

OTHER PUBLICATIONS

Allam, Effect of Ambient Gradients on Sound Transmission in Narrow Permeable Rectangular Pipes with Application to Heat Exchangers, Advances in Powertrains and Automotives, vol. 1, No. 1, pp. 24-33, 2015.

(Continued)

*Primary Examiner* — Craig Kim

(74) *Attorney, Agent, or Firm* — Dority & Manning, P.A.

(57) ABSTRACT

A heat exchanger positioned within an annular duct of a gas turbine engine is provided. The heat exchanger extends substantially continuously along the circumferential direction and defining a heat exchanger height equal to at least 10% of a duct height. An effective transmission loss (ETL) for the heat exchanger positioned within the annular duct is between 5 decibels and 1 decibels for an operating condition of the gas turbine engine. The heat exchanger includes a heat transfer section defining an acoustic length ($L_i$), and wherein an Operational Acoustic Reduction Ratio (OARR) is greater than or equal to 0.75 to achieve the ETL at the operating condition.

20 Claims, 25 Drawing Sheets

Related U.S. Application Data of application No. 18/160,375, filed on Jan. 27, 2023, now Pat. No. 11,927,134.

(56)                    References Cited

U.S. PATENT DOCUMENTS

| | | | |
|---|---|---|---|
| 7,607,308 | B2 | 10/2009 | Kraft et al. |
| 8,702,378 | B2 | 4/2014 | Foster |
| 8,844,264 | B2 | 9/2014 | Khalid |
| 9,410,482 | B2* | 8/2016 | Krautheim ................ F02K 3/06 |
| 9,677,501 | B2 | 6/2017 | Pierluissi et al. |
| 9,845,768 | B2 | 12/2017 | Pesyna et al. |
| 10,036,329 | B2 | 7/2018 | Suciu |
| 10,227,950 | B1 | 3/2019 | Dyson, Jr. |
| 10,364,750 | B2 | 7/2019 | Rambo |
| 10,507,934 | B1 | 12/2019 | Dyson, Jr. |
| 10,544,737 | B2 | 1/2020 | Bowden et al. |
| 10,677,166 | B2* | 6/2020 | Pesyna ...................... F02K 3/06 |
| 10,774,745 | B2 | 9/2020 | Regnard et al. |
| 11,378,009 | B2* | 7/2022 | Roberge .................. F02K 3/115 |
| 11,492,918 | B1* | 11/2022 | Ostdiek .................... F01D 7/00 |
| 11,614,037 | B2* | 3/2023 | Rambo ..................... F02C 6/14 |
| | | | 60/782 |
| 2010/0155016 | A1* | 6/2010 | Wood ..................... F01D 25/12 |
| | | | 165/181 |
| 2012/0216506 | A1* | 8/2012 | Eleftheriou .......... F28D 21/001 |
| | | | 29/401.1 |
| 2014/0208768 | A1 | 7/2014 | Bacic |
| 2016/0017810 | A1* | 1/2016 | Lord ......................... E04B 1/84 |
| | | | 60/725 |
| 2016/0146025 | A1 | 5/2016 | Miller et al. |
| 2016/0312702 | A1* | 10/2016 | Thomas .................. F28F 27/02 |
| 2017/0284303 | A1 | 10/2017 | Johnson et al. |
| 2017/0328279 | A1 | 11/2017 | Sennoun et al. |
| 2018/0094583 | A1 | 4/2018 | Carretero Benignos et al. |
| 2018/0230911 | A1* | 8/2018 | Pastouchenko ......... F01D 25/24 |
| 2018/0231027 | A1 | 8/2018 | Pastouchenko et al. |
| 2019/0003390 | A1 | 1/2019 | Ramos et al. |
| 2019/0040795 | A1* | 2/2019 | Regnard ................... F02C 7/14 |
| 2019/0128189 | A1* | 5/2019 | Rambo ................... F02K 3/115 |
| 2020/0122843 | A1 | 4/2020 | Porte et al. |
| 2020/0123921 | A1 | 4/2020 | Kray et al. |
| 2023/0043809 | A1 | 2/2023 | Schimmels et al. |
| 2024/0341548 | A1* | 10/2024 | Scholl ................... A47L 9/0081 |

FOREIGN PATENT DOCUMENTS

| | | | |
|---|---|---|---|
| EP | 3130539 | A1 | 2/2017 |
| EP | 3735518 | A1 | 11/2020 |

OTHER PUBLICATIONS

Munjal, Acoustics of Ducts and Mufflers with Application to Exhaust and Ventilation System Design, ISBN 0471847380, Wiley, 1987, pp. 58-60. Obtained from Wikipedia Transmission Loss (Duct Acoustics) acknowledged in References.
Wikipedia, Thermal Conductivity, 2019, 20 pages.

* cited by examiner

LOW FLOW (W<50)

| L | FLOW RATE | POROSITY | UA | TL |
|---|---|---|---|---|
| 3.00 | 30 | 0.23 | 14637 | 3.00 |
| 3.00 | 30 | 0.24 | 14583 | 2.76 |
| 3.00 | 30 | 0.25 | 14530 | 2.54 |
| 3.00 | 30 | 0.32 | 11862 | 1.59 |
| 3.00 | 30 | 0.33 | 11813 | 1.49 |
| 3.00 | 30 | 0.34 | 11756 | 1.40 |
| 6.00 | 30 | 0.23 | 24476 | 4.99 |
| 6.00 | 30 | 0.24 | 24400 | 4.65 |
| 6.00 | 30 | 0.32 | 20226 | 2.92 |
| 6.00 | 30 | 0.33 | 20154 | 2.75 |
| 6.00 | 30 | 0.42 | 20699 | 1.73 |
| 6.00 | 30 | 0.43 | 20552 | 1.59 |
| 6.00 | 30 | 0.49 | 13611 | 1.11 |
| 6.00 | 30 | 0.50 | 13526 | 1.06 |
| 6.00 | 30 | 0.51 | 13419 | 1.02 |
| 9.00 | 30 | 0.23 | 32677 | 3.70 |
| 9.00 | 30 | 0.24 | 32586 | 3.41 |
| 9.00 | 30 | 0.32 | 27292 | 2.04 |
| 9.00 | 30 | 0.33 | 27204 | 1.91 |
| 9.00 | 30 | 0.42 | 27543 | 1.16 |
| 9.00 | 30 | 0.43 | 27367 | 1.06 |

| L | FLOW RATE | POROSITY | UA | TL |
|---|---|---|---|---|
| 3.00 | 100 | 0.23 | 18524 | 3.00 |
| 3.00 | 100 | 0.24 | 18477 | 2.76 |
| 3.00 | 100 | 0.25 | 18428 | 2.54 |
| 3.00 | 100 | 0.32 | 15773 | 1.59 |
| 3.00 | 100 | 0.33 | 15721 | 1.49 |
| 3.00 | 100 | 0.34 | 15659 | 1.40 |
| 6.00 | 100 | 0.23 | 29917 | 4.99 |
| 6.00 | 100 | 0.24 | 29854 | 4.65 |
| 6.00 | 100 | 0.32 | 25802 | 2.92 |
| 6.00 | 100 | 0.33 | 25732 | 2.75 |
| 6.00 | 100 | 0.42 | 24910 | 1.73 |
| 6.00 | 100 | 0.43 | 24776 | 1.59 |
| 6.00 | 100 | 0.49 | 18694 | 1.11 |
| 6.00 | 100 | 0.50 | 18586 | 1.06 |
| 6.00 | 100 | 0.51 | 18446 | 1.02 |
| 9.00 | 100 | 0.23 | 39184 | 3.70 |
| 9.00 | 100 | 0.24 | 39112 | 3.41 |
| 9.00 | 100 | 0.32 | 34066 | 2.04 |
| 9.00 | 100 | 0.33 | 33983 | 1.91 |
| 9.00 | 100 | 0.42 | 32559 | 1.16 |
| 9.00 | 100 | 0.43 | 32404 | 1.06 |

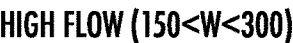
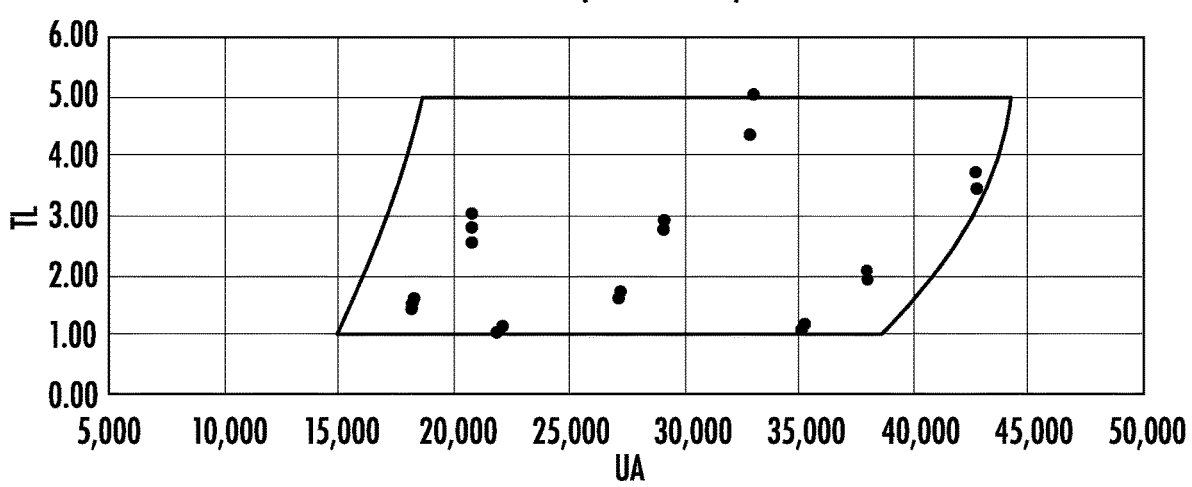
FIG. 18
| L | FLOW RATE | POROSITY | UA | TL |
|---|---|---|---|---|
| 3.00 | 250 | 0.23 | 20884 | 3.00 |
| 3.00 | 250 | 0.24 | 20844 | 2.76 |
| 3.00 | 250 | 0.25 | 20799 | 2.54 |
| 3.00 | 250 | 0.32 | 18288 | 1.59 |
| 3.00 | 250 | 0.33 | 18237 | 1.49 |
| 3.00 | 250 | 0.34 | 18174 | 1.40 |
| 6.00 | 250 | 0.23 | 33073 | 4.99 |
| 6.00 | 250 | 0.25 | 32963 | 4.34 |
| 6.00 | 250 | 0.32 | 29237 | 2.92 |
| 6.00 | 250 | 0.33 | 29170 | 2.75 |
| 6.00 | 250 | 0.42 | 27341 | 1.73 |
| 6.00 | 250 | 0.43 | 27218 | 1.59 |
| 6.00 | 250 | 0.49 | 22160 | 1.11 |
| 6.00 | 250 | 0.50 | 22042 | 1.06 |
| 6.00 | 250 | 0.51 | 21888 | 1.02 |
| 9.00 | 250 | 0.23 | 42808 | 3.70 |
| 9.00 | 250 | 0.24 | 42749 | 3.41 |
| 9.00 | 250 | 0.32 | 38076 | 2.04 |
| 9.00 | 250 | 0.33 | 38000 | 1.91 |
| 9.00 | 250 | 0.42 | 35361 | 1.16 |
| 9.00 | 250 | 0.43 | 35223 | 1.06 |
FIG. 19

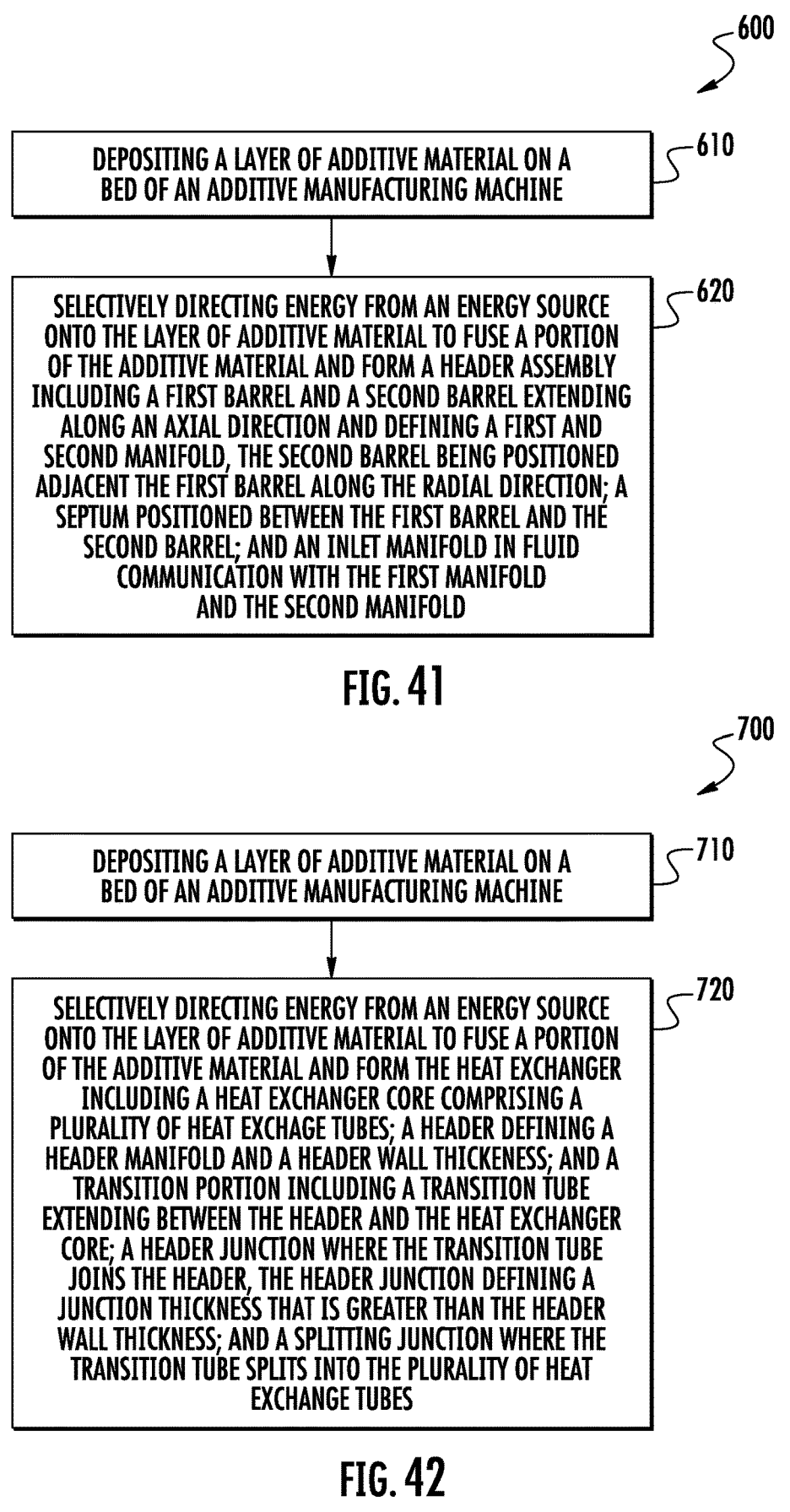

600

610

DEPOSITING A LAYER OF ADDITIVE MATERIAL ON A
BED OF AN ADDITIVE MANUFACTURING MACHINE

620

SELECTIVELY DIRECTING ENERGY FROM AN ENERGY SOURCE
ONTO THE LAYER OF ADDITIVE MATERIAL TO FUSE A PORTION
OF THE ADDITIVE MATERIAL AND FORM A HEADER ASSEMBLY
INCLUDING A FIRST BARREL AND A SECOND BARREL EXTENDING
ALONG AN AXIAL DIRECTION AND DEFINING A FIRST AND
SECOND MANIFOLD, THE SECOND BARREL BEING POSITIONED
ADJACENT THE FIRST BARREL ALONG THE RADIAL DIRECTION; A
SEPTUM POSITIONED BETWEEN THE FIRST BARREL AND THE
SECOND BARREL; AND AN INLET MANIFOLD IN FLUID
COMMUNICATION WITH THE FIRST MANIFOLD
AND THE SECOND MANIFOLD

DEPOSITING A LAYER OF ADDITIVE MATERIAL ON A
BED OF AN ADDITIVE MANUFACTURING MACHINE

720

SELECTIVELY DIRECTING ENERGY FROM AN ENERGY SOURCE
ONTO THE LAYER OF ADDITIVE MATERIAL TO FUSE A PORTION
OF THE ADDITIVE MATERIAL AND FORM THE HEAT EXCHANGER
INCLUDING A HEAT EXCHANGER CORE COMPRISING A
PLURALITY OF HEAT EXCHAGE TUBES; A HEADER DEFINING A
HEADER MANIFOLD AND A HEADER WALL THICKNESS; AND A
TRANSITION PORTION INCLUDING A TRANSITION TUBE
EXTENDING BETWEEN THE HEADER AND THE HEAT EXCHANGER
CORE; A HEADER JUNCTION WHERE THE TRANSITION TUBE
JOINS THE HEADER, THE HEADER JUNCTION DEFINING A
JUNCTION THICKNESS THAT IS GREATER THAN THE HEADER
WALL THICKNESS; AND A SPLITTING JUNCTION WHERE THE
TRANSITION TUBE SPLITS INTO THE PLURALITY OF HEAT
EXCHANGE TUBES

FIG. 42

GAS TURBINE ENGINE HAVING A HEAT EXCHANGER LOCATED IN AN ANNULAR DUCT

CROSS-REFERENCE TO RELATED APPLICATIONS

This application is a continuation-in-part application of U.S. patent application Ser. No. 18/430,907 filed Feb. 2, 2024, which is a continuation-in-part application of U.S. patent application Ser. No. 18/160,375 filed Jan. 27, 2023, and each of which are hereby incorporated by reference in their entirety.

FIELD

The present subject matter relates generally to a heat exchanger for a gas turbine engine.

BACKGROUND

A gas turbine engine typically includes a fan and a turbomachine. The turbomachine generally includes an inlet, one or more compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as for producing useful work to propel an aircraft in flight or to power a load, such as an electrical generator.

During operation of the gas turbine engine various systems may generate a relatively large amount of heat. For example, a substantial amount of heat may be generated during operation of the thrust generating systems, lubrication systems, electric motors and/or generators, hydraulic systems or other systems. Accordingly, a means for dissipating the heat generated by the various systems would be advantageous in the art.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 18 is a plot of heat exchangers in accordance with one or more exemplary embodiments of the present disclosure, showing the relationships between the ETL and UA for a high mass flow rate.

FIG. 19 provides a table including numerical values corresponding to several of the plotted ETL values in FIG. 15.

3

Figure 27:
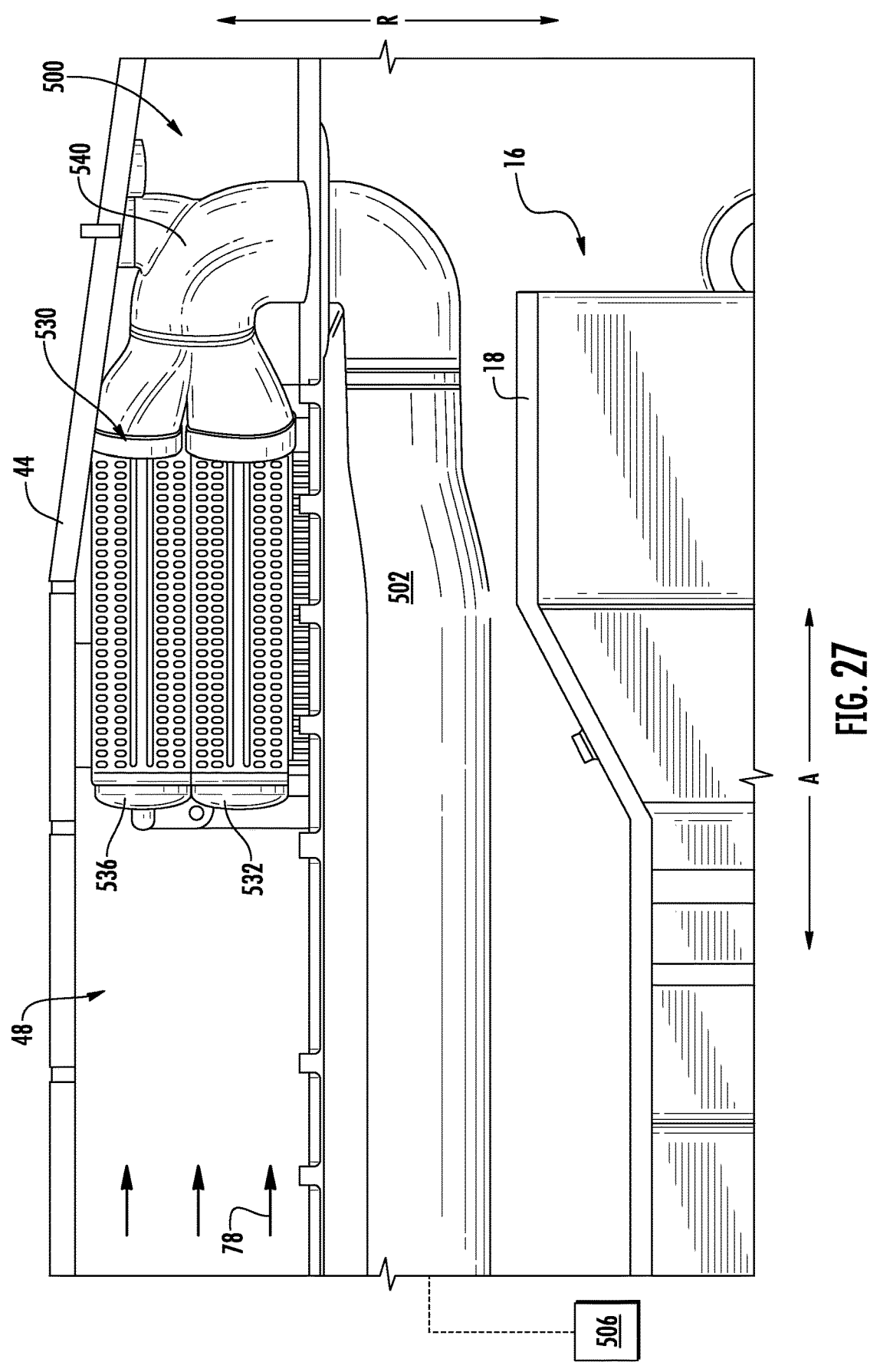
FIG. 27 is a schematic side view of an exemplary heat exchanger assembly that may be used in the exemplary gas turbine engine of FIG. 26 in accordance with an exemplary embodiment of the present disclosure, with a heat exchanger core removed for clarity.
Figures 28, 29:
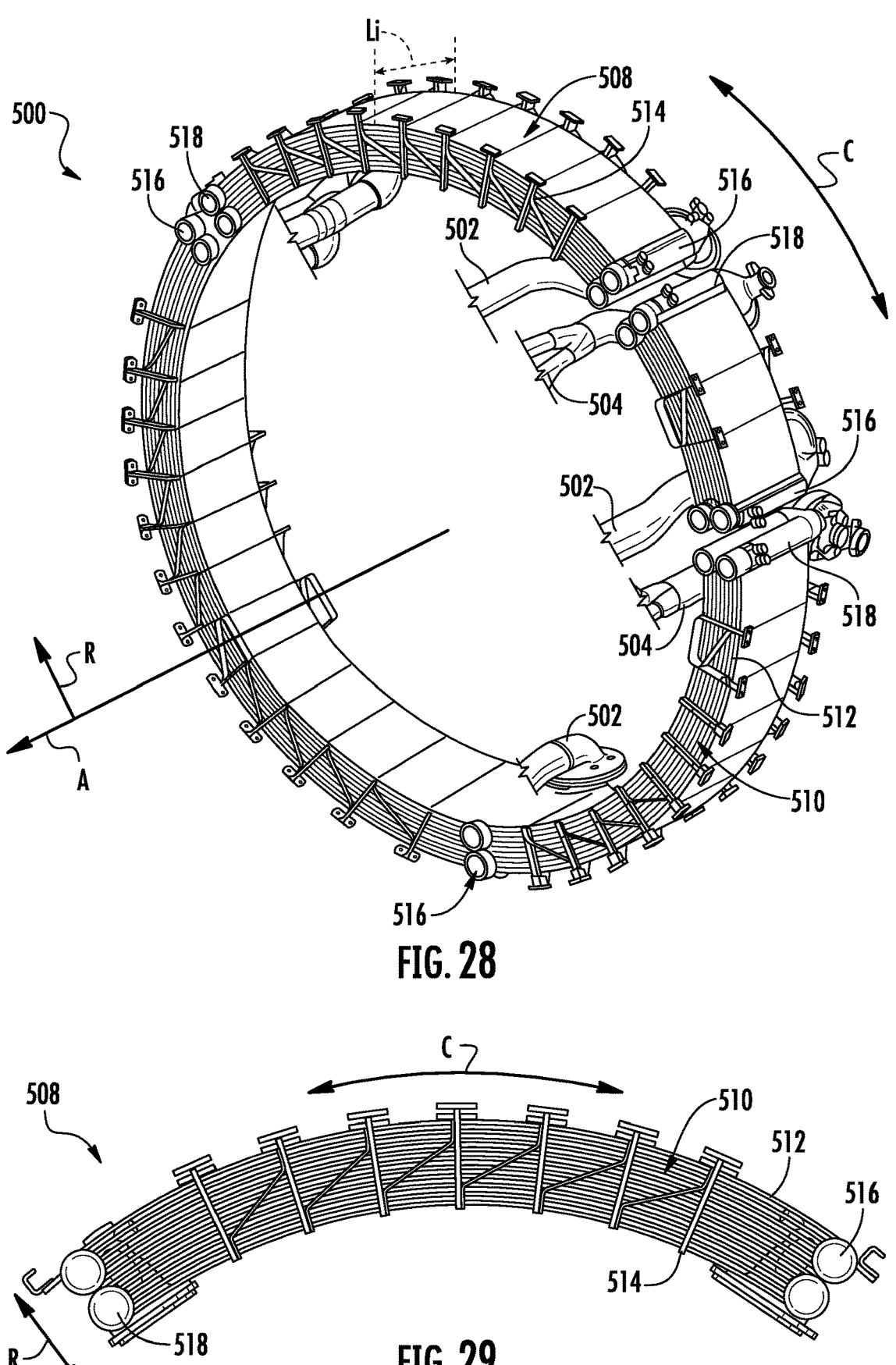

FIG. 28 is a perspective view the exemplary heat exchanger assembly of FIG. 27 according to an exemplary embodiment of the present subject matter.

FIG. 29 is a front view of a heat exchanger segment of the exemplary heat exchanger assembly of FIG. 27 according to an exemplary embodiment of the present subject matter.

Figure 30:
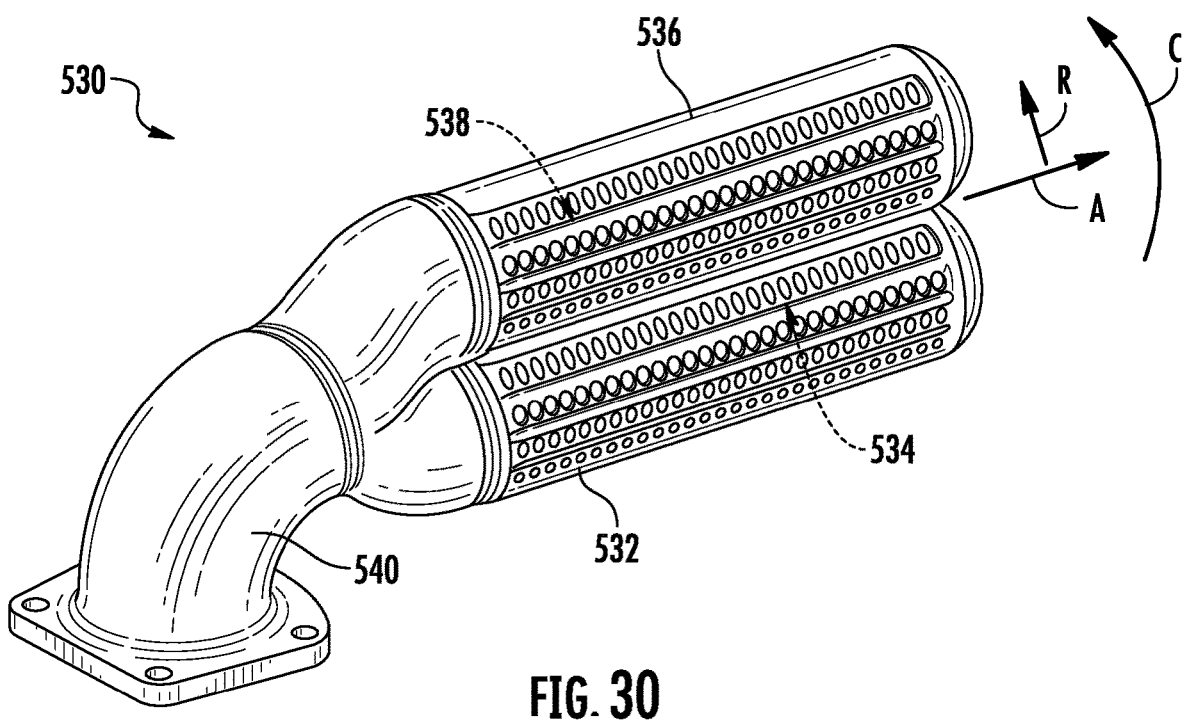

FIG. 30 is a perspective view of a header assembly of the exemplary heat exchanger assembly of FIG. 27 according to an exemplary embodiment of the present subject matter, with the heat exchanger core removed for clarity.

Figure 31:
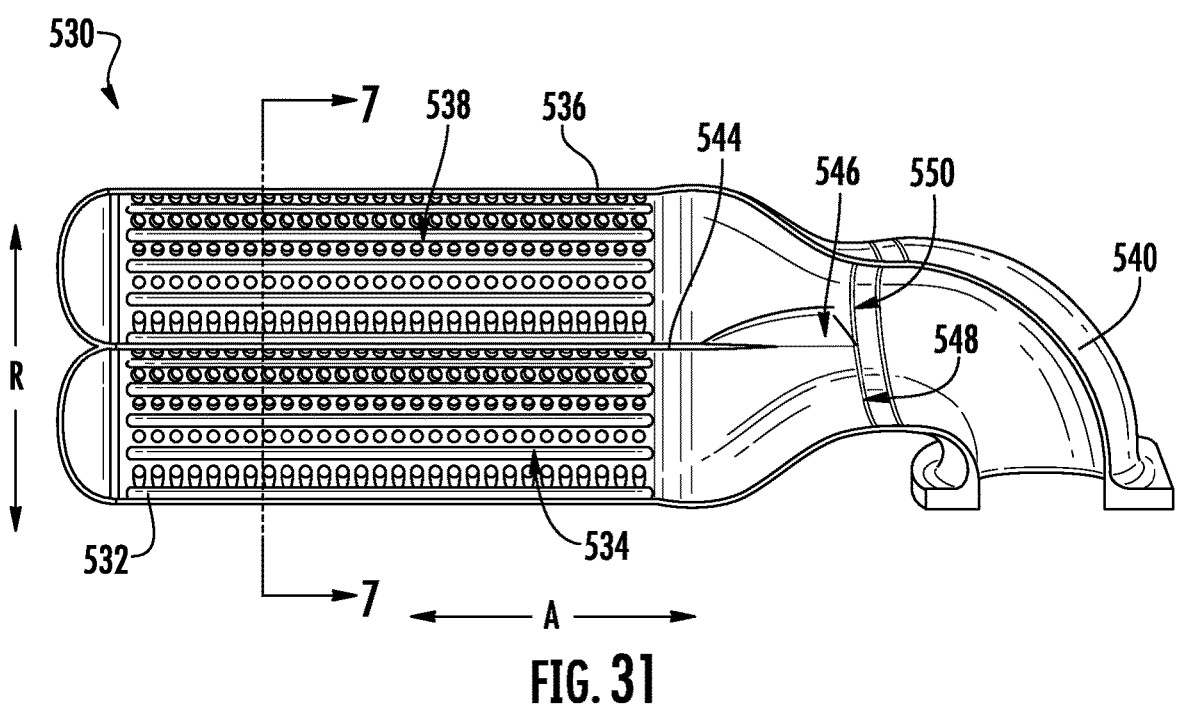

FIG. 31 is a side, cross sectional view of the exemplary header assembly of FIG. 30.

Figures 32, 33:
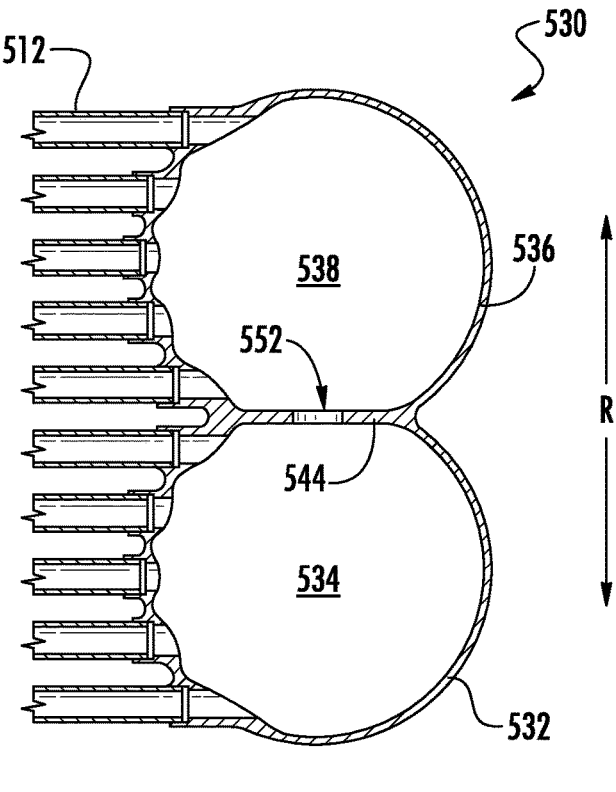

FIG. 32 is a cross-sectional view of the exemplary header assembly of FIG. 30, taken along Line 7-7 of FIG. 31.

Figure 26:
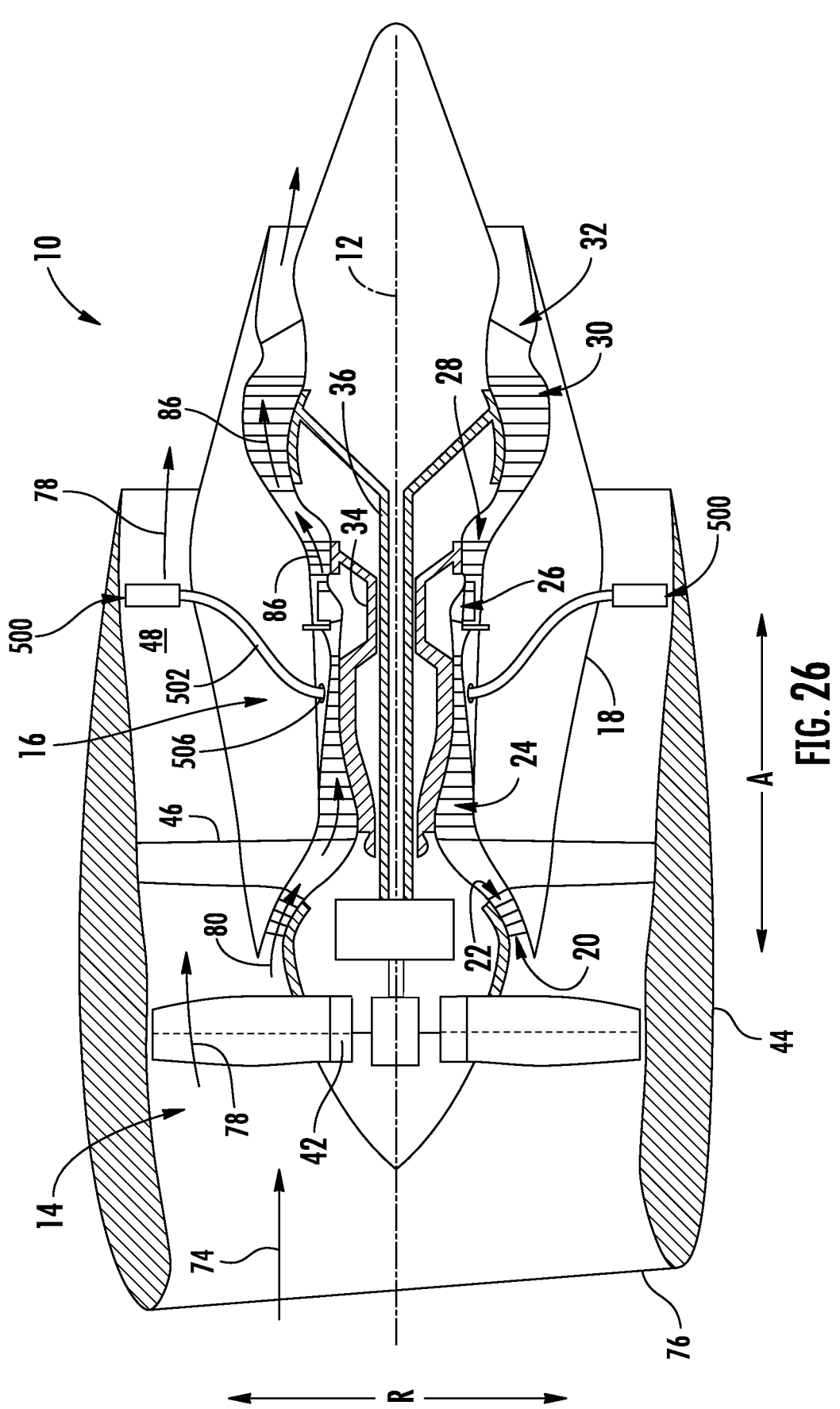
FIG. 26 is a schematic cross-sectional view of an exemplary gas turbine engine according to various embodiments of the present subject matter.

FIG. 33 is a front view of an exemplary heat exchanger assembly that may be used in the exemplary gas turbine engine of FIG. 26 in accordance with another exemplary embodiment of the present disclosure.

Figure 34:
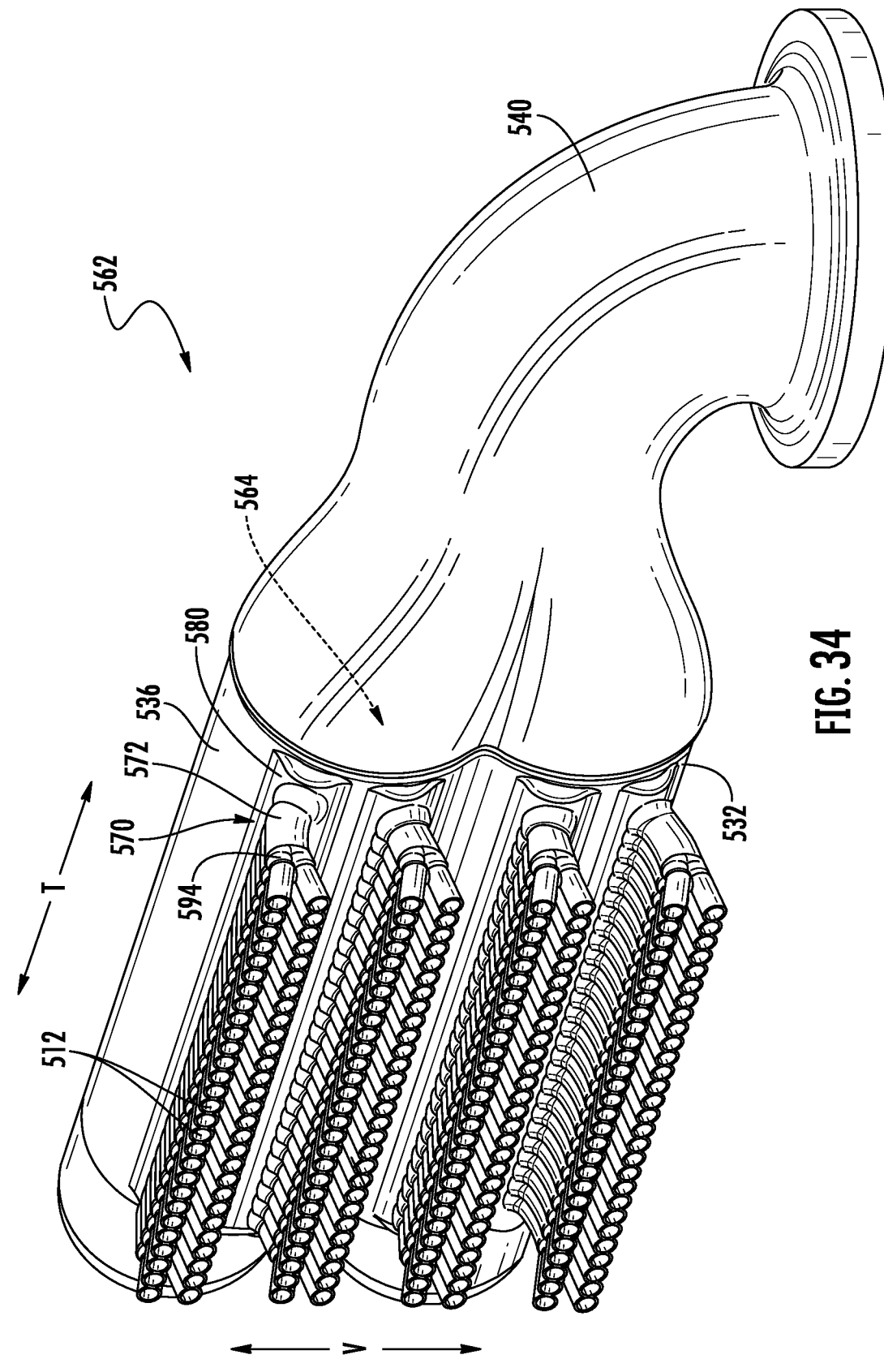

FIG. 34 is perspective view of a header assembly of the exemplary heat exchanger assembly of FIG. 33 according to an exemplary embodiment of the present subject matter, with a portion of the heat exchanger core removed for clarity.

Figure 35:
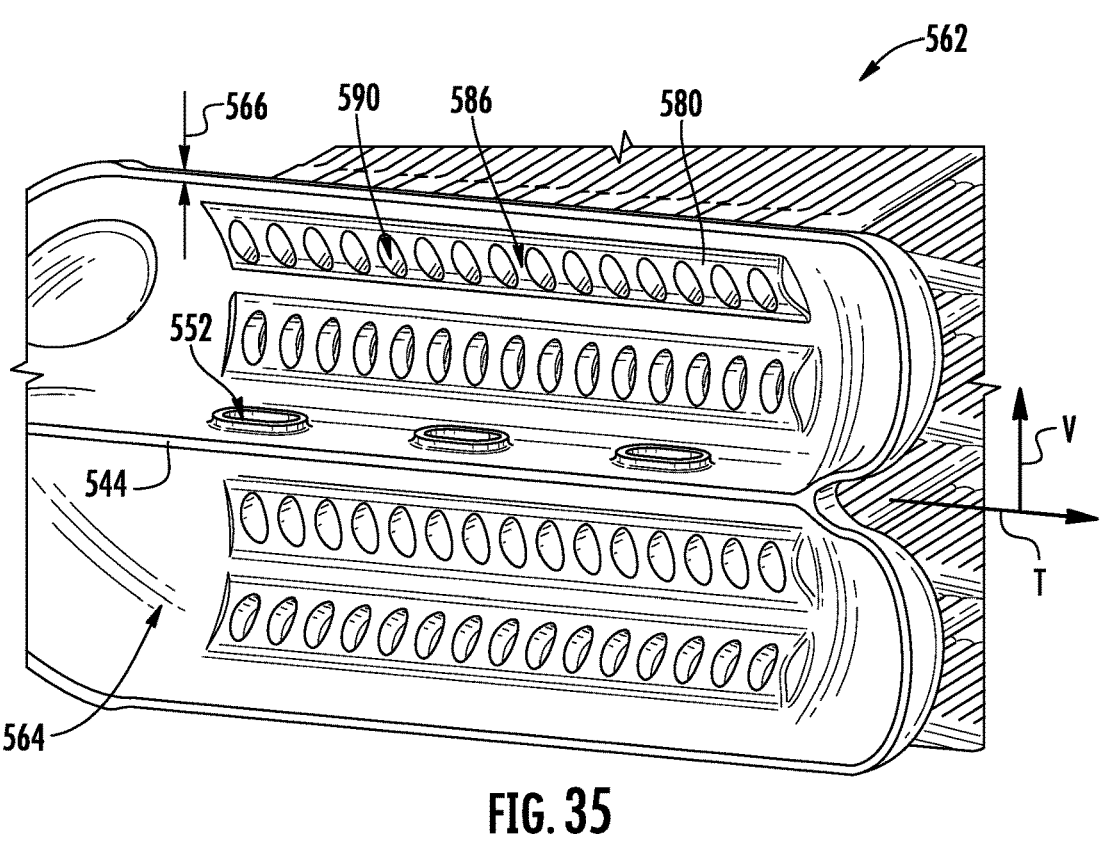

FIG. 35 is a perspective, cross sectional view of the exemplary header assembly of FIG. 34.

Figure 36:
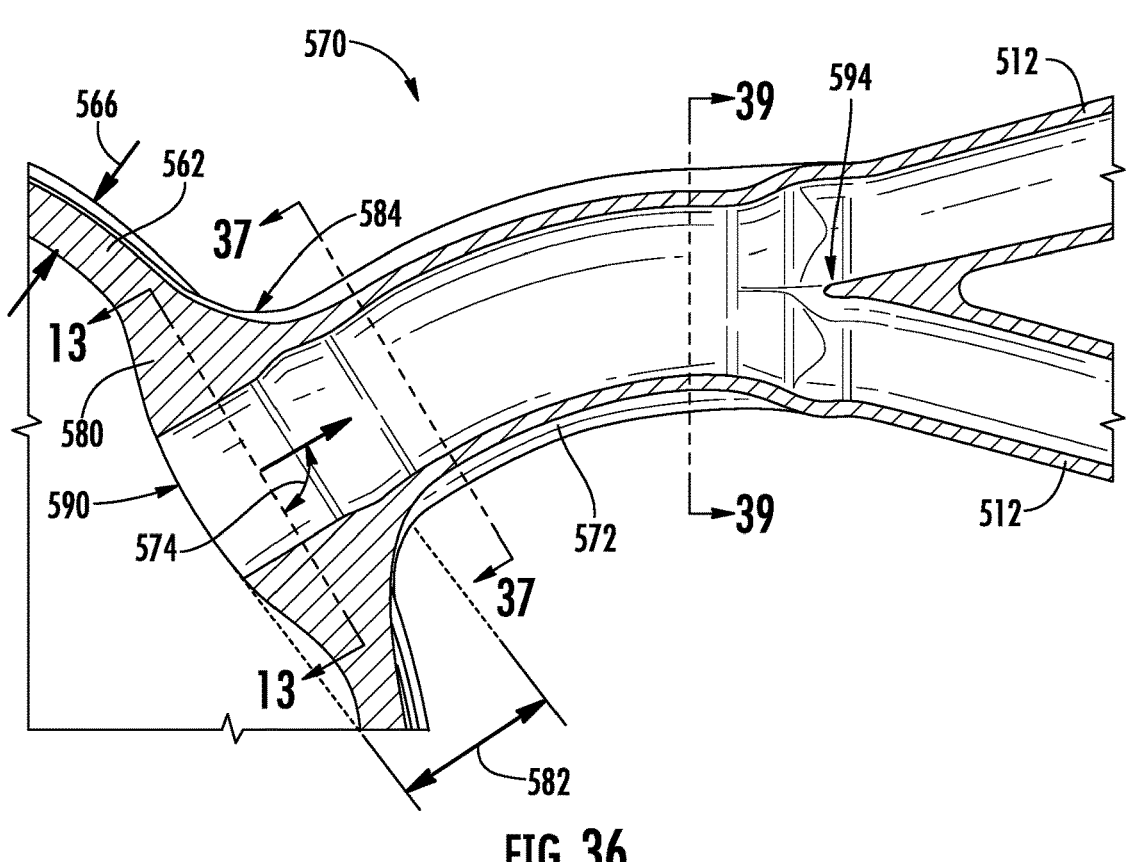

FIG. 36 is a cross sectional view of a transition portion of the exemplary heat exchanger assembly of FIG. 33 according to an exemplary embodiment of the present subject matter.

Figure 37:
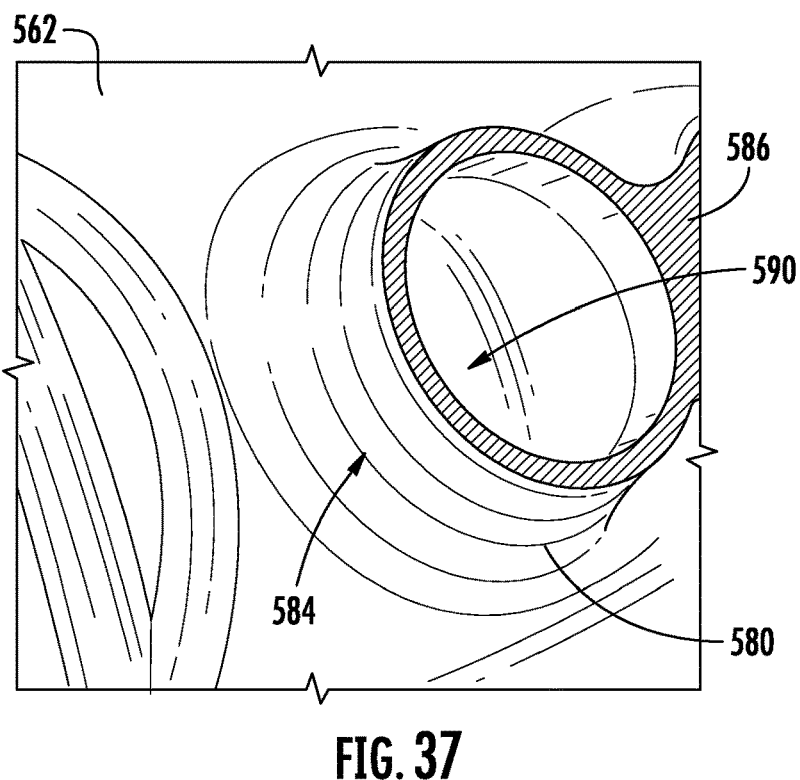

FIG. 37 is a cross sectional view of the exemplary transition portion of FIG. 36, taken along Line 12-12 of FIG. 36.

Figure 38:
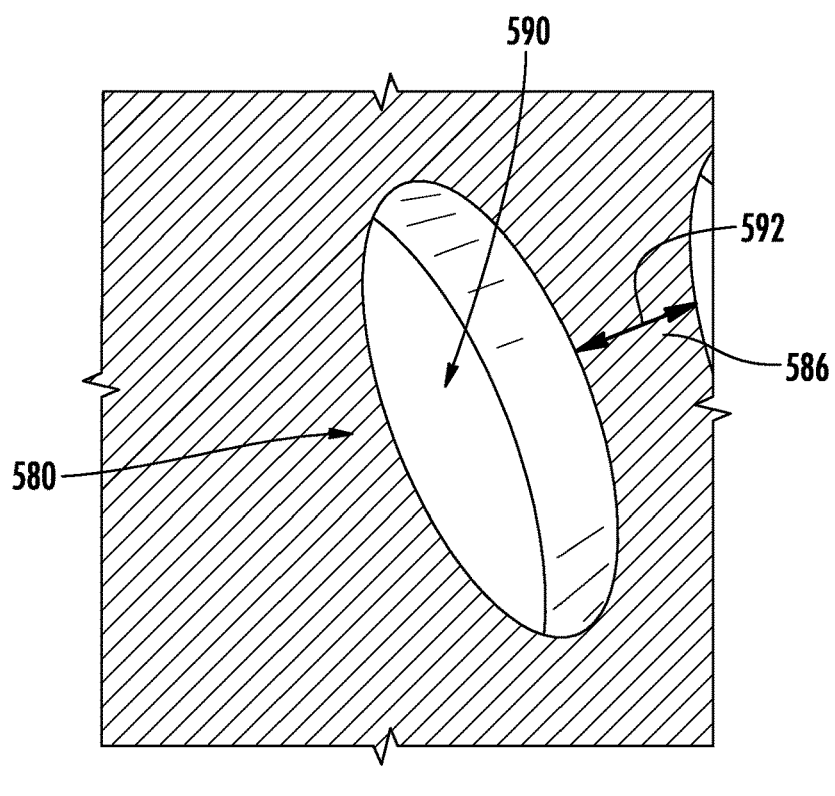

FIG. 38 is a cross sectional view of the exemplary transition portion of FIG. 36, taken along Line 13-13 of FIG. 36.

Figures 39, 40:
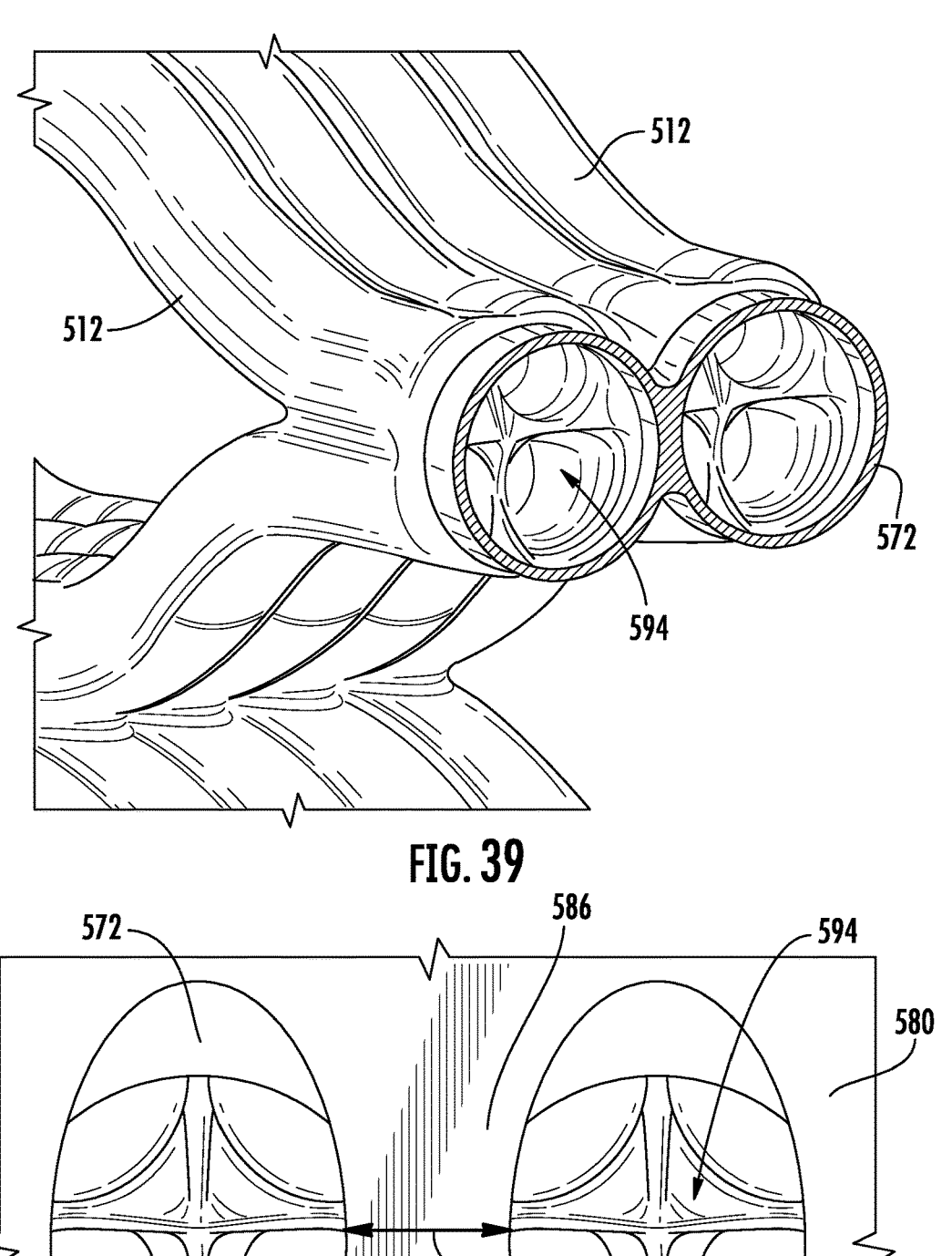

FIG. 39 is a cross sectional view of the exemplary transition portion of FIG. 36, taken along Line 14-14 of FIG. 36.

FIG. 40 is a front view of a header junction of the exemplary transition portion of FIG. 36 according to an exemplary embodiment of the present subject matter.

FIG. 41 is a method of manufacturing a header assembly according to an exemplary embodiment of the present subject matter.

FIG. 42 is a method of manufacturing a heat exchanger according to an exemplary embodiment of the present subject matter.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows. However, the terms "upstream" and "downstream" as used herein may also refer to a flow of electricity.

The term "fluid" may be a gas or a liquid. The term "fluid communication" means that a fluid is capable of making the connection between the areas specified.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

"Substantially annular" with respect to a duct or flowpath, such as a duct or flowpath with a heat exchanger positioned therein, refers to a duct or flowpath that is fully annular (i.e., extends continuously and uninterrupted in a circumferential direction with the exception of only the heat exchanger), or partially annular with at least 50% volume percent of void with the exception of the heat exchanger (such as at least 60%, such as at least 70%, such as at least 80%, such as at least 90% volume percent of void with the exception of the heat exchanger). For example, in certain embodiments, "substantially annular" describes a duct or flowpath that includes struts or other similar structure extending therethrough to occupy 30% of the annular space (with 70% of the annular space being void in the absence of the heat exchanger) resulting in a partially annular duct.

"Transmission Loss" or "TL" as used herein means a measurement of a reduction in sound level as sound from a sound source passes through an acoustic barrier. TL is expressed in units of decibels (dB) and indicates a reduction in sound intensity (at given frequencies) as sound-producing pressure waves encounter structure, or an acoustic barrier, such as a heat exchanger located within an annular flow path.

"Effective Transmission Loss" or "ETL" for a component of a gas turbine engine refers to an amount of TL that is expected for the component of the gas turbine engine during specified operating conditions. ETL is defined in more detail below. The ETL and TL for embodiments disclosed are more specifically expressed as an average ETL or TL, respectively, over a frequency bandwidth, such as between 300 Hertz ("Hz") and 12,500 Hz, or if the text indicates, as ETL or TL, respectively, at a particular frequency. According to the disclosure a range for ETL and TL is at least 1 dB and less than 5 dB.

"UA" as used herein means the product of an overall heat transfer coefficient (U) of the portion of a heat exchanger exposed to a fluid (e.g., air) passing through a flowpath in which the heat exchanger is positioned and the total surface area (A) of the heat exchanger positioned within the flowpath. The units may be expressed in British thermal units per hour per degrees Fahrenheit (Btu/(hr-° F.)). The ability of the portion of the heat exchanger to reject or accept heat to or from the fluid relates to the heat transfer characteristics of the material forming the portion exposed to the fluid (e.g., aluminum, steel, metal alloys, etc.), or more particularly to an overall heat transfer coefficient (CTE) of the portion of the heat exchanger exposed to the fluid, and the surface area of this portion. The parameter "UA" represents the effect of both the CTE and the surface area exposed to the fluid.

"Porosity" as used herein refers to a void fraction of the heat exchanger positioned within a flowpath. For example, the heat exchanger may define a flow area at a location and the flowpath may define a flow area at the same location (i.e., a flow area without the heat exchanger). Porosity of the heat exchanger is the ratio of the flow area of the heat exchanger to the flow area of the flowpath at the location.

"Blade passing frequency" of a stage of rotor blades, as used herein, means the product of a rotation rate (in revolutions per minute or RPM) and the number of rotor blades of the stage of rotor blades. As will be discussed in more detail below, when described relative to a heat exchanger of the present disclosure in a substantially annular duct or flowpath, the blade passing frequency refers to the blade passing frequency of an upstream rotor (located immediately upstream of the heat exchanger) calculated using the number of rotor blades of the rotor located immediately upstream of the heat exchanger. The units for blade passing frequency is hertz (Hz) or kilohertz (kHz), as indicated. For example, with reference to a fan of a turbofan or open rotor engine, the blade passing frequency refers to a product of a rotation rate (in RPM) of the fan rotor and the number of fan blades in the fan. The fan may refer to a fan exterior to a turbomachine (e.g., a fan located within a duct of a turbofan, e.g., fan assembly 14 of FIG. 1, or in a flowpath of an open rotor engine, e.g., fan assembly 150 of FIG. 2), or internal, such as a fan that is located downstream of an inlet to the turbomachine and upstream of at least one compressor of the turbomachine (e.g., fan 184 of FIG. 2). The rotor, rotation rate and rotor blades can also refer to a stage of a low pressure compressor or low pressure turbine (e.g., LP compressor 22, 126 and LP turbine 30, 134 respectively) when the stage is the respective rotor immediately upstream of the heat exchanger contained within the substantially annular duct.

"Rotor assembly" refers to a plurality of rotating airfoils at a given axial location within the gas turbine engine, such as the rotating airfoils within a given stage of a gas turbine engine. For example, the term rotor assembly may refer to a primary fan of a fan assembly of a turbofan or open rotor engine (e.g., an upstream-most fan located within a duct of a turbofan engine, e.g., fan assembly 14 of FIG. 1, or located within a flowpath of an open rotor engine, e.g., fan assembly 150 of FIG. 2); or a ducted fan of an open rotor engine (e.g., ducted fan 184 in FIG. 2). Additionally or alternatively, the term rotor assembly may refer to the rotating airfoils within a stage of a turbomachine of a gas turbine engine, such as the LP turbine rotor blades within a stage of an LP turbine (e.g., LP turbine 30 in FIG. 1 or LP turbine 134 in FIG. 2).

"Mass flow" or "mass flow rate" as used herein means the rate of mass flow of a fluid through a heat exchanger, mass flow through a duct upstream or downstream of the heat exchanger, or mass flow through a closed area volume. The units are pounds mass per second (lbm/sec.).

"Pressure drop" across an obstacle refers to the change in fluid pressure that occurs when the fluid passes through the obstacle. A pressure drop means the fluid's static pressure immediately upstream of the obstacle minus the fluid's static pressure immediately downstream of the obstacle divided by the fluid's static pressure immediately upstream of the obstacle, and is expressed as a percentage.

The disclosure provides examples of a variety of heat exchangers, examples of which include a "plate fin" heat exchanger, a "tube" heat exchanger, a "counter-flow" heat exchanger, an "onion" style heat exchanger, and "any dedicated channels" for heat exchange.

As used herein, the term "fin-based" heat exchanger refers to a heat exchanger that uses one or more fins extending into a cooling fluid flow or a heating fluid flow to increase a surface area exposed to the cooling or heating fluid flow to increase an efficiency of the heat exchanger. Examples of fin-based heat exchangers include a plate fin heat exchanger and a pin-fin heat exchanger.

A "plate fin" heat exchanger as used herein refers to a heat exchanger having a surface with fins extending therefrom configured to increase a heat transfer between the surface and a fluid passing over the fins. An example of this type of heat exchanger is described below with reference to FIG. 5.

A "pin-fin" heat exchanger as used herein refers to a heat exchanger having a first surface and a second surface. Fins and pins extend from the first surface, the second surface, or both surfaces to increase a heat transfer between the first and/or second surfaces and a fluid passing over the fins and pins.

A "tube" heat exchanger as used herein means a heat exchanger that includes one or more tubes or other conduit extending through a fluid flowpath. Such a heat exchanger may facilitate heat transfer from a fluid through the tube or other conduit and a fluid through the fluid flowpath. An example of this type of heat exchanger is described in reference to FIG. 4.

A "tube-sheet" heat exchanger as used herein means a heat exchanger having a plurality of tubes and a sheet with a plurality of holes through which the plurality of tubes extend.

A "shell-and-tube" heat exchanger refers to a heat exchanger that includes an outer shell housing a large number of tubes. Examples of this type of heat exchanger are described in reference to FIGS. 8 through 11.

A "counter-flow" heat exchanger as used herein means a heat exchanger wherein a direction of a flow of one of the working fluids is opposite a direction of a flow of another of the working fluids.

An "onion" style heat exchangers as used herein means a heat exchanger having a diverging section and a converging section with heat exchange features extending through these sections. An example of this type of heat exchanger is provided in FIGS. 11 through 13 and 20 through 23.

The term "heat transfer section" of a heat exchanger refers to a portion of the heat exchanger having unique heat transfer structural profile relative to an adjacent portion of the heat exchanger along a length of the heat exchanger, as well as a change in a cross-sectional area relative to the adjacent portion of the heat exchanger or an adjacent portion of a duct within which the heat exchanger is positioned. This term is explained in more detail with reference to the exemplary embodiment of FIG. 11.

The term "any dedicated channel" heat exchangers as used herein means any channel created specifically to transport fluid for the purpose of exchanging thermal energy.

The term "length," as used herein with respect to a heat exchanger, refers to a measurement along a centerline through the heat exchanger from an upstream-most edge of the heat exchanger to a downstream-most edge of the heat exchanger positioned within a fluid flowpath. The centerline is a geometric centerline and takes into account a swirl of the fluid flow through the heat exchanger, if present (e.g., a circumferential swirl in the embodiment of FIG. 11). The term "length" in the context of a heat exchanger generally refers to a combined length of each of the one or more heat transfer sections. In such a manner, the length refers to the average distance a flow stream follows through the heat exchanger. In some embodiments, the heat exchanger may include multiple channels, in which case the centerline is the geometric mean of the plurality of channels.

The term "acoustic length" as used herein with respect to a heat transfer section of a heat exchanger refers to a measurement along a centerline through the heat transfer section of the heat exchanger. The centerline is a geometric centerline and takes into account any swirl of the fluid flow through the heat transfer section of the heat exchanger, if present (e.g., a circumferential swirl in the embodiment of FIG. 11). For a heat exchanger including a single heat transfer section, such as the exemplary heat exchangers depicted in FIGS. 4 through 10, the acoustic length of the heat transfer section is equal to the length of the heat exchanger. For a heat exchanger including a plurality of heat transfer sections, the length of the heat exchanger is equal to a sum of the acoustic lengths of the respective heat transfer sections. In such a manner, the acoustic length of a heat transfer section refers to the average distance a flow stream follows through the heat transfer section of the heat exchanger. In some embodiments, the heat exchanger may include multiple channels through a heat transfer section, in which case, the centerline of the heat transfer section is the geometric mean of the plurality of channels through the heat transfer section.

For example, in embodiments wherein the heat transfer sections of the heat exchanger are symmetrical about a reference line extending from a center of an inlet to a center of an outlet (see, e.g., FIG. 11), the centerlines used to determine the acoustic lengths are each straight lines (assuming no swirl in a circumferential direction). By contrast, in embodiments wherein the heat transfer sections of the heat exchanger are asymmetrical about a reference line extending from a center of an inlet to a center of an outlet (see, e.g., FIG. 23), the centerlines used to determine the acoustic lengths will have a curve, such as an arc, extending through the respective heat transfer sections. In the case where a centerline is an arc, the arc length may be calculated to determine the desired length for tuning to the blade passing frequency, as disclosed herein.

The term "medium power operating condition" refers to an operating condition of an engine for a flight phase that occurs when the aircraft levels after a climb to a set altitude and before it begins to descend (i.e., a cruise operating condition). Additionally, medium power operating condition may refer to a descent operating condition.

The phrase "low power operating condition" refers to an operating condition of an engine at a power level less than a cruise power level during a cruise operating condition. For example, low power operating condition may refer to a flight idle operating condition, a ground idle operating condition, an approach idle operating condition, etc., where the engine is operating at a power level less than about 85% of a rated power of the engine, such as less than about 80% of a rated power of the engine.

The phrase "high power operating condition" refers to an operating condition of an engine at a power level greater than a cruise power level during a cruise operating condition. For example, high power operating condition may refer to a takeoff operating condition, a climb operating condition, etc.

The term "bypass ratio" of a turbofan engine or open rotor engine refers to a ratio bypass airflow to engine airflow, each measured as a mass flowrate. The engine airflow refers to an airflow provided through an upstream-most engine inlet downstream of a primary fan of the turbofan engine (e.g., annular inlet 20 in FIG. 1) or of the open rotor engine (e.g., engine inlet 182 in FIG. 2). The bypass airflow refers to a remainder of an airflow from the primary fan not considered engine airflow.

The terms "first stream" and "second stream" as used herein mean a working gas flowpath of a turbomachine that passes through a core of a turbomachine (high pressure compressor, combustor, and high pressure turbine) and a fan stream or bypass stream, respectively.

A "third stream" as used herein means a non-primary air stream capable of increasing fluid energy to produce a minority of total propulsion system thrust. A pressure ratio of the third stream is higher than that of the primary propulsion stream (e.g., a bypass or propeller driven propulsion stream). The thrust may be produced through a dedicated nozzle or through mixing of an airflow through the third stream with a primary propulsion stream or a core air stream, e.g., into a common nozzle.

In certain exemplary embodiments an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, static flight speed, 86 degrees Fahrenheit ambient temperature operating conditions.

Furthermore in certain exemplary embodiments, aspects of the airflow through the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

References to "noise", "noise level", or "perceived noise", or variations thereof, are understood to include sound pressure levels (SPL) outside a fuselage, fuselage exterior noise levels, perceived noise levels, effective perceived noise levels (EPNL), instantaneous perceived noise levels (PNL(k)), or tone-corrected perceived noise levels (PNLT(k)), or one or more duration correction factors, tone correction factors, or other applicable factors, as defined by the Federal Aviation Administration (FAA), the European Union Aviation Safety Agency (EASA), the International Civil Aviation Organization (ICAO), Swiss Federal Office of Civil Aviation (FOCA), or committees thereof, or other equivalent regulatory or governing bodies. Where certain ranges of noise levels (e.g., in decibels, or dB) are provided herein, it will be appreciated that one skilled in the art will understand methods for measuring and ascertaining of such levels without ambiguity or undue experimentation. Methods for measuring and ascertaining one or more noise levels as provided herein by one skilled in the art, with reasonable certainty and without undue experimentation, include, but are not limited to, understanding of measurement systems, frames of reference (including, but not limited to, distances, positions, angles, etc.) between the engine and/or aircraft relative to the measurement system or other perceiving body, or atmospheric conditions (including, but not limited to, temperature, humidity, dew point, wind velocity and vector, and points of reference for measurement thereof), as may be defined by the FAA, EASA, ICAO, FOCA, or other regulatory or governing body.

As used herein, the term "community noise" refers to an amount of noise produced by an engine and/or aircraft that is observed on the ground, typically in the community around an airport during a takeoff or landing.

As provided herein, embodiments of the engine included herein define noise levels between 5 decibels (dB) and 10 dB below ICAO's Annex 16 Volume 1 Chapter 14 noise standards applicable on or after 31 Dec. 2017 for airplanes with a maximum takeoff weight of at least 55 tons. Additionally, or alternatively, embodiments of the engine provided herein may attenuate low frequency noise, such as those that may propagate to the ground while an engine is at cruise altitude, or as may be referred to as en-route noise or community noise.

In certain exemplary embodiments of the present disclosure, a gas turbine engine defining a centerline and a circumferential direction is provided. The gas turbine engine may generally include a turbomachine and a fan assembly. The fan assembly may be driven by the turbomachine. The turbomachine, the fan assembly, or both may define a substantially annular flowpath relative to the centerline of the gas turbine engine. The gas turbine engine includes a heat exchanger positioned within the flow path and extending along the circumferential direction, such as substantially continuously along the circumferential direction. The heat exchanger may be fully annular, meaning completing an annulus, or partially annular such that a portion of the fluid traveling through the duct will not pass through a flow area of the heat exchanger flow while other portions will pass through the heat exchanger flow area.

A heat exchanger design for the gas turbine engine may be designed for flight idle conditions, such during a descent of an aircraft including the gas turbine engine. The objective, when designing the heat exchanger, may be generally stated as satisfying a minimum heat transfer capability from a hot fluid to a cold fluid for an acceptable amount of pressure drop across the heat exchanger. Key factors to consider include a mass flow rate through the duct at flight idle conditions and the type or characteristics of the selected heat exchanger.

A heat exchanger optimized for flight idle conditions however may turn out to be unacceptable during other flight conditions, such as during high power operating conditions where maximum thrust may be needed (e.g., takeoff, climb, turnaround during descent, etc.). During such periods a heat exchanger optimized for flight idle, it may become necessary to modify heat exchanger properties to improve its noise attenuation capability to meet community and/or cabin noise requirements. Given the complex nature of sound transmission through a fluid, heretofore a standard engineering practice has been to evaluate the acoustic environment for different flight conditions for a selected heat exchanger, or heat exchanger optimized for maximum heat transfer with acceptable pressure drop. And if it is expected that a chosen heat exchanger, that is, a heat exchanger optimized for pressure drop and heat transfer between fluids, does not provide a desired amount of noise reduction when air passes through the duct and internal surfaces of the heat exchanger, then the heat exchanger may need a re-design so that less noise is produced during the flight condition, e.g., takeoff. Thus, standard practice has been to optimize a heat exchanger for flight idle, evaluate whether that heat exchanger produces acceptable noise levels across a flight envelope (or rather permits an acceptable amount of noise to attenuate across the heat exchanger), and if it does not, re-design, that is, essentially start over and re-optimize the heat exchanger to reduce the amount of noise produced during the affected flight condition while still satisfying the heat transfer and/or maximum pressure drop requirements. It would be desirable to have an initial design or design requirements established for a heat exchanger at the beginning in order to avoid this iterative process; that is, establish the conditions or limitations on a heat exchanger satisfying engine architecture requirements accounting for acceptable pressure drop, desired transmission loss for air traveling through an annular duct, and heat transfer requirements at flight idle.

Figure 1:
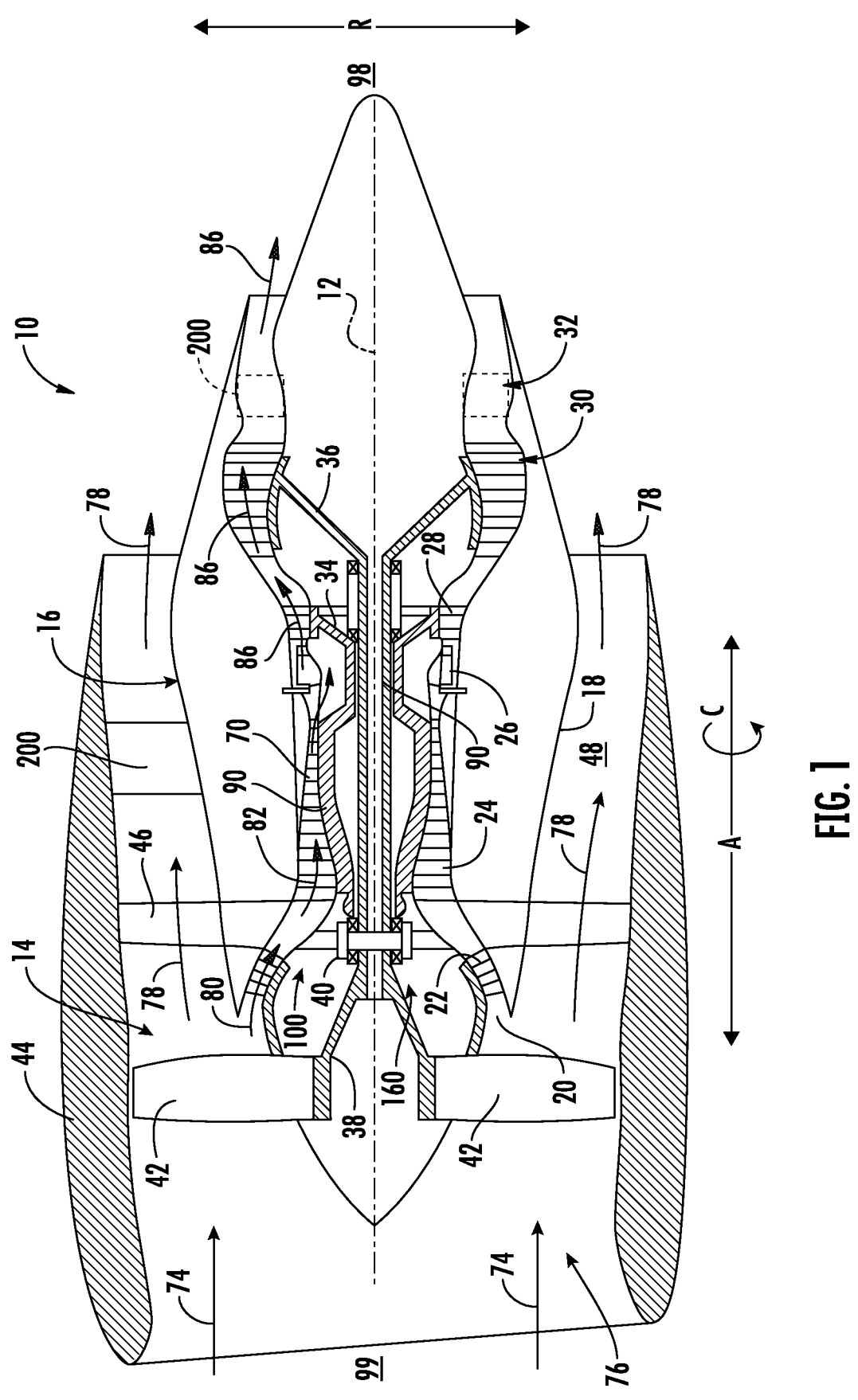
FIG. 1 is a schematic cross-sectional view of a gas turbine engine in accordance with an exemplary embodiment of the present disclosure.
Figure 2:
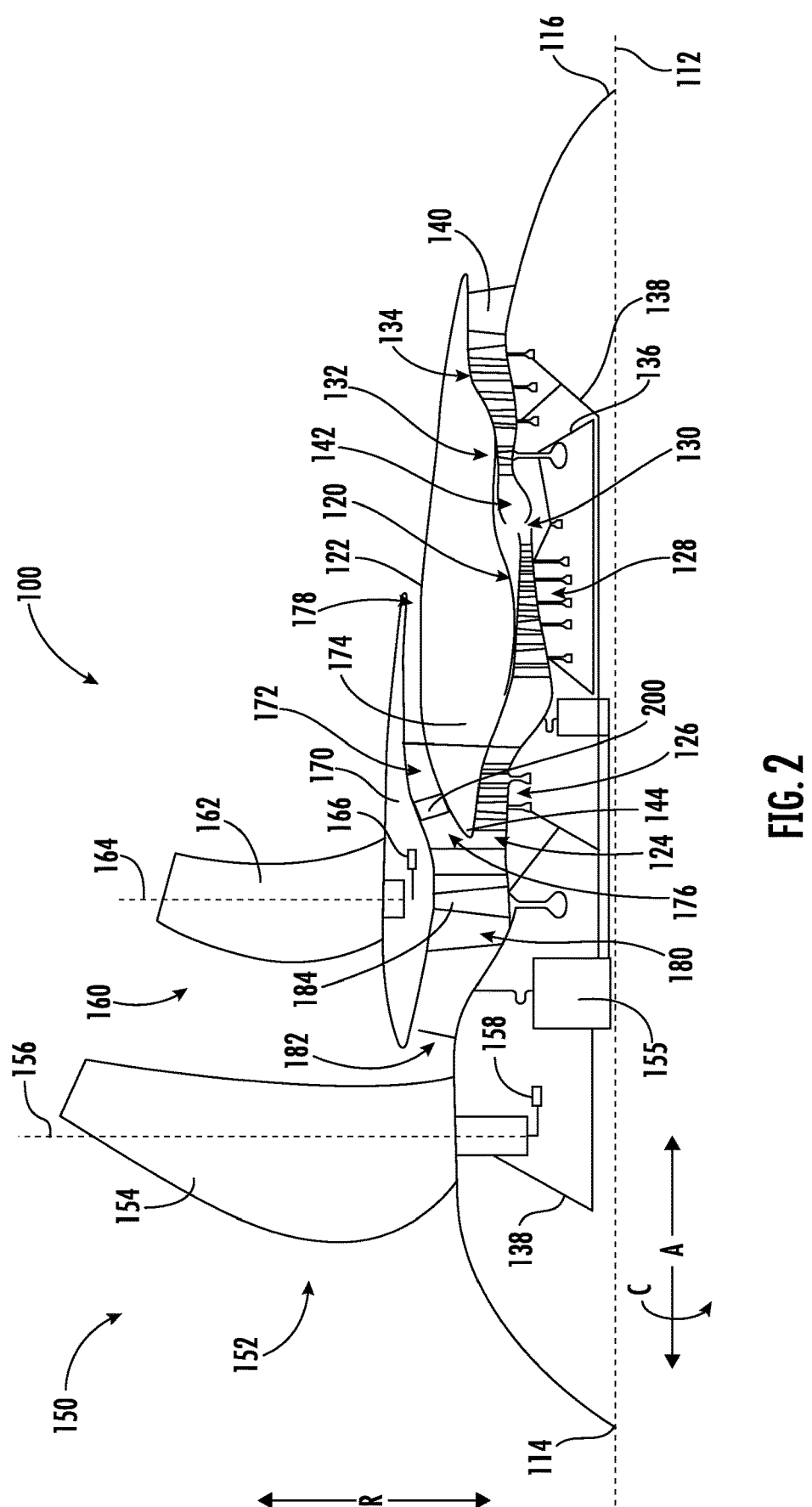
FIG. 2 is a schematic cross-sectional view of a three-stream engine in accordance with an exemplary embodiment of the present disclosure.

The inventors' practice has proceeded in the manner of designing a heat exchanger, modifying the heat exchanger, and redesigning the heat exchanger to meet acoustic requirements, then checking acoustic response again, etc. during the design of several different types of turbomachines, such as those shown in FIGS. 1 and 2. The types of heat exchangers considered in these designs iterations (i.e., heat exchanger optimization vs. resulting acoustic environment) include heat exchanger designs that utilized one or more of a "fin-based" heat exchanger, "plate fin" heat exchanger, "shell and tube" heat exchanger, "counter-flow" heat exchanger, "onion" style heat exchanger, "any dedicated channel" heat exchanger, or the like. Examples of the turbomachine engines and heat exchanger types developed by the inventors follows.

Referring now to the drawings, FIG. 1 is a schematic partially cross-sectioned side view of an exemplary gas turbine engine 10 as may incorporate various embodiments of the present disclosure. The engine 10 may be configured as a gas turbine engine for an aircraft. Although further described herein as a turbofan engine or open rotor engine (FIG. 2), the principles set forth in this description, with reference to the several examples, including engines 10 and 100, may alternatively be adapted for a turboshaft, turbo-prop, or turbojet gas turbine engine in light of this disclo-sure.

As shown in FIG. 1, the engine 10 has a longitudinal or axial centerline 12 that extends therethrough for reference purposes. An axial direction A is extended co-directional to the axial centerline 12 for reference. The engine 10 further defines an upstream end 99 (or forward end) and a down-stream end 98 (or aft end) for reference. In general, the engine 10 includes a fan assembly 14 and a turbomachine 16 disposed downstream from the fan assembly 14. For refer-ence, the engine 10 defines an axial direction A, a radial direction R, and a circumferential direction C. In general, the axial direction A extends parallel to the axial centerline 12, the radial direction R extends outward from and inward to the axial centerline 12 in a direction orthogonal to the axial direction A, and the circumferential direction extends three hundred sixty degrees (360°) around the axial centerline 12.

The turbomachine 16 includes a substantially tubular outer casing 18 that defines an annular inlet 20 to the turbomachine 16. The outer casing 18 encases or at least partially forms, in serial flow relationship, a compressor section having a booster or low pressure (LP) compressor 22, a high pressure (HP) compressor 24, a combustion section 26, an expansion section or turbine section including a high pressure (HP) turbine 28 and a low pressure (LP) turbine 30, and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 is connected to the fan shaft 38 via a reduction gear 40 such as in an indirect-drive or geared-drive configuration.

As shown in FIG. 1, the fan assembly 14 includes a plurality of fan blades 42 that are coupled to and that extend radially outwardly from the fan shaft 38. An annular fan casing or nacelle 44 circumferentially surrounds the fan assembly 14 and/or at least a portion of the turbomachine 16. It should be appreciated that the nacelle 44 is configured to be supported relative to the turbomachine 16 by a plurality of circumferentially-spaced outlet guide vanes or struts 46. Moreover, at least a portion of the nacelle 44 depicted extends over an outer portion of the turbomachine 16 so as to define a second stream, or fan flow passage 48, therebe-tween.

During operation of the engine 10, a flow of air, shown schematically by arrows 74, enters an inlet 76 of the engine 10 defined by the fan case or nacelle 44. A portion of air, shown schematically by arrows 80, enters the turbomachine 16 through the inlet 20 defined at least partially by the outer casing 18. The flow of air is provided in serial flow through the compressors, the combustion section 26, and the expan-sion section. In particular, for the embodiment shown, the turbomachine 16, and more specifically, the compressor section, the combustion section 26, and turbine section, together define at least in part a working gas flowpath 70, or second stream. The flow of air 80 is increasingly compressed as it flows across successive stages of the compressors 22, 24, such as shown schematically by arrows 82. The com-pressed air 82 enters the combustion section 26 and mixes with a liquid and/or gaseous fuel and is ignited to produce combustion gases 86. It should be appreciated that the combustion section 26 may include any appropriate system for generating combustion gases, including, but not limited to, deflagrative or detonative combustion systems, or combinations thereof. The combustion section 26 may include annular, can, can-annular, trapped vortex, involute or scroll, rich burn, lean burn, rotating detonation, or pulse detonation configurations, or combinations thereof.

The combustion gases 86 release energy to drive rotation of the HP turbine 28 and shaft 34 and the LP turbine 30 and shaft 36 before exhausting from the jet exhaust nozzle section 32. The release of energy from the combustion gases 86 further drives rotation of the fan assembly 14, including the fan blades 42. A portion of the air 74 bypasses the turbomachine 16 and flows across the fan flow passage 48, such as shown schematically by arrows 78. A ratio of the air 78 to the air 80 is referred to herein as a bypass ratio of the engine 10. During operation of the engine 100 in a high power operating condition, the bypass ratio may be between 2.9 and 45, such as at least 4.5, such as at least 6, such as at least 10, such as at least 12, such as up to 35, such as up to 25.

It should be appreciated that FIG. 1 depicts and describes a two-stream engine having the working gas flowpath 70 (first stream) and the fan flow passage 48 (second stream). The embodiment depicted in FIG. 1 has a nacelle 44 surrounding the fan blades 42, such as to provide noise attenuation, blade-out protection, and other benefits known for nacelles, and which may be referred to herein as a "ducted fan," or the entire engine 10 may be referred to as a "ducted engine."

Notably, in the embodiment depicted, the engine 10 further includes a heat exchanger 200 in the second stream/bypass passage 48. As will be appreciated, the bypass stream 48 is an annular flowpath relative to the centerline 12. The heat exchanger 200 is positioned in the bypass stream 48 and extends along the circumferential direction C within the bypass stream 48 (although only depicted schematically at the top portion for clarity).

In additional or alternative embodiments, however, the heat exchanger 200 may be positioned in any other annular or substantially annular passage, such as within the exhaust section 32, as is depicted in phantom, as, e.g., a waste heat recovery heat exchanger. The heat exchanger 200 in the exhaust section 32 may again be an annular heat exchanger, and may be configured to receive heat from the combustion gases 86.

In such a manner, it will be appreciated that in one or more of these example embodiments, the exchanger 200 may extend along the circumferential direction C within the flowpath for at least about 30 degrees of the annular or substantially annular passage, such as at least 90 degrees, such as at least 150 degrees, such as at least 180 degrees, such as at least 240 degrees, such as at least 300 degrees, such as at least 330 degrees. Additionally, or alternatively, in certain exemplary embodiments, the exchanger 200 may extend substantially continuously along the circumferential direction C within the flowpath (e.g., for at least about 345 degrees of the annular or substantially annular passage), or continuously along the circumferential direction C within the flowpath (e.g., for 360 degrees of the annular passage).

Referring now to FIG. 2, a schematic cross-sectional view of a gas turbine engine is provided according to another example embodiment of the present disclosure. Particularly, FIG. 2 provides an engine having a fan assembly with a single stage of unducted rotor blades. In such a manner, the fan assembly may be referred to herein as an "unducted fan," or the entire engine 100 may be referred to as an "unducted engine." In addition, the engine of FIG. 2 includes a third stream extending from the compressor section to a fan assembly flowpath over the turbomachine, as will be explained in more detail below.

For reference, the engine 100 defines an axial direction A, a radial direction R, and a circumferential direction C. Moreover, the engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees (360°) around the longitudinal axis 112. The engine 100 extends between a forward end 114 and an aft end 116, e.g., along the axial direction A.

The engine 100 includes a turbomachine 120 and a fan assembly, also referred to a fan section 150, positioned upstream thereof. Generally, the turbomachine 120 includes, in serial flow order, a compressor section, a combustion section, a turbine section, and an exhaust section. Particularly, as shown in FIG. 2, the turbomachine 120 includes a core cowl 122 that defines an annular core inlet 124. The core cowl 122 further encloses at least in part a low pressure system and a high pressure system. For example, the core cowl 122 depicted encloses and supports at least in part a booster or low pressure ("LP") compressor 126 for pressurizing the air that enters the turbomachine 120 through core inlet 124. A high pressure ("HP"), multi-stage, axial-flow compressor 128 receives pressurized air from the LP compressor 126 and further increases the pressure of the air. The pressurized air stream flows downstream to a combustor 130 of the combustion section where fuel is injected into the pressurized air stream and ignited to raise the temperature and energy level of the pressurized air.

It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The high energy combustion products flow from the combustor 130 downstream to a high pressure turbine 132. The high pressure turbine 128 drives the high pressure compressor 128 through a high pressure shaft 136. In this regard, the high pressure turbine 128 is drivingly coupled with the high pressure compressor 128. The high energy combustion products then flow to a low pressure turbine 134. The low pressure turbine 134 drives the low pressure compressor 126 and components of the fan section 150 through a low pressure shaft 138. In this regard, the low pressure turbine 134 is drivingly coupled with the low pressure compressor 126 and components of the fan section 150. The LP shaft 138 is coaxial with the HP shaft 136 in this example embodiment. After driving each of the turbines 132, 134, the combustion products exit the turbomachine 120 through a turbomachine exhaust nozzle 140.

Accordingly, the turbomachine 120 defines a working gas flowpath or core duct 142 that extends between the core inlet 124 and the turbomachine exhaust nozzle 140. The core duct 142 is an annular duct positioned generally inward of the core cowl 122 along the radial direction R. The core duct 142 (e.g., the working gas flowpath through the turbomachine 120) may be referred to as a second stream.

The fan section 150 includes a fan 152, which is the primary fan in this example embodiment. For the depicted embodiment of FIG. 2, the fan 152 is an open rotor or unducted fan 152. As depicted, the fan 152 includes an array of fan blades 154 (only one shown in FIG. 2). The fan blades 154 are rotatable, e.g., about the longitudinal axis 112. As noted above, the fan 152 is drivingly coupled with the low pressure turbine 134 via the LP shaft 138. The fan 152 can be directly coupled with the LP shaft 138, e.g., in a direct-drive configuration. However, for the embodiments shown in FIG. 2, the fan 152 is coupled with the LP shaft 138 via a speed reduction gearbox 155, e.g., in an indirect-drive or geared-drive configuration.

Moreover, the fan blades 154 can be arranged in equal spacing around the longitudinal axis 112. Each blade 154 has a root and a tip and a span defined therebetween. Each blade 154 defines a central blade axis 156. For this embodiment, each blade 154 of the fan 152 is rotatable about their respective central blades axes 156, e.g., in unison with one another. One or more actuators 158 are provided to facilitate such rotation and therefore may be used to change a pitch the blades 154 about their respective central blades axes 156.

The fan section 150 further includes a fan guide vane array 160 that includes fan guide vanes 162 (only one shown in FIG. 2) disposed around the longitudinal axis 112. For this embodiment, the fan guide vanes 162 are not rotatable about the longitudinal axis 112. Each fan guide vane 162 has a root and a tip and a span defined therebetween. The fan guide vanes 162 may be unshrouded as shown in FIG. 2 or, alternatively, may be shrouded, e.g., by an annular shroud spaced outward from the tips of the fan guide vanes 162 along the radial direction R or attached to the fan guide vanes 162.

Each fan guide vane 162 defines a central blade axis 164. For this embodiment, each fan guide vane 162 of the fan guide vane array 160 is rotatable about their respective central blades axes 164, e.g., in unison with one another. One or more actuators 166 are provided to facilitate such rotation and therefore may be used to change a pitch of the fan guide vane 162 about their respective central blades axes 164. However, in other embodiments, each fan guide vane 162 may be fixed or unable to be pitched about its central blade axis 164. The fan guide vanes 162 are mounted to a fan cowl 170.

As shown in FIG. 2, in addition to the fan 152, which is unducted, a ducted fan 184 is included aft of the fan 152, such that the engine 100 includes both a ducted and an unducted fan which both serve to generate thrust through the movement of air without passage through at least a portion of the turbomachine 120 (e.g., the HP compressor 128 and combustion section for the embodiment depicted). The ducted fan is shown at about the same axial location as the fan blade 154, and radially inward of the fan blade 154. The ducted fan 184 is, for the embodiment depicted, driven by the low pressure turbine 134 (e.g. coupled to the LP shaft 138).

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define a fan flowpath or fan duct 172. The fan flowpath or fan duct 172 may be referred to as a third stream of the engine 100.

Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The fan cowl 170 and the core cowl 122 are connected together and supported by a plurality of substantially radially-extending, circumferentially-spaced stationary struts 174 (only one shown in FIG.

2). The stationary struts 174 may each be aerodynamically contoured to direct air flowing thereby. Other struts in addition to the stationary struts 174 may be used to connect and support the fan cowl 170 and/or core cowl 122. In many embodiments, the fan duct 172 and the core duct 142 may at least partially co-extend (generally axially) on opposite sides (e.g., opposite radial sides) of the core cowl 122. For example, the fan duct 172 and the core duct 142 may each extend directly from the leading edge 144 of the core cowl 122 and may partially co-extend generally axially on opposite radial sides of the core cowl.

The engine 100 also defines or includes an inlet duct 180. The inlet duct 180 extends between an engine inlet 182 and the core inlet 124/fan duct inlet 176. The engine inlet 182 is defined generally at the forward end of the fan cowl 170 and is positioned between the fan 152 and the array of fan guide vanes 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a splitter or leading edge 144 of the core cowl 122. The inlet duct 180 is wider than the core duct 142 along the radial direction R. The inlet duct 180 is also wider than the fan duct 172 along the radial direction R.

As will be appreciated, a first portion of air received by the fan 152 is provided through the engine inlet 182, and a second portion of the air received by the fan 152 is provided over the fan cowl 170 and core cowl 122. A ratio of the second portion of air to the first portion of air is referred to as a bypass ratio of the engine 100. During operation of the engine 100 in a high power operating condition, the bypass ratio may be between 2.9 and 45, such as at least 4.5, such as at least 6, such as at least 10, such as at least 12, such as up to 35, such as up to 25.

In exemplary embodiments, air passing through the fan duct 172 may be relatively cooler (e.g., lower temperature) than one or more fluids utilized in the turbomachine 120. In this way, one or more heat exchangers 200 may be disposed within the fan duct 172 and utilized to cool one or more fluids from the core engine with the air passing through the fan duct 172, as a resource for removing heat from a fluid, e.g., compressor bleed air, oil or fuel.

Although not depicted, in certain exemplary embodiments, the engine 100 may further include one or more heat exchangers 200 in other annular ducts or flowpath of the engine 100, such as in the inlet duct 180, in the turbomachinery flowpath/core duct 142, within the turbine section and/or turbomachine exhaust nozzle 140, etc.

In at least certain exemplary embodiments, the heat exchanger(s) 200 of FIG. 2 (and FIG. 1) may extend in the circumferential direction C as well as in the radial direction R across the annular duct or flowpath of the engine 100. For example, referring now briefly to FIG. 3, providing a partial cross-sectional view of the heat exchanger 200 of FIG. 2, it will be appreciated that the heat exchanger 200 may extend substantially continuously in the circumferential direction C and across an entirety of the annular duct or flowpath in the radial direction R.

With respect to extending substantially continuously in the circumferential direction C, the heat exchanger 200 may extend substantially 360 degrees in the circumferential direction C, about the longitudinal axis 112.

With respect to extending in the radial direction R, the exemplary heat exchanger 200 depicted extends completely across the annular duct or flowpath in the radial direction R. In particular, the heat exchanger 200 shown is positioned in the fan duct 172, defining a duct height, $H_D$, in the radial direction R at the location along the axial direction A. The heat exchanger 200 defines a heat exchanger height, $H_{HX}$, in the radial direction R also at the location along the axial direction A. The heat exchanger height, $H_{HX}$, is equal to the duct height, $H_D$, at the location along the axial direction A for the embodiment shown.

Notably, as used herein, the term "duct height, $H_D$" of an annular duct or flowpath refers to a length along the radial direction R from an inner wall of the duct or flowpath along the radial direction R to an outer wall or boundary of the duct or flowpath along the radial direction R, at a location along the axial direction A. For example, in the embodiment depicted, the duct height, $H_D$, of the fan duct 172 is a length along the radial direction R from the core cowl 122 to the fan cowl 170 at the location along the axial direction A. To the extent the length varies at different circumferential locations at the location along the axial direction A, the term duct height, $H_D$, refers to an average duct height, $H_D$, at the location along the axial direction A. Further the term, "heat exchanger height, $H_{HX}$" refers to a length of the heat exchanger 200 along the radial direction R at the location along the axial direction A within the duct or flowpath. Accordingly, in the embodiment shown, since the heat exchanger 200 extends completely across the fan duct 172, the heat exchanger height, $H_{HX}$, is equal to the duct height, $H_D$, at the location along the axial direction A.

In some embodiments the heat exchanger 200 extends between 10% and 100% of the duct height, such as between 12% and 30% of the duct height. For example, a heat exchanger height, $H_{HX}$, of a heat exchanger located downstream of the fan 184 and within the substantially annular fan duct 172, is greater than 10% of the duct height, $H_D$, at the location along the axial direction A, and less than 100% of the duct height, $H_D$ (see, e.g., heat exchanger height, $H_{HX}'$, depicted in phantom in FIG. 3). For example, the heat exchanger height, $H_{HX}$, may be greater than or equal to 15% of the duct height, $H_D$, such as greater than or equal to 20% of the duct height, $H_D$, greater than or equal to 30% of the duct height, $H_D$, or greater than or equal to 50% of the duct height, $H_D$, at the location along the axial direction A. In such a configuration, the heat exchanger 200 may be positioned on an inner wall of the duct (e.g., the core cowl 122), on an outer wall of the duct (e.g., the fan cowl 170), or suspended therebetween through one or more supports.

Figure 3:
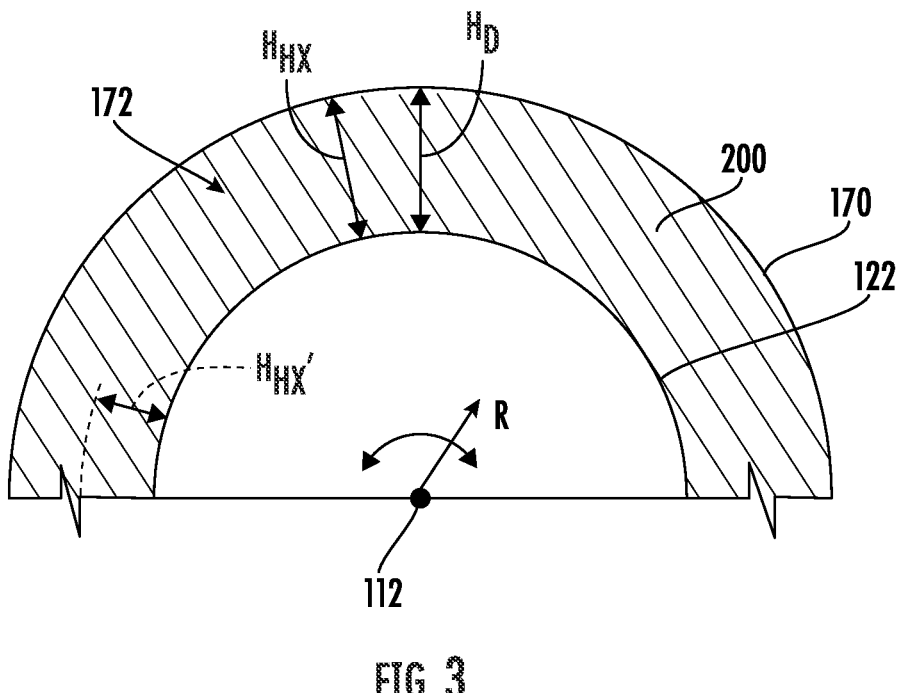
FIG. 3 is a schematic cross-sectional view of a heat exchanger and flowpath in accordance with an exemplary embodiment of the present disclosure.

Further, referring still to FIG. 3, it will be appreciated that, as noted above, the fan duct 172 in which the heat exchanger 200 is positioned is an annular duct, or rather a full annular duct, in that it extends continuously and uninterrupted in the circumferential direction C. In other embodiments, however, the fan duct 172, or a portion of the fan duct 172 in which the heat exchanger 200 is positioned, or another duct or flowpath in which the heat exchanger 200 is positioned, may be a partially annular duct.

Figure 4:
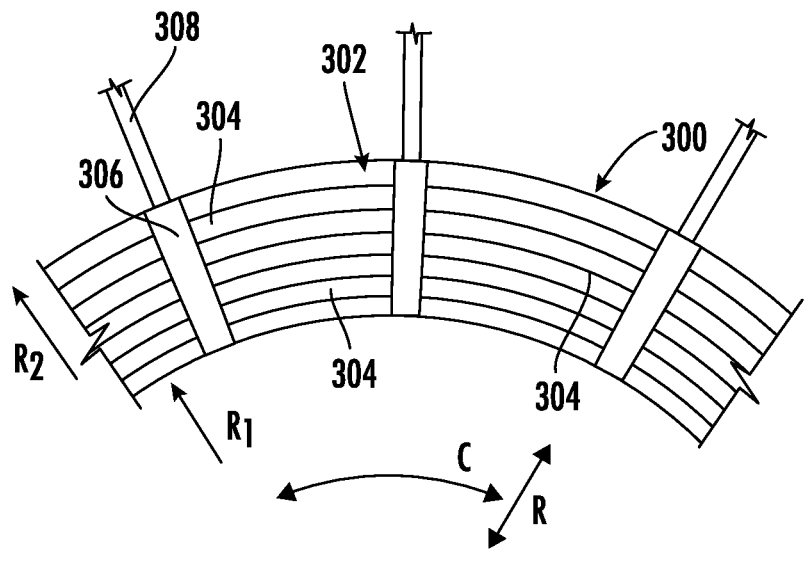
FIG. 4 is a schematic cross-sectional view of a heat exchanger and flowpath in accordance with another exemplary embodiment of the present disclosure.

More specifically, still, referring now also to FIG. 4, a close-up, cross-sectional view of a heat exchanger 300 positioned within a flowpath 302 is provided. In at least certain exemplary embodiments, the heat exchanger 300 and flowpath 302 may be configured in a similar manner as the exemplary heat exchanger 200 and flowpath (e.g., fan duct 172) described above with reference to FIG. 1 or 2.

For the embodiment of FIG. 4, the heat exchanger 300 is configured as a tube-based heat exchanger 300, including a plurality of channels or tubes 304 extending through the flowpath 302. The heat exchanger 300 further includes a plurality of manifolds 306, with each manifold 306 fluidly coupled to a thermal fluid line 308, which may be a supply line or return line. In such a manner, the heat exchanger 300 may be configured to exchange heat from a thermal fluid through the plurality of tubes 304 to an airflow through the flowpath 302.

It will be appreciated that the number, size, and configuration of the tubes 304, manifolds 306, etc. are provided by way of example only and that in other exemplary embodiments, the heat exchanger 300 may have any other suitable configuration. Further, although the exemplary heat exchanger 300 depicted in FIG. 4 extends continuously in the circumferential direction C, it will be appreciated that in other exemplary embodiments, the heat exchanger 300 may be a plurality of discrete heat exchangers 300 arranged in the circumferential direction C. The plurality of discrete heat exchangers 300 may collectively extend substantially continuously in the circumferential direction C, with only relatively small gaps or spacing between the adjacent heat exchangers 300. With such a configuration, the plurality of discrete heat exchanger 300 may collectively extend along the circumferential direction C within the flowpath for at least about 180 degrees, such as at least 240 degrees, such as at least 300 degrees, such as at least 330 degrees, such as at least about 345 degrees of the annular or substantially annular passage, or continuously along the circumferential direction C within the flowpath (e.g., for 360 degrees of the annular passage). Notably, the ranges of porosity described herein and provided below account for any small gaps or spacing between adjacent heat exchangers 300, as well as for arrangements where the heat exchanger 300 otherwise does not extend completely through the flowpath in the circumferential direction C.

Moreover, although for the embodiment of FIG. 4 a single row of channels or tubes 304 are depicted extending in the circumferential direction C, it will be appreciated that the heat exchanger 300 may include multiple channels or tubes 304 arranged along the axial direction A at each layer of tubes 304, e.g., for each of the three layers depicted in FIG. 4. Moreover, although the channels or tubes 304 are depicted extending generally in the circumferential direction C in FIG. 4, in other embodiments, the tubes 304 may additionally or alternatively extend along the axial direction A, such that the heat exchanger 300 includes a number of tubes arranged along the circumferential direction C at each layer. The number of axially-extending channels at a particular layer of the heat exchanger 300 may be referred to as the channel density of heat exchanger 300.

As will also be appreciated, the flowpath 302 defines a flowpath flow area Af. The flowpath flow area Af generally refers to a cross-sectional area of the flowpath 302, and more specifically refers to the cross-sectional area of the flowpath 302, excluding the heat exchanger 300, at a location where the heat exchanger 300 is located. For a perfectly annular flowpath 302, the flowpath flow area Af may be defined by $(R2^2-R1^2)\times\pi$, wherein R2 is an outer radius of the flowpath 302 and R1 is an inner radius of the flowpath 302. In addition, the heat exchanger 300 defines a heat exchanger flow area Ah. The heat exchanger flow area Ah may refer to a minimum cross-sectional area of an open path through the heat exchanger 300. For the embodiment shown, the heat exchanger flow area Ah may be calculated as the flowpath flow area Af minus a cross-sectional area of each of the tubes 304 and manifolds 306 of the heat exchanger 300 depicted in FIG. 4. A ratio of the heat exchanger flow area Ah to the flowpath flow area Af may generally be referred to as a porosity of the heat exchanger 300.

It will be appreciated, however, that in other exemplary embodiments, the heat exchanger 300 may have any other suitable configuration. For example, referring now to FIG. 5, a schematic perspective view of a heat exchanger 300 in accordance with another exemplary embodiment of the present disclosure is provided. The heat exchanger 300 defines an axial direction A, a radial direction R, and a circumferential direction C. When installed within a gas turbine engine, the axial, radial, and circumferential direction A, R, C of the heat exchanger may align with the axial, radial, and circumferential direction A, R, C of the gas turbine engine. As will be appreciated from the embodiment of FIG. 5, in other exemplary embodiments the heat exchanger 300 may be a fin-based heat exchanger 300. Specifically, for the embodiment of FIG. 5, the heat exchanger 300 includes a plurality of plates 310, a first plurality of fins 312 extending between adjacent plates 310, and a second plurality of fins 314 also extending between adjacent plates 310 and opposite one of the plates 310 from the first plurality of fins 312. A first fluid flow may travel through the first plurality of fins 312, and a second fluid flow may travel through the second plurality of fins 314. Heat may travel from the first fluid flow, through the first plurality of fins 312, through a plate 310 positioned between the first and second pluralities of fins 312, 214, to the second plurality of fins 314 and to the second fluid flow (or alternatively may flow in reverse). As is depicted, there may be several layers of first and second pluralities of fins 312, 314 and plates 210.

Figure 5:
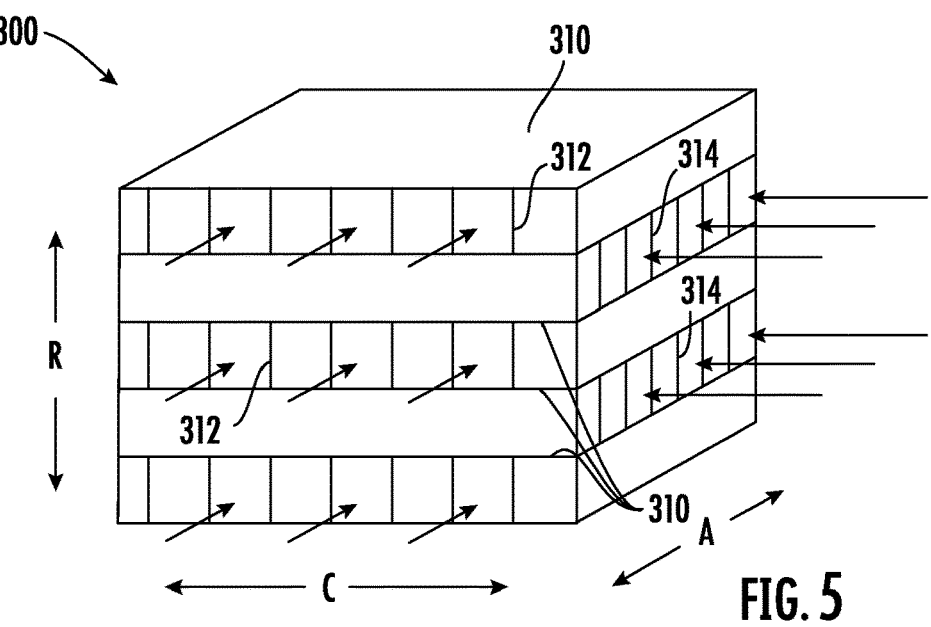
FIG. 5 is an exploded perspective view of a heat exchanger in accordance with another exemplary embodiment of the present disclosure.
Figure 6:
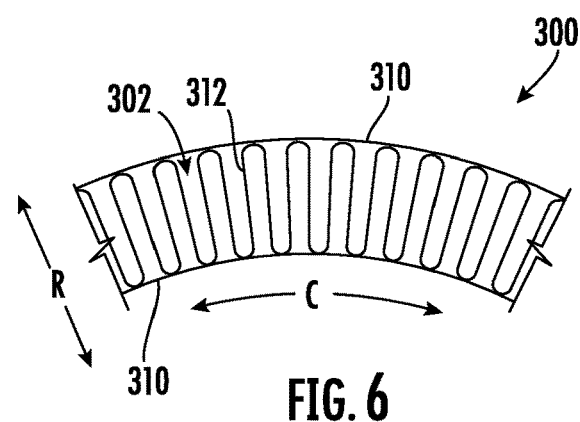
FIG. 6 is a schematic cross-sectional view of the exemplary heat exchanger of FIG. 5 in a flowpath in accordance with an exemplary embodiment of the present disclosure.

Referring now also briefly to FIG. 6, providing a schematic view of one layer the heat exchanger 300 of FIG. 5 positioned within the flowpath 302, as viewed along the centerline of the engine, it will be appreciated that heat exchanger 300 of FIG. 5 defines a relatively large heat exchanger flow area Ah (at least as compared to the exemplary heat exchanger 300 FIG. 4). The layer shown in FIG. 6 is the first plurality of fins 312. The heat exchanger 300 may further include a second plurality of fins 314 opposite plate 310 and, e.g., outside of the flowpath.

However, referring back to FIG. 5, it will also be appreciated that the fins of the first plurality of fins 312 may define a relatively long length in the flowpath direction, along the axial direction A for the embodiment shown. As the length of the fins 314 increases, an effectiveness E of the heat exchanger 300 may generally increase as well, as the increase in length provides greater surface area to facilitate heat exchange with the airflow through the flowpath 302.

The heat exchanger 300 of FIG. 5 may have an approximately constant cross-sectional area along its length (i.e., along the axial direction A for the embodiment depicted) or it may have two or more changes in this area over its length. When there are changes in its length, the heat exchanger has more than one heat transfer sections and associated acoustic lengths. This property of the heat exchanger offers opportunity in reducing noise attenuation for different flight conditions, as explained in greater detail, below.

It will be appreciated, however, that in still other exemplary embodiments, the heat exchanger 300 may have still other suitable configurations. For example, in other exemplary embodiments, the heat exchanger 300 may be one or more of a pin-fin heat exchanger, a tube-shell heat exchanger, a tube-sheet heat exchanger, or a counter-flow heat exchanger.

Figure 7:
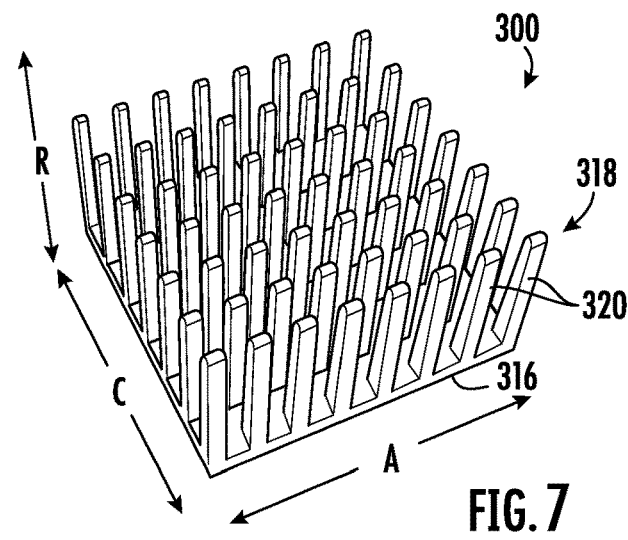
FIG. 7 is a schematic perspective view of a heat exchanger in accordance with yet another exemplary embodiment of the present disclosure.

More specifically, referring to FIG. 7, providing a perspective, partial view of a heat exchanger 300 in accordance with another exemplary embodiment of the present disclosure, in other exemplary embodiments the heat exchanger 300 may be a pin-fin heat exchanger 300. With such a configuration, the heat exchanger 300 includes a plate 316 and a plurality of fins 318 extending from the plate 316, the plurality of fins 318 are spaced along the circumferential direction C. However, for the exemplary heat exchanger 300 FIG. 7, the fins 318 are further separated into discrete "pins 320" spaced along the axial direction A. In such a manner, the fins 318 may create more turbulence in the airflow through the heat exchanger 300, increasing amount of heat exchange with the airflow through the heat exchanger 300.

Figures 8, 9, 10:
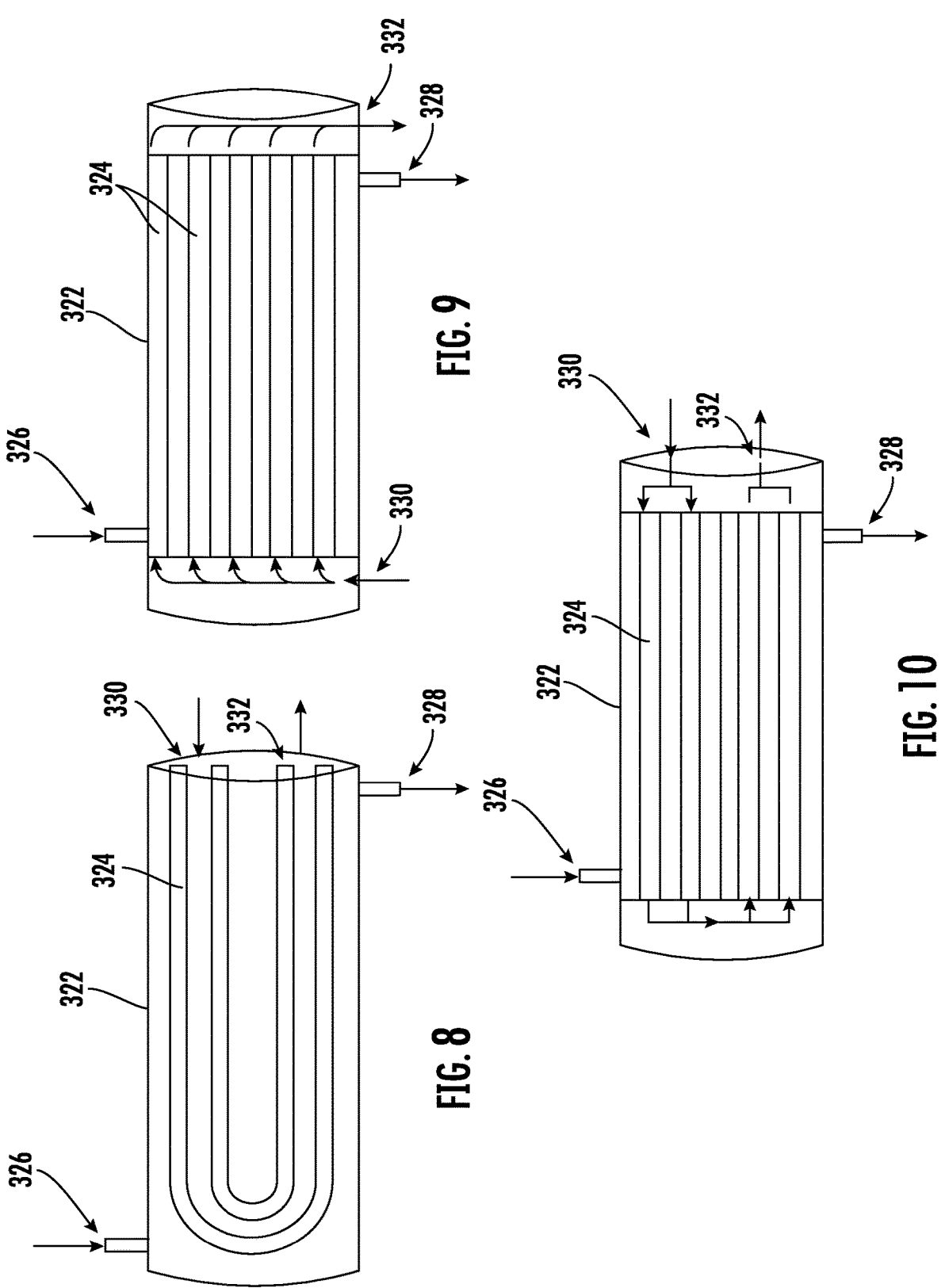
FIG. 8 is a schematic perspective view of a heat exchanger in accordance with yet another exemplary embodiment of the present disclosure.
FIG. 9 is a schematic perspective view of a heat exchanger in accordance with yet another exemplary embodiment of the present disclosure.
FIG. 10 is a schematic perspective view of a heat exchanger in accordance with yet another exemplary embodiment of the present disclosure.

Referring to FIGS. 8 through 10, schematic views of three separate heat exchangers are provided in accordance with various other exemplary embodiments of the present disclosure. More specifically, the heat exchangers 300 of FIGS. 8 through 10 are each configured as shell-and-tube heat exchangers. These heat exchangers 300 each include an outer shell 322 and one or more tubes 324 positioned within the outer shell 322. Further, the heat exchangers 300 each define a first fluid inlet 326 and a first fluid outlet 328 in flow communication with an interior of the outer shell 322, as well as a second fluid inlet 330 and a second fluid outlet 332 in flow communication with the one or more tubes 324. In FIG. 8, the heat exchanger 300 includes the one or more tubes 324 in a "U-tube" configuration. In FIG. 9, the heat exchanger 300 includes the one or more tubes 324 in a single pass configuration. In FIG. 10, the heat exchanger 300 includes the one or more tubes 324 in a double pass configuration.

Figure 11:
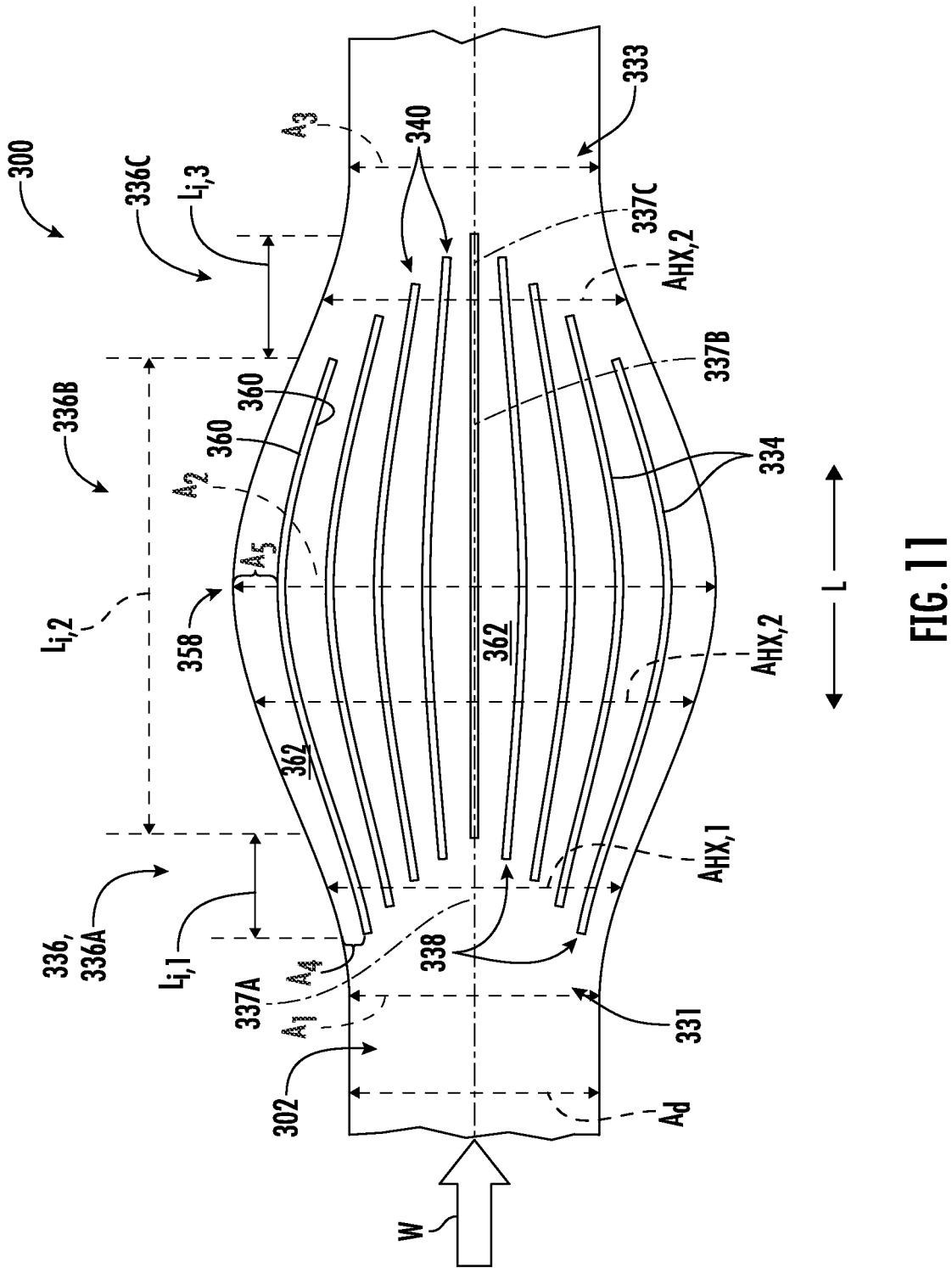
FIG. 11 is a schematic cross-sectional view of a heat exchanger in a flowpath in accordance with an exemplary embodiment of the present disclosure.

Referring now specifically to FIG. 11, a heat exchanger 300 in accordance with another exemplary embodiment of the present disclosure is provided. The view of FIG. 11 is a cross-sectional view of an "onion" heat exchanger 300 positioned in a flowpath 302. The heat exchanger 300 generally defines an inlet 330 at an upstream end and an outlet 333 at a downstream end. The heat exchanger 300 further includes a plurality of fins 334 extending generally lengthwise between the inlet 330 and the outlet 333.

Notably, the heat exchanger 300 of FIG. 11 differs from the heat exchangers 300 described hereinabove in that the heat exchanger 300 of FIG. 11 includes a plurality of discrete heat transfer sections 336 arranged in series. In particular, the heat exchanger 300 includes a first heat transfer section 336A, a second heat transfer section 336B, and a third heat transfer section 336C. As will be appreciated from the description herein, a heat transfer section refers to a portion of a heat exchanger having a unique heat transfer structural profile relative to an adjacent portion of the heat exchanger along a length of the heat exchanger, as well as a change in a cross-sectional area relative to the adjacent portion of the heat exchanger or an adjacent portion of a duct within which the heat exchanger is positioned.

The first heat transfer section 336A defines a first acoustic length $L_{i,1}$ in a lengthwise direction L of the heat exchanger 300 (and more specifically along a centerline 337A of the first heat transfer section 336A) and a first cross-sectional area, $A_{HX,1}$. The second heat transfer section 336B defines a second acoustic length $L_{i,2}$ in the lengthwise direction L of the heat exchanger 300 (and more specifically along a centerline 337B of the second heat transfer section 336B) and a second cross-sectional area, $A_{HX,2}$. The third heat transfer section 336C defines a third acoustic length $L_{i,3}$ in the lengthwise direction L of the heat exchanger 300 (and more specifically along a centerline 337C of the third heat transfer section 336C) and a third cross-sectional area, $A_{HX,3}$. The first cross-sectional area, $A_{HX,1}$ is an average (i.e., mean) cross-sectional area across the first acoustic length $L_{i,1}$. The second cross-sectional area, $A_{HX,2}$ is an average cross-section areal across the second acoustic length $L_{i,2}$. The third cross-sectional area, $A_{HX,3}$ is an average cross-section areal across the third acoustic length $L_{i,3}$. The first, second, and third cross-sectional areas at any given location may be calculated in the same manner as the heat exchanger flow area Ah described with reference to the embodiments above.

In the embodiment of FIG. 11, each of the fins 334 extend between an upstream end 338 and a downstream end 340. In the embodiment depicted, the upstream ends 338 of the fins 334 are staggered, such that the first heat transfer section 336A is characterized by a plurality of non-continuous fins 334 therethrough, in addition to an expanding cross-sectional area relative to a cross-sectional area of the flowpath 302 ("duct flow area", $A_d$) at a location immediately upstream of the inlet 330 to the heat exchanger 300.

The second heat transfer section 336B is characterized by continuous fins 334 therethrough, in addition to a diverging and converging cross-sectional area relative to the first cross-section area, $A_{HX,1}$.

Similar to the upstream ends 338, the downstream ends 340 of the fins 334 are also staggered, such that the third heat transfer section 336C is characterized by a plurality of non-continuous fins 334 therethrough, in addition to a converging cross-sectional area relative to the second cross-section area, $A_{HX,2}$ and a cross-sectional area of the flowpath 302 immediately downstream of the outlet 333 of the heat exchanger 300 (which is equal to the cross-sectional area of the flowpath 302 ($A_d$) at the location immediately upstream of the inlet 330 to the heat exchanger 300 for the embodiment depicted).

Figure 12:
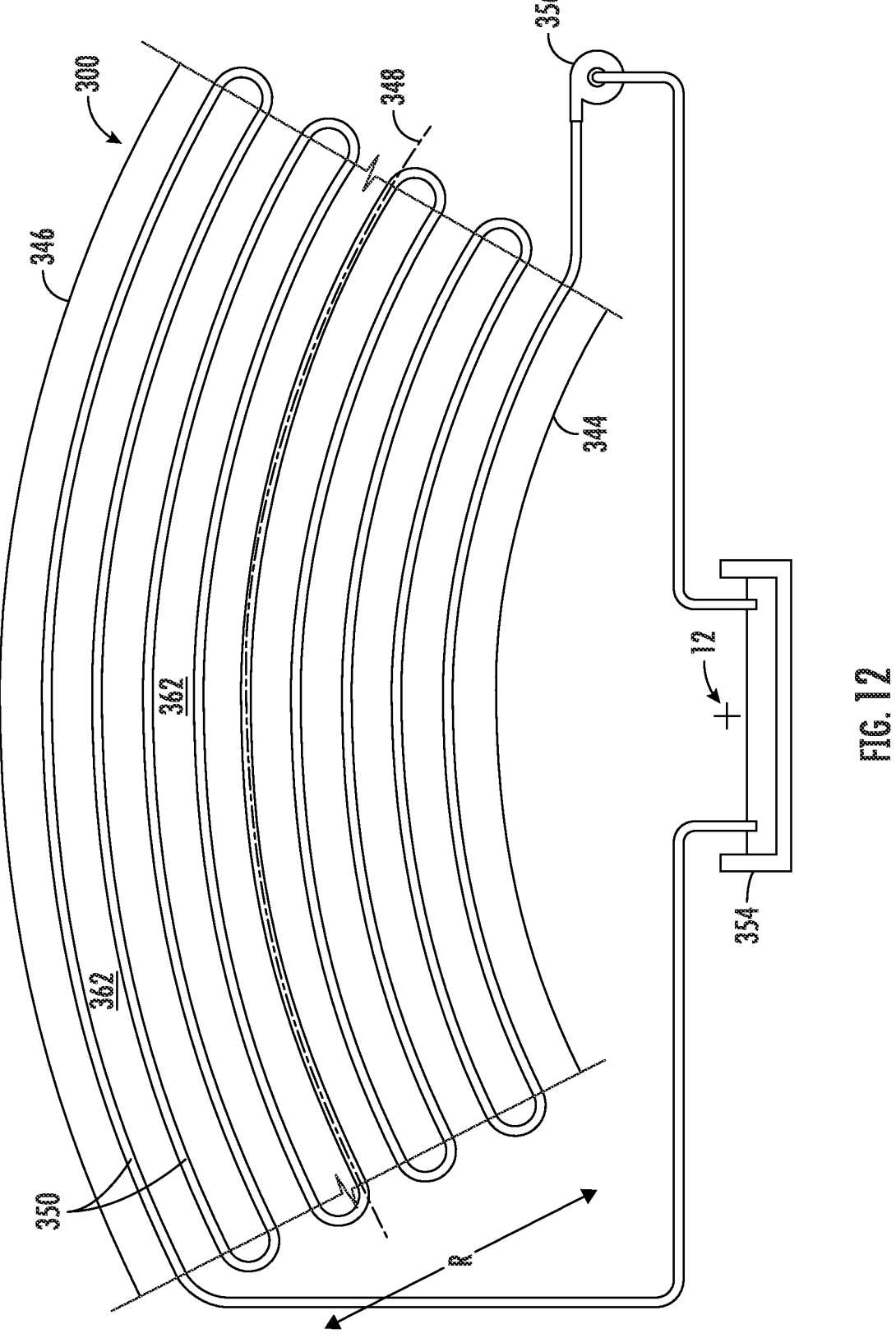
FIG. 12 is a cross-sectional view of the heat exchanger of FIG. 12.

Referring briefly to FIG. 12, the heat exchanger 300 includes an inner peripheral wall 344 and an outer peripheral wall 346 along the radial direction R, and may be configured as one or more partially or wholly arcuate bodies, formed by partial or complete revolution about an axis exterior to the peripheral walls 344, 346, for example the axial centerline 12. A midline 348 represents an abstract surface that divides the flow-orthogonal area between the inner and outer peripheral walls 344, 346 into two parts, which may have approximately equal flow areas.

Figure 13:
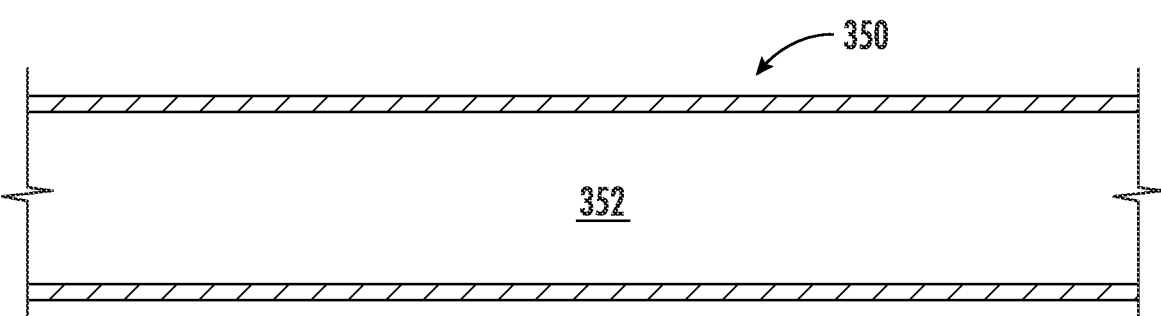
FIG. 13 is a partially sectioned view of a portion of a fin of the heat exchanger of FIG. 12.

Moreover, referring briefly also to FIG. 13, a heat transfer structure of the heat exchanger 300 may include one or more channels for conducting flow of a second fluid (e.g. oil, fuel or some other coolant). For example, FIG. 13 illustrates a small portion of a fin 334. The fin 334 incorporates a hollow inner passage 352 which can accommodate the flow of fluid. The inner passage 352 may be integral to the fin 334 or constructed as a separate component. It may take any of a number of shapes. FIG. 12 shows the fins 334 having the above-mentioned interior passages coupled to a circulating system which includes a reservoir 354, a pump 356, and appropriate interconnections such as pipes, manifolds, and/or valves (not labeled) to permit the circulation of the second fluid from the reservoir through the fins 334.

In operation, the first fluid flows through the flowpath 302 and over the fins 334. A second fluid circulates through the interior of the fins 334. For example, the second fluid may be supplied at a higher temperature than the first fluid. Depending upon the relative temperatures of the first and second fluids, heat is transferred either from the first fluid into the fins 334, then to the second fluid, or from the second fluid into the fins 334, then to the first fluid. As the first fluid flows from the inlet 331 to a belly 358 (FIG. 11; described below), it diffuses, reducing its velocity and increasing its static pressure. The fins 334 act as turning vanes, as well as diffuser walls, allowing the first fluid to diffuse without separating from the peripheral walls 344, 346. As the first fluid passes downstream, it is re-accelerated to an appropriate Mach number for the downstream flowpath. Analysis has shown that the heat exchanger 300 can achieve a pressure loss of less than 2% and a heat exchange rate equal to that of a prior art heat exchanger.

It will be appreciated that the inner passage 352 of each fin 334 may extend substantially along the length of the respective fin 334 in a fluid flow direction of the heat exchanger 300 (a fluid flow direction of the second fluid; e.g., the lengthwise direction L in FIGS. 11 through 13; as is indicated schematically with the hollow fins 334 in FIG. 11). For example, the inner passage 352 of each fin 334 may extend at least 70% of the length of the respective fin 334 in the fluid flow direction of the heat exchanger 300, such as at least 75%, such as at least 80%, such as at least 85%, such as at least 90%.

In addition, for the embodiment depicted, the fins 334 each extend continuously from their respective upstream ends 338 to their respective downstream ends 340. With such a configuration, the upstream ends 338 of one or more of the fins 334 may be positioned at a first location where flowpath begins to diverge (the flowpath 302 defining a constant height upstream of the first location) and the downstream ends 340 of one or more of the fins 334 may be positioned at a second location with the flowpath stops converging (the flowpath 302 defining a constant height downstream of the second location).

Referring back to FIG. 11, the heat exchanger 300 further defines a cross-sectional, flow area A1 at the inlet 331; a cross-sectional, flow area A2 at the belly 358; and a cross-sectional, flow area A3 at the outlet 333. The areas $A_1$, $A_2$, $A_3$ may be set to define a desired diffusion rate to suit a specific application. As one example, the flow area $A_2/A_1$ may be selected to achieve a desired Mach number at a belly 358 given a specific inlet Mach number. For example, the Mach number at the inlet 331 might be 0.5 (plus or minus 10%), and could be approximately for example 0.2 (plus or minus 10%) at the belly 358. The flow area $A_2$ may be greater than the flow area $A_1$. In one example, the flow area $A_2$ could be at least 30% greater than the flow area $A_1$. In another example, the flow area $A_2$ could be at least 50% greater than the flow area $A_1$. In yet another example, the flow area $A_2$ could be at least 100% greater than the flow area $A_1$, and up to 1000% greater.

In the illustrated example, the third flow area $A_3$ is less than the second flow area $A_2$, thus defining a nozzle or converging portion. The ratio of the flow areas $A_3/A_2$ and the rate of change between the two, that is, the profile shape of the peripheral walls 344, 346, may be selected to suit a specific application. For example, if the Mach number at the inlet 331 is 0.5, is for example 0.2 at the belly 358, the nozzle could be configured to re-accelerate the flow to Mach 0.5 (plus or minus 10%) at the outlet 333. As will be explained below relative to an alternative embodiment, the nozzle is desirable for certain applications, but is not required to achieve the functional benefit of the heat exchanger 300. Also, it is noted that a section of constant area (neither diffusing nor accelerating) may be positioned downstream of the belly 358).

Referring to the plurality of spaced-apart fins 334, each of the fins 334 has opposed side walls 360 extending between the upstream end 338 and the downstream end 340. The fins 334 subdivide the flowpath 302 into a plurality of generally parallel flow passages 362.

Each of the flow passages 362 has a flow area at its upstream end, designated "A4", and a flow area at the belly 358, designated "A5". The outermost passage is shown in the example in FIG. 11. The fins 334 are configured such that each flow passage 362 acts as a diffuser, or stated another way the flow area A5 is greater than the flow area A4. Analysis has shown that it is beneficial for reducing flow losses if the flow passages 362 are configured so as to have similar or equal diffusion ratios, or stated another way, for the ratio A5/A4 to be approximately equal for each flow passage 362. It is also beneficial for reducing flow losses if the flow passages 362 are configured so as to have similar or equal diffusion rates as defined above.

The fins 334 are shaped and sized so as to act as turning vanes, that is to turn the flow of the first fluid in an axial-radial plane (the plane depicted in FIG. 11) in a manner so as to prevent flow separation from the wall surfaces. The specific degree of flow turning will depend upon the shape of the mean line of the fins 334 and their angle of attack relative to the fluid flow.

Each of the fins 334 presents area blockage of the flowpath 302 equal to its frontal area. In order to mitigate the effect of the area blockage, the upstream ends 338 of the fins 334 may be arranged in a staggered configuration. In the illustrated example, the upstream ends 338 of the fins 334 adjacent the peripheral walls 344, 346 are positioned the most upstream or axially forward, with the upstream end 338 of each successive fin 334 proceeding towards the midline 348 being located downstream or axially aft from its outboard neighbor.

The staggered configuration may be arranged such that flow blockage of the fins 334 is introduced (considered from a flow point of view) at a rate similar to or less than the increase in flow area due to the divergence of the peripheral walls 344, 346.

For example, at the inlet 331, which is upstream of the upstream ends 338 of the outermost fins 334, the flow area is completely open (no fin blockage).

Downstream of the upstream ends 338 of the outermost fins 334, an increased flow area is defined between the peripheral walls 344, 346. At this downstream station, the flowpath 302 includes a blockage equivalent to the frontal area of the two most distal fins 334. The open flow area at this station is at least equal to the first flow area A1 plus the frontal area of the two most distal fins 334. A similar configuration is repeated at successive downstream locations to complete the staggered fin configuration. The illustrated stagger pattern is "V" shaped or chevron shaped, but other specific arrangements are possible.

The effect of the staggered fin location described above is that flow of the first fluid is always diffusing as it proceeds downstream from the inlet 331 to the belly 358.

In the illustrated example, the fins 334 are depicted as being arcuate, annular, or extending parallel to an axis. In essence, their shape variation is two-dimensional. It is physically possible to include fins which are oriented in a different direction than what is shown. For example, the fins could lie in an axial-radial plane. Alternatively, the fins could be oriented as shown but could additionally include stiffeners, supports, or dividers oriented in a different direction, such as an axial-radial plane. However, it will be understood that to achieve the maximum benefit of the concept described herein, the fins or other internal structure should be oriented generally parallel to the peripheral walls 344, 346 such that the diffuser effect can be maintained by manipulating the distance between the peripheral walls 344, 346 and the distance between the fins.

Optionally, structures such as waves, ripples, or ridges (not shown) along the exterior surfaces of the fins 334 could be included to create additional heat transfer surface area. If still more heat transfer surface area is required, secondary fins (not shown) running substantially perpendicular to the primary fin surfaces could be added to create passages with more heat transfer surface area.

The interior of at least one of the fins 334 includes a heat transfer structure. As used herein, the term "heat transfer structure" refers to a structure which functions to transfer heat energy from one area or region in contact with the heat transfer structure to another area or region which is also in contact with the heat transfer structure and which is spaced-away from the first area or region. Known heat transfer mechanisms include conduction, convection, and radiation. The heat transfer structure may use some or all of these heat transfer mechanisms.

In one example, the heat transfer structure may comprise a solid conduction element (not shown) disposed inside the fin 334 such as bars, rods, or plates having a high heat transfer coefficient. For example, a metal alloy such as copper or aluminum could be used for this purpose.

In another example, the heat transfer structure may comprise one or more heat pipes of a known type (not shown) disposed inside the fin 334.

It will be appreciated that in other exemplary embodiments, a heat exchanger may be provided having any suitable number of heat transfer sections defining respective acoustic lengths and cross-sectional areas. For example, the heat exchanger may define a single heat transfer section, two heat transfer sections (see, e.g., FIG. 20), three heat transfer sections, four heat transfer sections, five heat transfer sections (see, e.g., FIG. 21), etc.

In such a manner, it will be appreciated that the heat exchangers 300 of FIGS. 8 through 13 may be arranged in a parallel flow configuration where the second fluid flows in the same direction as the first fluid (see, e.g., FIG. 9), in a counter flow configuration where the second fluid flows in an opposite direction than the first fluid, or in a combination of parallel and counter-flow configurations (see, e.g., FIGS. 8 and 11).

As will also be appreciated, each of the heat exchangers 300 are configured to transfer heat from a heating fluid (e.g., the fluid rejecting heat) to a cooling fluid (e.g., the fluid accepting heat). By way of example, when the heat exchanger 300 is integrated into the engine 100 of FIG. 2, e.g., in the fan duct 172 as heat exchanger 200, the cooling fluid may be an airflow through the fan duct 172 and the heating fluid may be, e.g., compressor bleed air (an air-to-air heat exchanger), fuel (a fuel-to-air heat exchanger), or lubrication oil (an oil-to-air heat exchange).

As alluded to earlier, standard practice has been to optimize the heat exchanger for a flight idle (or other condition) then, after selecting an optimal heat exchanger, verifying whether it will operate in an acceptable manner across a flight envelop from a heat transfer perspective. Further, the inventors have found that it would also be beneficial to verify whether it will operate in an acceptable manner across a flight envelop from the perspective of noise produced when air flows through an annular duct. This can be a labor and time intensive process because the process is iterative and involves the selection of a heat exchanger designed for flight idle and embodying a heat effectiveness with acceptable pressure drop, then evaluating whether at other times in flight (non-flight idle) the annular duct location produces unacceptable levels of noise (or rather allows for an unacceptable level of noise to pass therethrough), thereby necessitating re-design of the heat exchanger to increase the acoustic transmission loss for air passing through the annular duct. That is, the heat exchanger is selected according to a size, type, etc. before a heat exchanger is found that satisfies all three key requirements: heat transfer, acceptable pressure drop, and acceptable noise generation across all flight conditions. It would be desirable to have a limited or narrowed range of embodiments defined for an engine architecture satisfying mission requirements, such requirements including heat transfer, pressure ratio, and noise transmission level requirements at the time a heat exchanger is selected and located within an engine.

The inventors discovered, unexpectedly during the course of engine design—i.e., designing heat exchangers and evaluating the impact that the heat exchangers would have on the acoustic environment at off-design points, which is the time-consuming iterative process just described—a relationship between an expected noise transmission loss for the heat exchanger and the heat transfer capabilities for a given level of pressure drop across the heat exchanger. The pressure drop is incorporated into the parameter UA, as it is a function of a porosity, which is a function of the area, A. Utilizing this relationship the inventors found that the number of suitable or feasible heat exchangers to be positioned in a substantially annular duct of an engine capable of meeting both the heat transfer requirements and acoustic requirements could be greatly diminished, thereby facilitating a more rapid down selection of designs to consider as an engine is being developed. Such benefit provides more insight to the requirements for a given engine well before specific technologies, integration and system requirements are developed fully. It avoids late-stage redesign. And it also provides heat exchanger design that integrates both acoustic and heat exchanger considerations for a gas turbine engine for an aircraft given its unique environments. The desired relationship is represented by an Effective Transmission Loss ("ETL"):

$$ETL = C_1 e^{-C_2\left(\frac{EOC-UA}{C_3}\right)} \qquad \text{Equation (1)}$$

Where $C_1$, $C_2$, and $C_3$ are constants that depend on the mass flow rate through the annular duct. EOC accounts for factors influenced by engine sizing and operating conditions, explained in greater detail, below. Constants $C_1$, $C_2$, and $C_3$ and EOC each depend on the flight condition, and more specifically depend on a mass flow rate of an airflow through the annular duct occupied by the heat exchanger ("W"). The ETL represents a level of transmission loss (in units of decibels, dB) that can be expected from a heat exchanger for a given mass flow rate, W, and UA. A more detailed fluid model may also be desired at a later point to determine more exactly a transmission loss for a specific flight condition once the engine architecture is more fully defined. The mass flow rates of interest, for purposes of the ETL, are characterized as low, medium, and high mass flow rate conditions. The lowest mass flow rate may correspond to a low power operating condition of the engine (e.g., ground idle, flight idle), the medium mass flow rate may correspond to a medium power operating condition (e.g., cruise or descent), and the high mass flow rate may correspond to a high power operating condition (e.g., a takeoff operating condition or climb operating condition).

TABLE 1 provides values for $C_1$, $C_2$, and $C_3$ and EOC for three flight regimes, defined in terms of mass flow rates through the annular duct where the heat exchanger is located:

TABLE 1

| | $0 < W < 50$ lbm/s | $50$ lbm/s $< W <$ $150$ lbm/s | $150$ lbm/s $< W <$ $300$ lbm/s |
|---|---|---|---|
| $C_1$ | 19.22 | 19.64 | 21.02 |
| $C_2$ | 0.222 | 0.67 | 0.027 |
| $C_3$ | 956.3 | 298 | 107 |
| EOC | 41,467 to 19,965 | 52,809 to 16,677 | 50,347 to 12,587 |

$C_1$, $C_2$, and $C_3$ and EOC reflect the variation in the mass flow through the annular duct of the engine during a variety of operating conditions—generally the low power operating condition, the medium power operating condition, and the high power operating condition—as stated above. EOC additionally accounts for variability based on a specific engine operating condition within each of these flow regimes (low/med/high). EOC accounts for such factors as the specific engine type operating in the flow regime, expected variation in transient thrust, ambient conditions, tolerances and/or engine cycles or degradation, all of which may have some influence on the transmission loss for flow passing through a heat exchanger located in an annular duct. It will be realized, based on the teachings herein, ETL, for the ranges of EOC expressed, provides to a good approximation the available heat exchanger design options suited to meet mission requirements, both from a thermal management and acoustics perspective. More accurate knowledge on transmission loss may latter be gathered, if desired, by performing a full 3D CFD analysis of the acoustic field. This level of analysis may not be necessary, however, when the purpose is to assess the acoustic environment at an off-design point before proceeding with optimization of a heat exchanger. As alluded to above, ETL eliminates infeasible designs at an early stage, before the heat exchanger located in an annular duct is optimized. In one respect therefore ETL may be viewed as an alternative to performing a full-blown 3D CFD analysis of a flow field prior to heat exchanger optimization within an annular duct.

Moreover, it will be appreciated that transmission loss through a heat exchanger is further influenced by the length of the heat exchanger, the porosity of the heat exchanger, a pressure drop across the heat exchanger, the mass flow rate through the annular duct in which the heat exchanger is positioned, and the power spectral density (PSD) distribution of the air immediately upstream of the heat exchanger.

For example, in general as the length of the heat exchanger increases, the amount of acoustic transmission loss also increases. This factor influences the value for $C_2$. The length of the heat exchanger, sometimes also referred to as channel length, directly influences a volume (along with an area of the heat exchanger) for the fluid to pass through. With an increased volume, the amount of transmission loss generally also increases.

The pressure drop across the heat exchanger is incorporated into Equation 1 (ETL) through the UA parameter, as noted above. The ETL contemplates a maximum pressure drop of 15%, such as up to 10% and at least 1%. Generally, as the area of the heat exchanger increases (and as the porosity of the heat exchanger increases), a pressure drop will also increase. Typically, higher pressure drops are also associated with more heat transfer. However, a pressure drop above these levels may impact a thrust produced by the airflow through the duct too much to justify the thermal benefits.

More specifically, it was found that for low power operating conditions (e.g., for flow rates less than or equal to about 50 lbm/s), an ETL of between 1 and 5 dBs may be achieved with a relatively low pressure drop, such as a pressure drop of less than or equal to about 5%, such as less than or equal to about 2.5%. It was also found that for medium power operating conditions (e.g., for flow rates greater than or equal to about 50 lbm/s and less than or equal to about 150 lbm/s), an ETL of between 1 and 5 dBs may be achieved with a pressure drop within design limits, such as less than or equal to about 15% (and, e.g., greater than or equal to about 2%). It was further found that for high power operating conditions (e.g., for flow rates greater than or equal to about 150 lbm/s and less than or equal to about 300 lbm/s), an ETL of between 1 and 3 dBs can be achieved while maintaining the pressure drop less than about 15%. As described above, the pressure drop is a function of UA, as it is a function of the area of the heat exchanger. It was found that with the higher mass flow rates, the effect of heat exchanger area on pressure drop increases, resulting in more pressure drop for a given amount of ETL as compared to lower mass flow rate.

The PSD is determined from the upstream fan or turbine characteristics (e.g., the mid-fan 184 upstream of heat exchanger 200 in FIG. 2, or turbine 134 upstream of heat exchanger 140 in FIG. 2) and specifically, those upstream characteristics producing a PSD distribution over frequency bands where it has been found that a majority of the noise is typically produced during an engine mission segment, e.g., during takeoff. Noise characteristics associated with an upstream fan are expressed in terms of a blade passing frequency, which with respect to the upstream fan is defined as the rotations per second of an immediately upstream fan or turbine multiplied by a number of fan blades of the immediately upstream fan or rotor blades in an immediately upstream turbine stage, respectively. For example, referring to the embodiment shown in FIG. 2, the blade passing frequency for the noise source associated with the heat exchanger 200 located in the third stream annular duct, or rather the fan flow duct 172, would be found from the rotations per second of the fan 184 multiplied by the number of blades for the fan 184. In another example, referring still to the embodiment shown in FIG. 2, the blade passing frequency for the noise source associated with the heat exchanger 200 located in the aft frame would be found from the rotations per second of the low pressure turbine 134 multiplied by the number of turbine rotor blades associated with the aft-most stage of the lower pressure turbine 134.

Figures 16, 17:
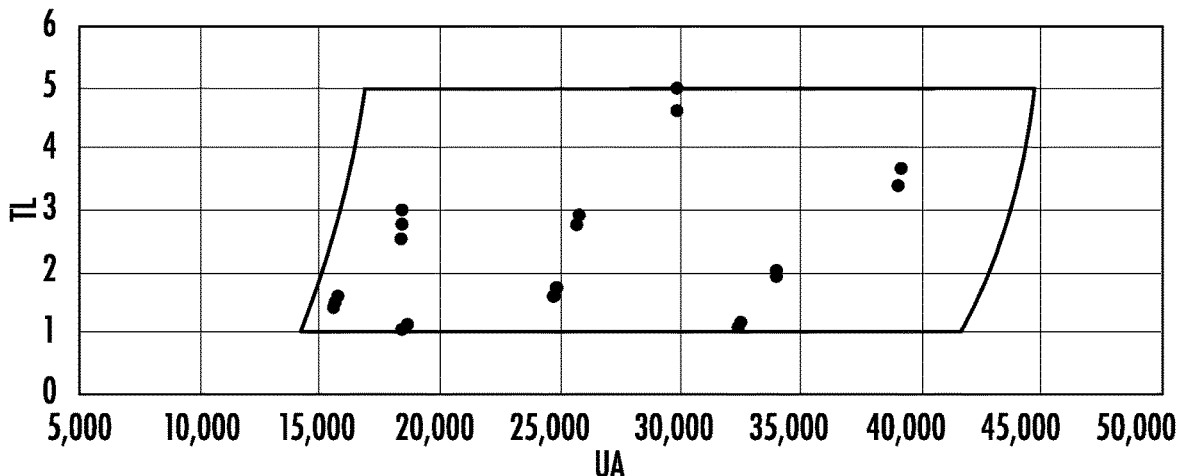
FIG. 16 is a plot of heat exchangers in accordance with one or more exemplary embodiments of the present disclosure, showing the relationships between the ETL and UA for a medium mass flow rate.
FIG. 17 provides a table including numerical values corresponding to several of the plotted ETL values in FIG. 16.

Sound transmission through the heat exchanger is generally the byproduct of many complex interactions between sound waves and interior surfaces of the heat exchanger, which generally requires a detailed fluid modeling of air traveling through the heat exchanger to fully assess the sound transmission environment for a specific flight condition (e.g., takeoff or full power flight condition), as mentioned earlier. Moreover, the fan or rotor speed that produces the most noise may not necessarily occur when an engine is operating at full power. As such, noise environments are generally modeled for a variety of flight conditions, not merely at a full power condition. Nonetheless, the inventors discovered that there are indeed assumptions that can be made on the level of transmission loss that can be expected for a heat exchanger (optimized for flight idle conditions) during the other, non-flight idle periods of flight where the most noise is produced. As a result, feasible embodiments of a heat exchanger for given engine operating environments may be found, using the ETL, satisfying both thermal and acoustics requirements. These embodiments of a heat exchanger take into account the competing interests associated with transmission loss needs, maximum acceptable pressure drop and heat transfer efficiency. With embodiments defined in this manner, a substantial amount of heat exchanger re-design may be avoided, as alluded to earlier. For example, a heat exchanger located in an annular duct is optimized for engine performance during flight idle conditions. When the engine is later evaluated for its acoustic performance, e.g., using a 3D CFD analysis, it is discovered that the configuration does not produce an adequate amount of transmission loss when air passes through the annular duct. Such a heat exchanger would then need to be re-designed because there is too much noise generated ETL was found by evaluating the effects on transmission loss and overall heat exchanger effectiveness for different levels of pressure drop, the geometry of the heat exchanger and its relation to transmission loss. Based on these relationships it was discovered that the ETL for a heat exchanger can predict to a good approximation the transmission loss expected for a given mass flow rate through the heat exchanger, as a function of UA and the general properties of the heat exchanger, as set forth in TABLE 2, which define the operating environments and heat exchanger properties used to find the ETL. Thus, with a heat exchanger located in an annular duct and defined within these ranges, the ETL can predict the transmission loss from the heat exchanger for a prescribed mass flow rate and UA.

including numerical values corresponding to several of the plotted ETL values in FIG. 16. And FIG. 18 is a plot of heat exchangers in accordance with one or more exemplary embodiments of the present disclosure, showing the relationships between the ETL and UA for a high mass flow rate and FIG. 19 provides a table including numerical values corresponding to several of the plotted ETL values in FIG. 18.

Figures 14, 15:
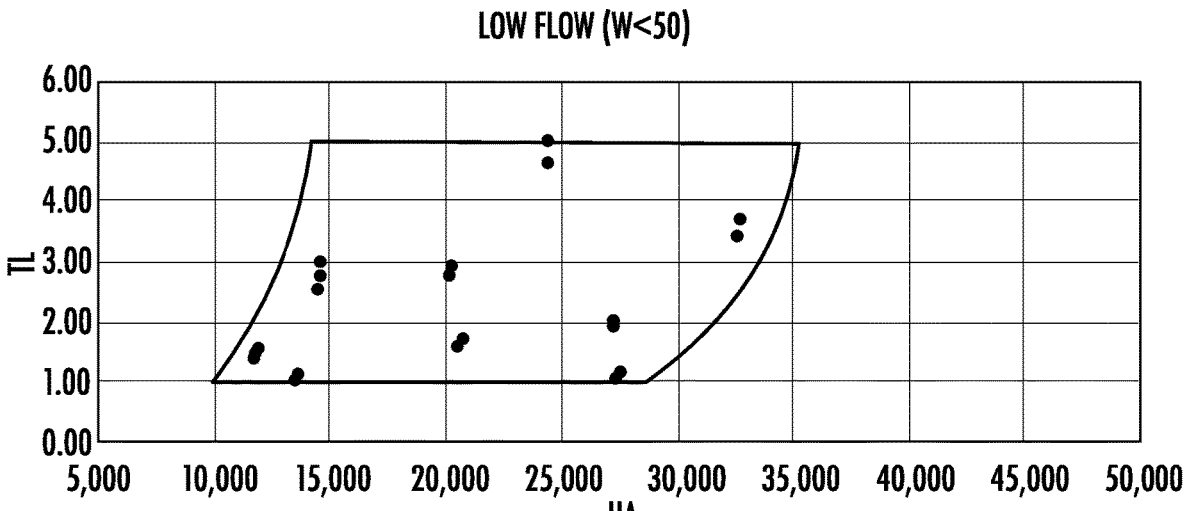
FIG. 14 is a plot of heat exchangers in accordance with one or more exemplary embodiments of the present disclosure, showing the relationships between the ETL and UA for a low mass flow rate.
FIG. 15 provides a table including numerical values corresponding to several of the plotted ETL values in FIG. 14.

In each of FIGS. 14, 16, and 18, the solid lines enveloping the embodiments express the ranges for TL and UA, as provided by the range of variable EOC. The TL range is 5 decibels down to 1 decibel. The UA range varies between the low, medium, and high mass flow rates, but is generally between 7,500 and 45,000 Btu/(hr-° F.). The embodiments within this range include embodiments of heat exchangers having lengths (measured in flow direction, which according to the embodiments corresponds to a cold-flow length property of the heat exchanger) between 3 inches and 9 inches, and heat exchanger porosity between 23% and 51%.

The present disclosure is not limited to heat exchangers within the ranges in the embodiment depicted in FIGS. 14 through 9. For example, in other embodiments, a heat exchanger of the present disclosure may be, e.g., up to 15 inches in length, and may define a porosity up to 80%.

TABLE 2

| Symbol | Description | Ranges appropriate for using Eq. (1) |
|---|---|---|
| UA | Product of the overall heat transfer coefficient (U; in "Btu/( hr × ft² × ° F.)") for the heat exchanger and interior surface area (A; in "ft²") of the heat exchanger in units: Btu/(hr-° F.). | 7500 < UA < 45000, such as 10000 < UA < 35000 (low power); 14000 < UA < 45000 (medium power); and 15000 < UA < 44000 (high power). |
| Delta-P/P | Ratio of change in pressure to total pressure (%) representing maximum allowable pressure drop across heat exchanger | <15%, such as <10%, such as <8%, such as >1% |
| L | Length of heat exchanger (in) | 3 inches to 15 inches, such as 4 inches to 9 inches |
| Po | Porosity | 20% to 80%, such as 30% to 55% |
| F | Fan passing frequency (RPM/60 * number of blades) | 1 kHz to 5 kHz |
| W | Mass flow rate | See TABLE 1. |

It will be appreciated from, e.g., Equation (1) and the units provided for the parameters in TABLE 2, the units for $C_1$, $C_2$, and $C_3$ and EOC are such that ETL is provided in dB's (as noted above and discussed throughout). For example, the units for $C_1$ may be dB's, $C_2$ may be unitless, and $C_3$ and EOC may each be in the same units as UA (i.e., Btu/(hr-° F.)).

FIGS. 14 through 19 illustrate heat exchangers in accordance with one or more exemplary embodiments of the present disclosure, showing the relationships between the ETL and UA. In particular, FIG. 14 is a plot of heat exchangers in accordance with one or more exemplary embodiments of the present disclosure, showing the relationships between the ETL and UA for a low mass flow rate and FIG. 15 provides a table including numerical values corresponding to several of the plotted ETL values in FIG. 14. FIG. 16 is a plot of heat exchangers in accordance with one or more exemplary embodiments of the present disclosure, showing the relationships between the ETL and UA for a medium mass flow rate and FIG. 17 provides a table This disclosure is directed to heat exchangers in annular ducts where an upstream fan, compressor or turbine generates gas flow through a duct leading to the heat exchanger. For noise attenuation targeted operating conditions, i.e., flight segment where an undesired level of noise is generated, one may make modifications to one or more of the heat exchanger's "acoustic length" (as defined herein) to increase the ETL for that flight segment, that is, to specifically target noise attenuation for a specific flight segment. It was found, in connection with ETL, that this type of targeted noise attenuation may be achieved by selecting an acoustic length for a blade passing frequency associated with the flight segment. While this can result in less heat transfer efficiency due to the adjusted acoustic length, it was discovered unexpectedly that the impact was not significant. Utilizing the ETL in combination with this "tuning" of an acoustic length to a flight segment resulted in higher levels of attenuation for the targeted flight segment.

Utilizing this relationship the inventors found that an engine may be designed to utilize a heat exchanger in a substantially annular duct of the engine to achieve a desired noise level during a particular flight operation that may not otherwise be achievable absent other non-desirable structural or control changes to the engine, and while satisfying the heat transfer efficiencies needed from the heat exchanger. In addition, inventors found that utilizing this relationship, the number of suitable or feasible heat exchangers to be positioned in a substantially annular duct of an engine capable of meeting both the heat transfer requirements and acoustic requirements could be greatly diminished, thereby facilitating a more rapid down selection of designs to consider as an engine is being developed. Such a development may therefore avoid late-stage redesign. And it also provides heat exchanger design that integrates both acoustic and heat exchanger considerations for a gas turbine engine for an aircraft given its unique environments. The relationship between an acoustic length $L_i$ and the a given operating condition of the engine is represented by an Operational Acoustic Reduction Ratio (OARR), as follows:

$$\left( \sin\left( \frac{2 \times \pi \times f}{a} \times L_i \right) \right)^2$$

where f is the blade passing frequency at the operating condition in hertz, a is the speed of sound of the airflow through the heat transfer section of the heat exchanger in inches per second, and $L_i$ is the acoustic length of the heat transfer section of the heat exchanger in inches. The highest level of ETL for the targeted flight operating condition occurs when OARR is equal to 1. For a heat exchanger that has more than one heat transfer section and associated acoustic length, it was found that the influence on noise attenuation by the heat exchanger's other heat transfer sections having their own acoustic lengths (e.g., in the case of an onion heat exchanger) was minimal. As a consequence, it was concluded that the influence on downstream noise by the other heat transfer sections could be ignored.

For example, at the high power operating condition, the blade passing frequency f may be greater than or equal to 600 hertz and less than or equal to 12,500 hertz. Notably, the blade passing frequency may refer to a blade passing frequency of the primary fan of the engine (e.g., fan 152 in FIG. 2). Noise generated by a plurality of blades operating above this speed range may not be audible by humans and thus is of less concern. The speed of sound, a, at the various operating conditions and at various locations within the engine is provided in Table 3, below. Notably, in practice, the actual speed of sound may vary from the values listed in Table 3. However, the values listed in Table 3 for the respective operating conditions and respective locations represent expected conditions for the disclosed subject matter in which the engines and heat exchangers may operate. For the purposes of determining OARR for a heat exchanger that can achieve the benefits described herein, the speed of sound, a, may be considered a constant having the values listed in Table 3.

TABLE 3

| | High Power Operating Condition | Low Power Operating Condition | Medium Power Operating Condition |
|---|---|---|---|
| $a_{Amb}$ | 13,200 inches per second (hereinafter, $a_{1,Amb}$) | 12,900 inches per second (hereinafter, $a_{2,Amb}$) | 11,640 inches per second (hereinafter, $a_{3,Amb}$) |

TABLE 3-continued

| | High Power Operating Condition | Low Power Operating Condition | Medium Power Operating Condition |
|---|---|---|---|
| $a_{Hot}$ | 25,360 inches per second (hereinafter, $a_{1,Hot}$) | 24,756 inches per second (hereinafter, $a_{2,Hot}$) | 30,924 inches per second (hereinafter, $a_{3,Hotb}$) |
| $a_{Cold}$ | 24,528 inches per second (hereinafter, $a_{1,Cold}$) | 19,824 inches per second (hereinafter, $a_{2,Cold}$) | 22,440 inches per second (hereinafter, $a_{3,Cold}$) |

As will be appreciated, the speed of sound of the airflow through the heat transfer section of the heat exchanger is dependent at least in part on a location in which the heat exchanger is positioned within the engine. For example, the heat exchanger may be positioned at an ambient location, within a cold location of the engine, or within a hot location of the engine. The ambient location, having a speed of sound represented by "$a_{Amb}$" in Table 3 (and more specifically by $a_{1,Amb}$, $a_{2,Amb}$, $a_{3,Amb}$ for the high power, low power, and medium power operating conditions) refers to an engine location for a heat exchanger where the heat exchanger is exposed to ambient airflow or bypass airflow (e.g., bypass passage 48 in FIG. 1, or an airflow over fan cowl 170 in FIG. 2). The hot location, having a speed of sound represented by "$a_{Hot}$" in Table 3 (and more specifically by $a_{1,Hot}$, $a_{2,Hot}$, $a_{3,Hot}$ for the high power, low power, and medium power operating conditions) refers to an engine location for a heat exchanger where the heat exchanger is exposed to an airflow through a working gas flowpath of the engine at a location downstream of a combustion section of the engine (e.g., within an exhaust section of the engine, such as exhaust section 32 in FIG. 1). The cold location, having a speed of sound represented by "$a_{Cold}$" in Table 3 (and more specifically by $a_{1,Cold}$, $a_{2,Cold}$, $a_{3,Cold}$ for the high power, low power, and medium power operating conditions) refers to an engine location for a heat exchanger where the heat exchanger is exposed to an airflow inward of a bypass passage of the engine and upstream of a combustion section of the engine (e.g., within a compressor section of the engine, or within a third stream (such as fan duct 172 of FIG. 2) of an engine).

The speed of sound of the airflow through the heat transfer section of the heat exchanger is further dependent at least in part on the operating temperature of the engine and the altitude of the engine. The variations in Table 3 in the different operating conditions, i.e., the high power, low power, and medium power operating conditions, accounts for these variables.

For example, referring back to FIG. 11, the first heat transfer section may be tuned to attenuate noise through the annular duct during the high power operating condition. As such, OARR may be greater than or equal to 0.75 during the high power operating condition. In particular, OARR may be greater than or equal to 0.85, such as greater than or equal to 0.9, such as greater than or equal to 0.95.

Notably, OARR may vary between 0 and 1. When the heat transfer section is perfectly tuned to attenuate noise at the operating condition, OARR is equal to 1. And when the heat transfer section is perfectly de-tuned from attenuating noise at the operating condition, OARR approaches 0. Accordingly, it will be appreciated that length $L_i$ of the heat transfer section may be chosen such that OARR may be maximized over the expected range of blade passing frequencies for the high power operating condition.

By contrast, however, it will be appreciated that the length $L_i$ of the first heat transfer section would be de-tuned for the other operating conditions, such as during a second operating condition. For example, the engine may be operable at a low power operating condition, wherein the blade passing frequency is greater than or equal to 300 hertz and less than or equal to 6,300 hertz. OARR for the heat transfer section having the length $L_i$ may be less than or equal to 0.25 when the engine is operated at the low power operating condition.

In such a manner, it will be appreciated that the heat transfer section of the heat exchanger may be tuned for noise attenuation at the first operating condition (e.g., high power operating condition) and de-tuned from attenuating noise at the second operating condition (e.g., low power operating condition). Such may allow the engine to target noise attenuation, e.g., at a takeoff operating condition to reduce community noise. In particular, with such a configuration the heat exchanger may be capable of achieving a desired ETL at the first operating condition.

An example of a heat exchanger having only one heat transfer section or acoustic length, for purposes of ETL and OARR, would be the heat exchanger of FIG. 5 where the acoustic length is the length of the heat exchanger in the flow direction, and the cross-sectional area change (relative to the upstream duct) is the cross sectional area that is approximately unchanged from inlet to outlet of the heat exchanger.

Notably, at least certain heat exchangers include multiple heat transfer sections (see, e.g., FIG. 11), with the different heat transfer sections tuned to different operating conditions. With such a configuration, the heat transfer section discussed above may be a first heat transfer section and the acoustic length $L_i$ discussed above may be a first acoustic length ($L_{i,1}$). The heat exchanger may further include a second heat transfer section defining a second acoustic length ($L_{i,2}$). The second heat transfer section may define an OARR greater than or equal to 0.75 during a second operating condition, different than the first operating condition, as follows:

$$\left(\sin\left(\frac{2 \times \pi \times f_2}{a_2} \times L_{i,2}\right)\right)^2$$

where $f_2$ is the blade passing frequency at the second operating condition, $L_{i,2}$ is the second acoustic length, as noted above, and $a_2$ is the speed of sound at the second operating condition. The second operating condition may be a low power operating condition, wherein the blade passing frequency is greater than or equal to 300 hertz and less than or equal to 6,300 hertz.

The OARR for the second heat transfer section during the second operating condition may be greater than or equal to 0.85, such as greater than or equal to 0.9, such as greater than or equal to 0.95.

With such a configuration, the heat exchanger may be capable of achieving a higher desired ETL for both the first operating condition and the second operating condition.

Notably, in still other exemplary embodiments, the heat exchanger may include a third heat transfer section tuned to a third operating condition. The third heat transfer section may define an OARR greater than or equal to 0.75 during the third operating condition, different than the first and second operating conditions, as follows:

$$\left(\sin\left(\frac{2 \times \pi \times f_3}{a_3} \times L_{i,3}\right)\right)^2$$

where $f_3$ is the blade passing frequency at the third operating condition, $L_{i,3}$ is the third acoustic length, as noted above, and $a_3$ is the speed of sound at the third operating condition. The third operating condition may be a medium power operating condition, wherein the blade passing frequency is greater than the blade passing frequency at the second operating condition and less than the blade passing frequency at the first operating condition, such as greater than or equal to 500 hertz and less than or equal to 12,500 hertz.

With such a configuration, the heat exchanger may be capable of achieving a desired ETL at the first, second, and third operating conditions.

As will be appreciated from the description herein, embodiments of a gas turbine engine, such as an unducted, single rotor gas turbine engine, are provided. Some embodiments of engines that include a heat exchanger located in an annular duct and considered within the scope of this disclosure, may further include one or more of the following characteristics. A threshold power or disk loading for the fan (e.g., fan 154) may range from 25 horsepower per square foot ($hp/ft^2$) or greater at cruise altitude during a cruise operating mode. In particular embodiments of the engine, structures and methods provided herein generate power loading between 80 $hp/ft^2$ and 160 $hp/ft^2$ or higher at cruise altitude during a cruise operating mode, depending on whether the engine is an open rotor or ducted engine. In various embodiments, the engine is applied to a vehicle with a cruise altitude up to approximately 65,000 ft. In certain embodiments, cruise altitude is between approximately 28,000 ft and approximately 45,000 ft. In still certain embodiments, cruise altitude is expressed in flight levels based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 psia and approximately 0.82 psia based on a sea level pressure of approximately 14.70 psia and sea level temperature at approximately 59 degrees Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature.

Further, in certain exemplary embodiments, the fan assembly may define a rotor diameter (or fan diameter) of at least 10 feet, such as at least 11 feet, such as at least 12 feet, such as at least 13 feet, such as at least 15 feet, such as at least 17 feet, such as up to 28 feet, such as up to 26 feet, such as up to 24 feet, such as up to 18 feet. Additionally, with respect to the embodiment of FIG. 2, a ratio R1/R2 may be between about 1 and 6, or 2 and 4, or about 1.5 to 3 where R1 is the span from root to tip for fan blade 154 and R2 is the span from root to tip for fan 184 in FIG. 2.

It should be appreciated that various embodiments of the engine, such as the single unducted rotor engine depicted and described herein, may allow for normal subsonic aircraft cruise altitude operation at or above Mach 0.5. In certain embodiments, the engine allows for normal aircraft operation between Mach 0.55 and Mach 0.85 at cruise altitude. In still particular embodiments, the engine allows for normal aircraft operation between Mach 0.75 and Mach 0.85. In certain embodiments, the engine allows for rotor blade tip speeds at or less than 750 feet per second (fps).

Still further, certain embodiments of the engine provided herein may allow for normal subsonic aircraft cruise altitude operation at or above Mach 0.5, or above Mach 0.75, based on structures provided herein. In certain embodiments, the engine allows for normal aircraft operation between Mach 0.55 and Mach 0.85, or between Mach 0.75 to Mach 0.85 at cruise altitude. In certain embodiments, the engine allows for rotor blade tip speeds at or less than 750 feet per second (fps). Still particular embodiments may provide such benefits with reduced interaction noise between the blade assembly and the vane assembly and/or decreased overall noise generated by the engine by virtue of structures located in an annular duct of the engine. Additionally, it should be appreciated that ranges of power loading and/or rotor blade tip speed may correspond to certain structures, core sizes, thrust outputs, etc., or other structures at the core engine and the fan assembly. However, as previously stated, to the extent one or more structures provided herein may be known in the art, it should be appreciated that the present disclosure may include combinations of structures not previously known to combine, at least for reasons based in part on conflicting benefits versus losses, desired modes of operation, or other forms of teaching away in the art.

Moreover, it will be appreciated that the exemplary heat exchangers described above are provided by way of example only. In other exemplary embodiments, a heat exchanger of the present disclosure may have other suitable configurations.

Figure 20:
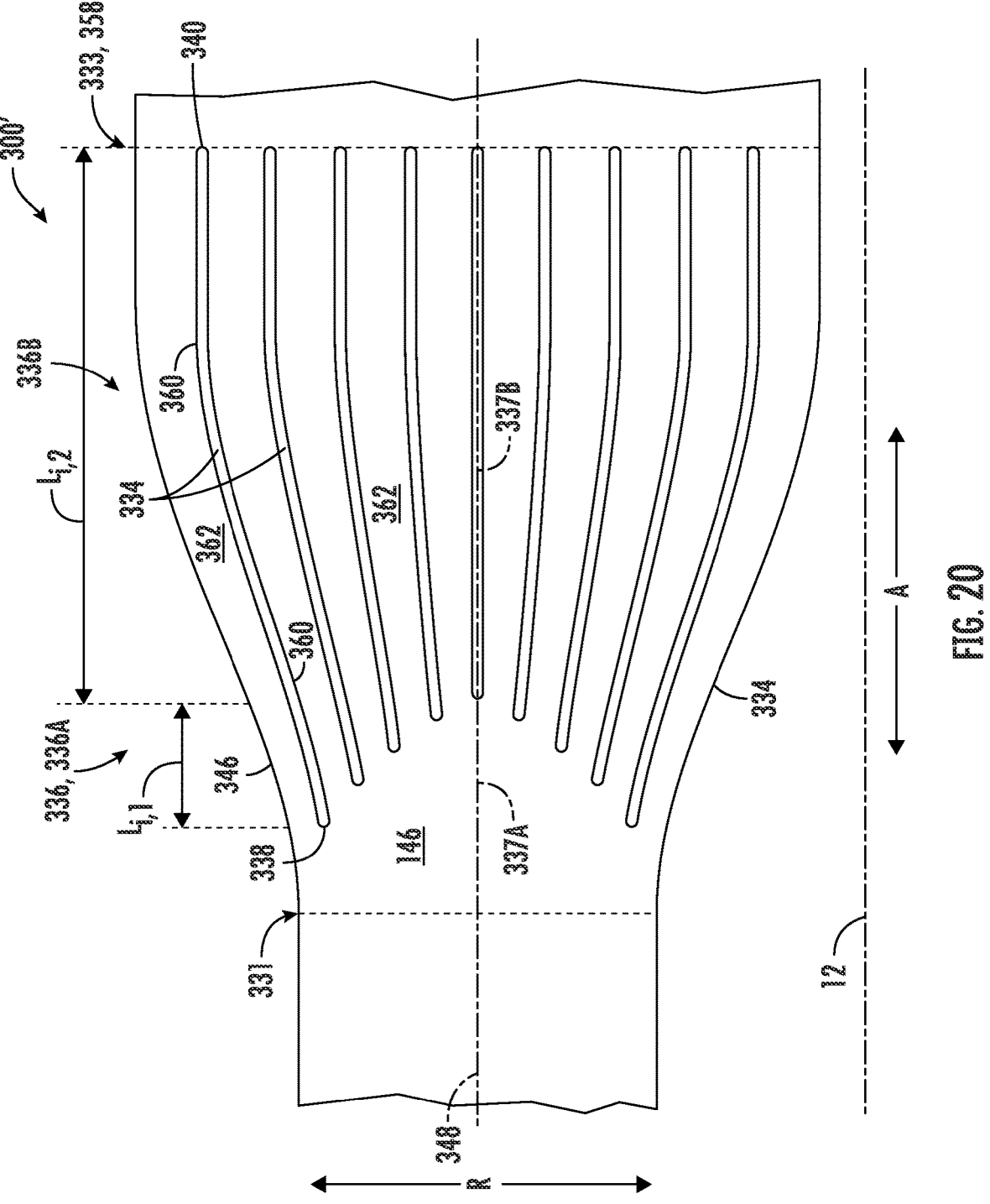
FIG. 20 is a schematic cross-sectional view of a heat exchanger in accordance with another exemplary embodiment of the present disclosure.

FIG. 20 illustrates an alternative heat exchanger 300', similar to the heat exchanger 300 described above with reference to FIG. 11. Elements of the heat exchanger 300' not specifically described may be taken to be identical to those of one or more of the heat exchangers 300, 300' described above. The heat exchanger 300" includes a pair of spaced-apart inner and outer peripheral walls 344 and 346, respectively, which between them define a flowpath 302 for a first fluid. The flowpath 302 has an inlet 331 at an upstream end, and an outlet 333 at a downstream end. A midline 348 represents an abstract surface that divides the flow-orthogonal area between the inner and outer peripheral walls 344 and 346 into two parts, which may have approximately equal flow areas. In the illustrated example, the heat exchanger 300" is a partially or wholly arcuate body formed by partial or complete revolution about an axis, for example the axial centerline 12.

The flowpath 302 includes a diverging portion downstream of the inlet 331. Within the diverging portion, the peripheral walls 344, 346 diverge so that they are laterally farther from the midline 348 then they are at the inlet 331. A location downstream of the inlet 331 where the peripheral walls reach their maximum dimension is referred to herein as a "belly" 358. In this embodiment, the belly 358 is coincident with the outlet 333.

A plurality of spaced-apart fins 334 are disposed in the flowpath 302. Each of the fins 334 has opposed side walls 360 extending between an upstream end 338 and a downstream end 340. The fins 334 subdivide the flowpath 302 into a plurality of generally parallel flow passages 362.

The aerodynamic features of the heat exchanger 300', such as the equal diffusion ratios and/or rates of the flow passages 362, shaping of the fins 334 to act as turning vanes, and staggering of the fins 334, may be implemented as described for the heat exchanger 300 described above with reference to FIG. 11. The operation and functional advantages of the heat exchanger 300' are substantially the same as for the heat exchanger 300, with the exception that flow is not re-accelerated prior to the outlet 333.

Figure 21:
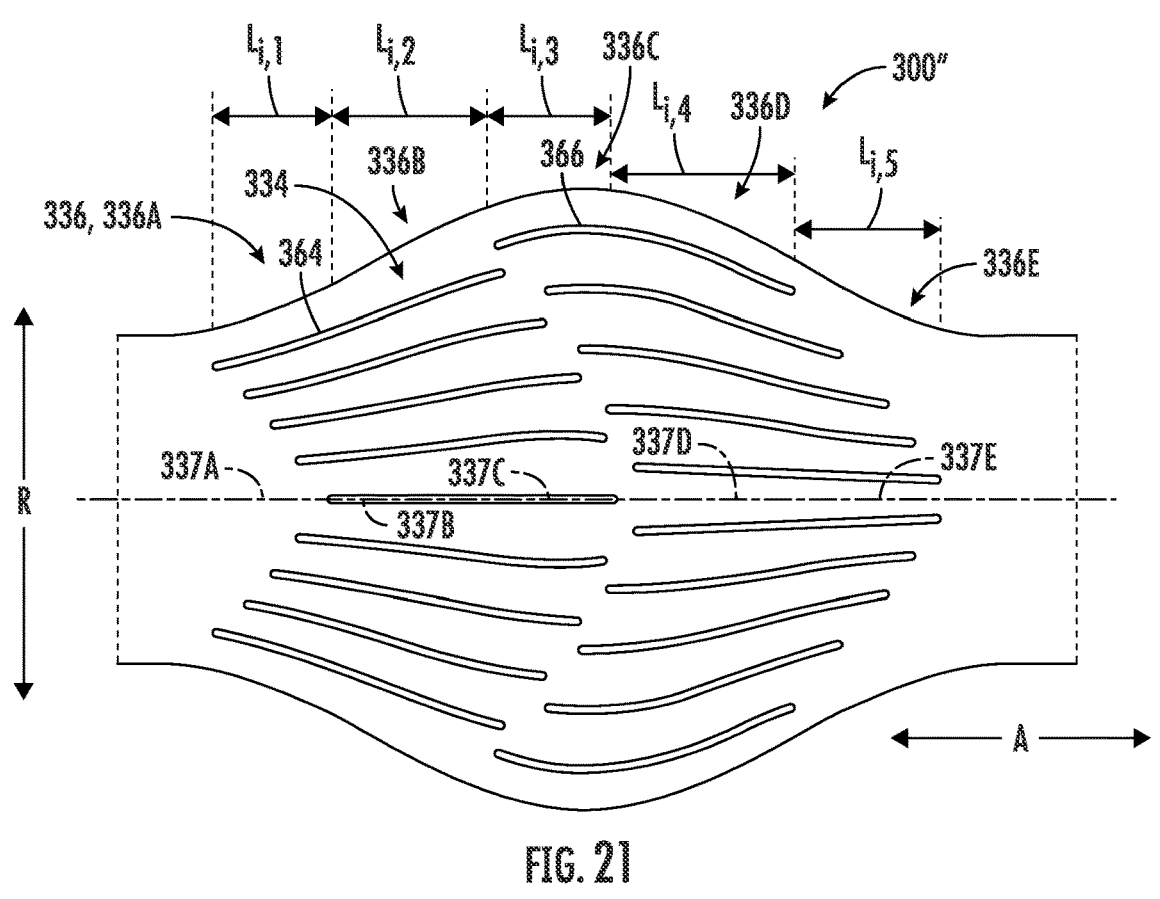
FIG. 21 is a schematic cross-sectional view of a heat exchanger in accordance with yet another exemplary embodiment of the present disclosure.

Further, it will be appreciated that other fin configurations are possible. For example, FIG. 21 illustrates a heat exchanger 300" having fins 334 which are split, each fin 334 having an upstream portion 364 and a separate downstream portion 366.

Figure 22:
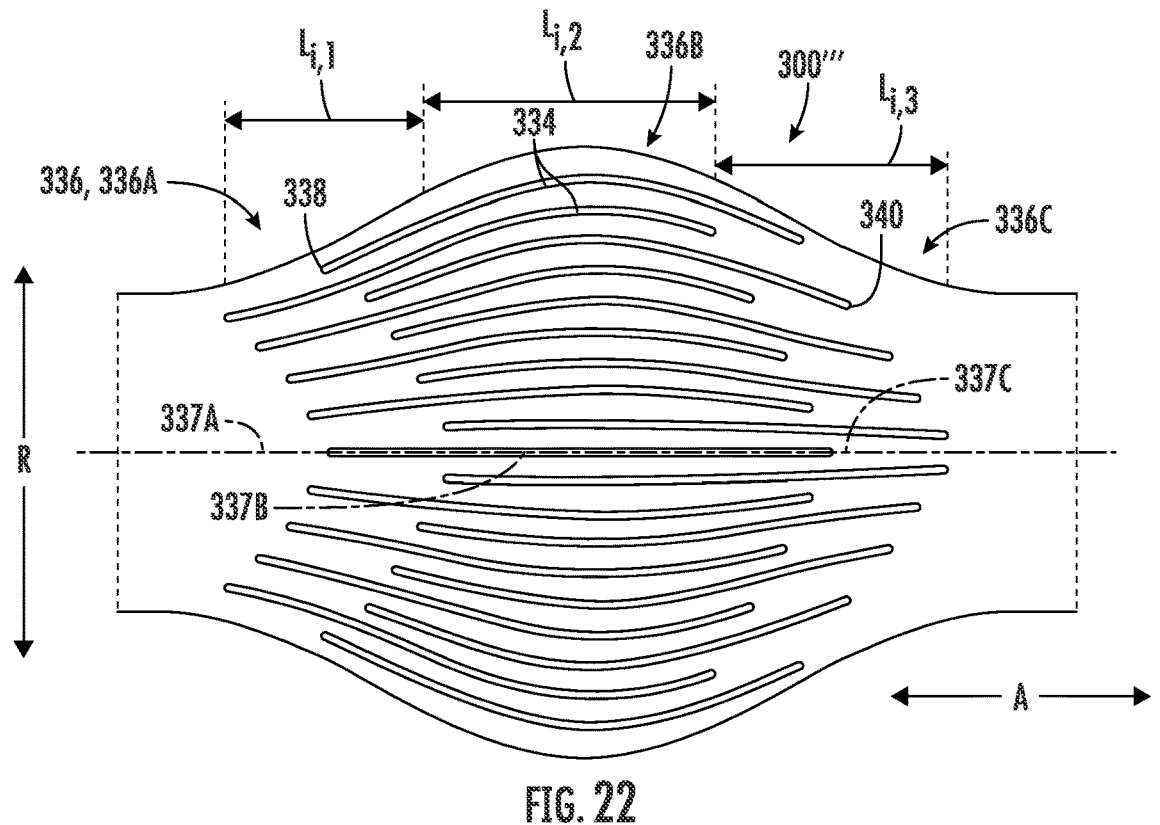
FIG. 22 is a schematic cross-sectional view of a heat exchanger in accordance with still another exemplary embodiment of the present disclosure.

As another example, FIG. 22 illustrates a heat exchanger 300'" having fins 334 which are overlapped in an axial direction A. The term "overlapped in the axial direction A" in this context refers to a configuration in which alternate fins 334 are offset axially from each other in opposite directions, such that the middle portions of adjacent fins 334 are coextensive in the axial direction A, and each fin 334 includes a forward portion extending axially forward of an upstream end 338 of the adjacent fin 334, or an aft portion extending axially aft of a downstream end 340 of the adjacent fin 334.

Figure 23:
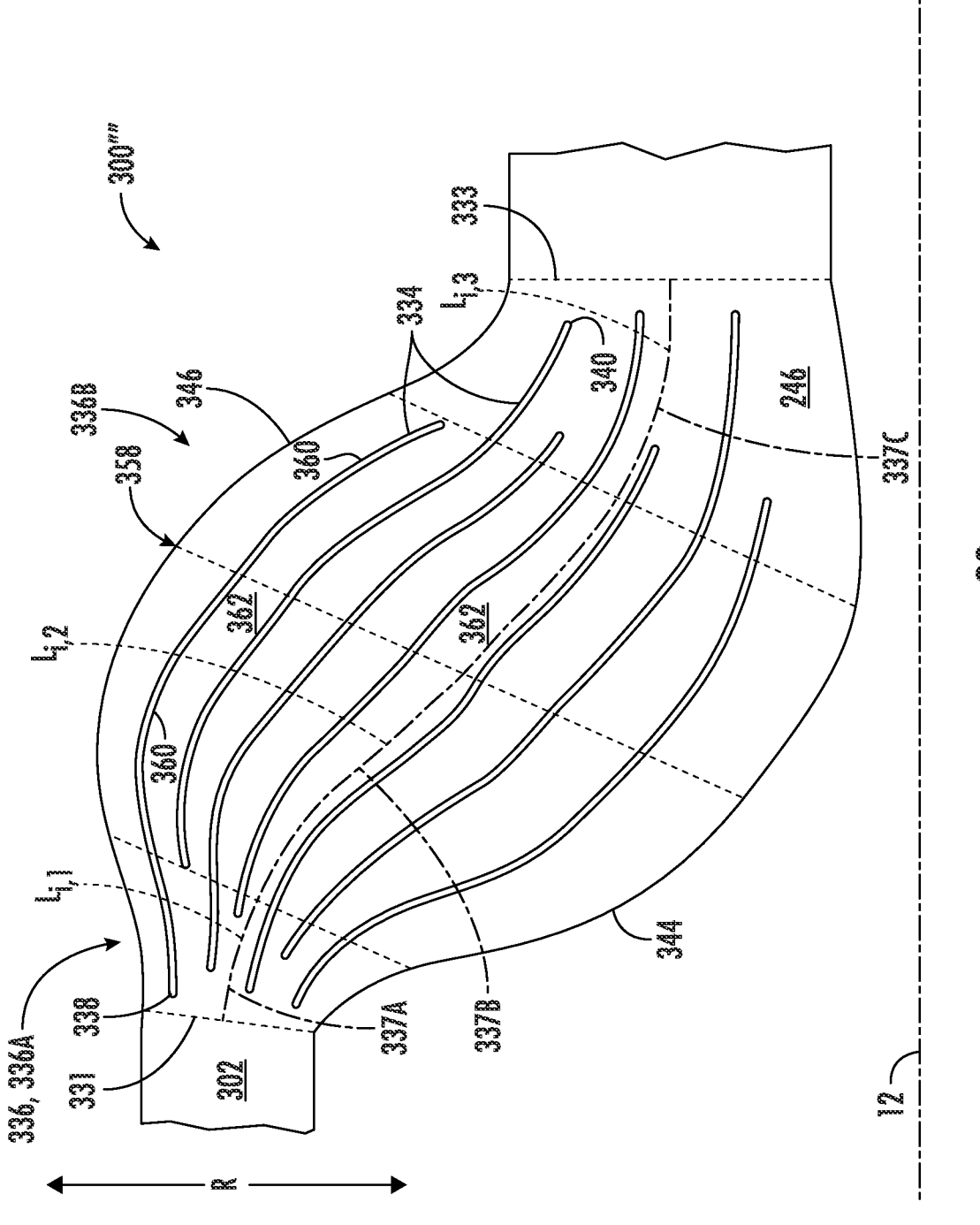
FIG. 23 is a schematic cross-sectional view of a heat exchanger in accordance with yet another exemplary embodiment of the present disclosure.

FIG. 23 illustrates an alternative heat exchanger 300"", similar to the heat exchangers 300, 300', 300", 300'" described above. Elements of the heat exchanger 300"" not specifically described may be taken to be identical to those of the heat exchanger 300 described above. The heat exchanger 300"" includes a pair of spaced-apart inner and outer peripheral walls 344 and 346, respectively, which between them define a flowpath 302 for a first fluid. The flowpath 302 has an inlet 248 at an upstream end, and an outlet 250 at a downstream end. In the illustrated example, the heat exchanger 300"" is a partially or wholly arcuate body formed by partial or complete revolution about an axis, for example the axial centerline 12. A significant difference between the heat exchanger 300"" and the heat exchanger 300 is that the heat exchanger 300"" is not symmetrical about a midline.

The flowpath 302 includes a diverging portion downstream of the inlet 248. Within the diverging portion, the peripheral walls 344, 346 diverge so that they are laterally farther apart from each other than they are at the inlet 248. A location downstream of the inlet 248 where the peripheral walls reach their maximum dimension is referred to herein as a "belly" 256. In the illustrated example, the peripheral walls 344, 346 reconverge downstream of the belly 256, thus defining a nozzle, but as noted above, this feature is optional.

A plurality of spaced-apart fins 334 are disposed in the flowpath 302. Each of the fins 334 has opposed side walls 360 extending between an upstream end 338 and a downstream end 340. The fins 334 subdivide the flowpath 302 into a plurality of side-by-side flow passages 362.

The aerodynamic features of the heat exchanger 300"", such as the equal diffusion ratios and/or rates of the flow passages 266, shaping of the fins 334 to act as turning vanes, and staggering of the fins 334, may be implemented as described for the heat exchanger 300 described above. The operation and functional advantages of the heat exchanger 300"" are substantially the same as for the heat exchanger 300.

Referring collectively to FIGS. 20 through 23, each of the heat exchangers depicted includes a plurality of heat transfer sections 336. For example, the embodiment of FIG. 20 includes two heat transfer sections 336A, 336B, defining respective lengths $L_{i,1}$, $L_{i,2}$ (along respective centerlines 337A, 337B); the embodiment of FIG. 21 includes five heat transfer sections 336A, 336B, 336C, 336D, 336E, defining respective lengths $L_{i,1}$, $L_{i,2}$, $L_{i,3}$, $L_{i,4}$, $L_{i,5}$ (along respective centerlines 337A, 337B, 337C, 337D, 337E); the embodiment of FIG. 22 includes three heat transfer sections 336A, 336B, 336C, defining respective lengths $L_{i,1}$, $L_{i,2}$, $L_{i,3}$ (along respective centerlines 337A, 337B, 337C); and the embodiment of FIG. 23 also includes three heat transfer sections

336A, 336B, 336C, defining respective lengths $L_{i,1}, L_{i,2}, L_{i,3}$ (along respective centerlines 337A, 337B, 337C). Notably, however, the embodiment of FIG. 23 defines a mean flow direction that is non-parallel to a longitudinal axis 112 of the engine, and as such, the lengths $L_{i,1}, L_{i,2}, L_{i,3}$ are defined in a direction non-parallel to the longitudinal axis 112 of the engine.

In particular, for the embodiment of FIG. 23, the center-lines 337A, 337B, 337C are each curved as the flowpath 302 through the heat exchanger 300'''' curves and the centerlines 337A, 337B, 337C are geometric centerlines of the respective heat transfer sections 336A, 336B, 336C. The lengths $L_{i,1}, L_{i,2}, L_{i,3}$ are equal to the lengths of the respective centerlines 337A, 337B, 337C.

Figure 24:
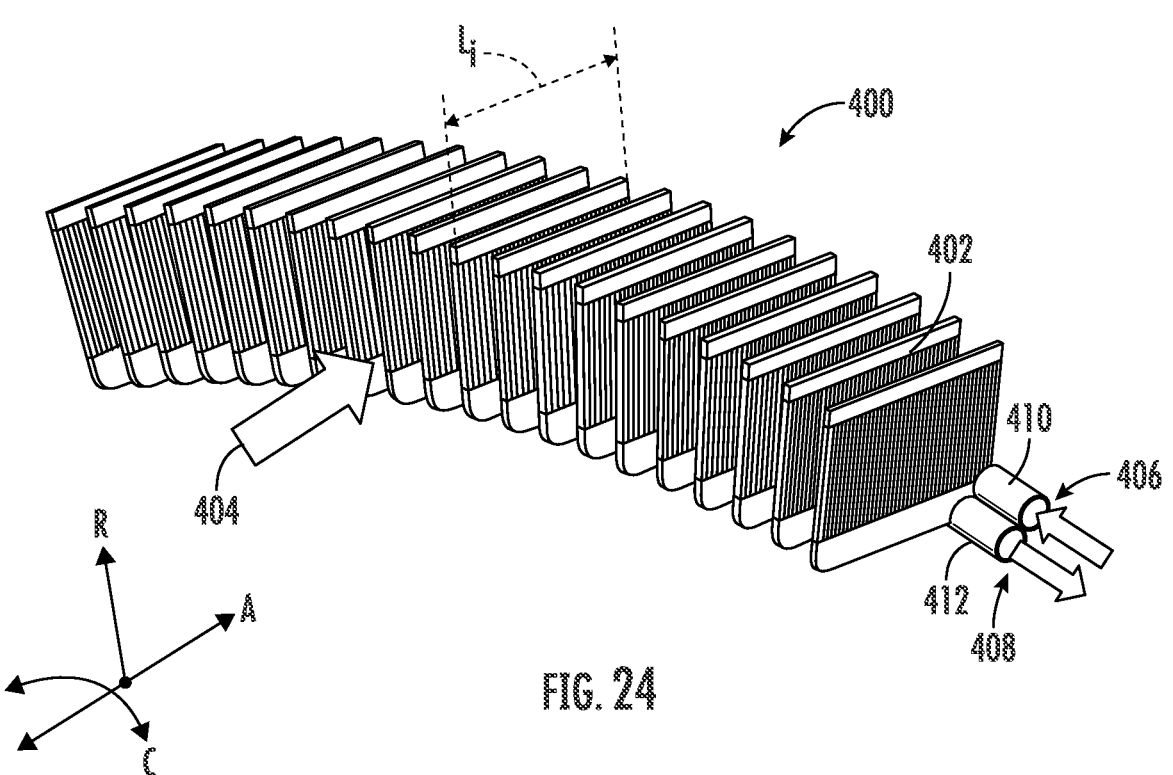
FIG. 24 is a perspective view of a heat exchanger in accordance with yet another exemplary embodiment of the present disclosure.
Figure 25:
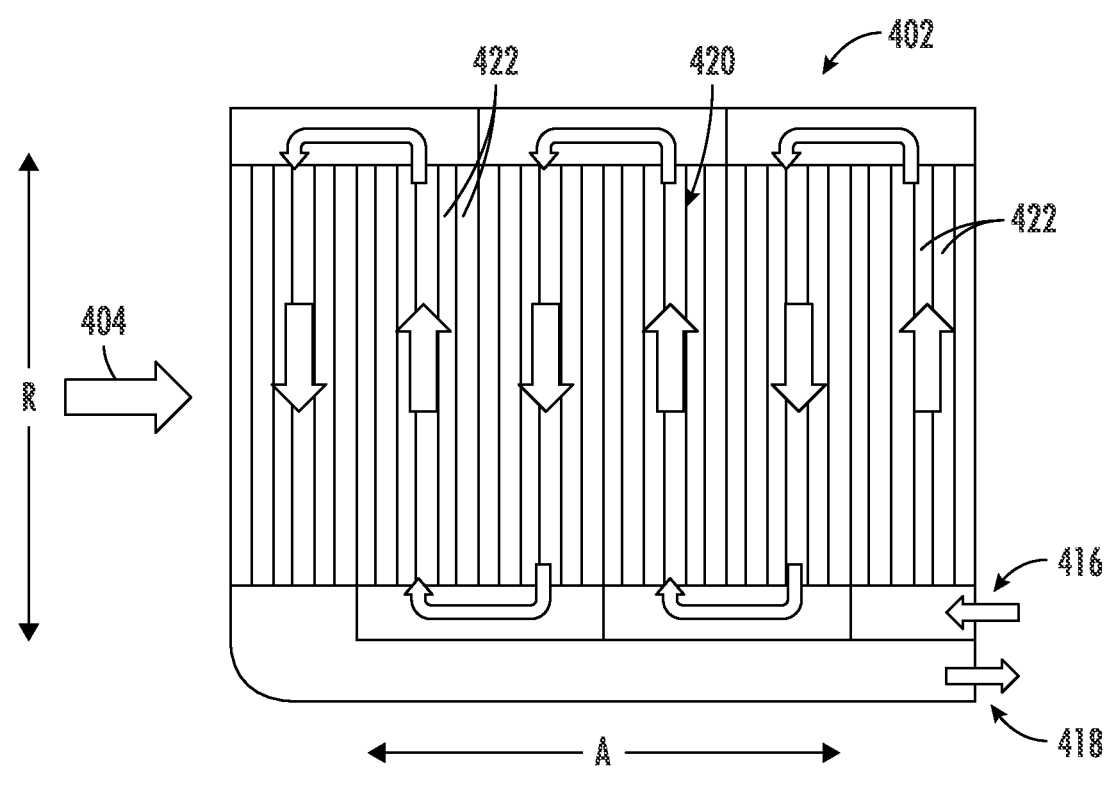
FIG. 25 is a cross-sectional view of a vane of the exemplary heat exchanger of FIG. 24.

Referring now to FIGS. 24 and 25, a heat exchanger 400 in accordance with another exemplary embodiment of the present disclosure is provided. FIG. 24 depicts a perspective view of a section of the heat exchanger 400 that may be positioned in a substantially annular duct, and FIG. 25 provides a cross-sectional view of a vane 402 of the heat exchanger 400 of FIG. 24. In certain exemplary embodiments, the heat exchanger 400 of FIGS. 24 and 25 may be incorporated into one or more substantially annular ducts or flowpaths of the present disclosure, such as into one or more of the substantially annular ducts or flowpaths of the engines 10, 100 of FIGS. 1, 2, or both.

For example, heat exchanger 400 includes a plurality of vanes 402 arranged along a circumferential direction C (FIG. 24), each extending along an axial direction A and a radial direction R. The heat exchanger 400 is configured to transfer heat with a first fluid that flows over the vanes 402 (indicated at arrow 404), and defines a second fluid inlet 406 and a second fluid outlet 408 that provides a second fluid to/from a group of the vanes 402 of the heat exchanger 400 (e.g., to each of the vanes 402 shown in FIG. 24). The flow of the first fluid (arrow 404) is the flow of fluid through the substantially annular duct. Although not fully depicted, the heat exchanger 400 includes an inlet manifold 410 defining the second fluid inlet 406 and an outlet manifold 412 defining the second fluid outlet 408 (FIG. 24). The inlet manifold 410 and outlet manifold 412 may each extend in the circumferential direction C and may each be in fluid communication with each of the vanes 402 of a section of the heat exchanger 400.

Further, referring specifically to FIG. 25, each vane 402 defines a vane fluid inlet 416 and a vane fluid outlet 418, along with a serpentine second fluid flowpath 420 between the vane fluid inlet 416 and the vane fluid outlet 418. The vane fluid inlet 416 is in fluid communication with the inlet manifold 410 for receiving the second fluid from the inlet manifold 410, and the vane fluid outlet 418 is in fluid communication with the outlet manifold 412 for providing the second fluid to the outlet manifold 412. The vane 402 further includes a plurality of channels 422 extending along the radial direction R along the serpentine second fluid flowpath 420 so as to extend a length of the serpentine second fluid flowpath 420 through the vane 402 and increase a heat transfer with the first fluid.

Briefly, referring back specifically to FIG. 24, the heat exchanger 400 includes a single heat transfer section, and a length $L_i$ of the heat exchanger 400 is the length of the single heat transfer section.

Notably, in other exemplary embodiments, the heat exchanger 400 of FIGS. 24 and 25 may have other configurations, such as one or more of the configurations of FIGS. 1 to 12 and 13 to 14 in U.S. Pat. No. 10,443,436 (see exemplary heat exchanger 100 described throughout); of FIGS. 1 to 12 in U.S. Pat. No. 10,184,400 (see exemplary annular heat exchanger 12 described throughout); of FIGS. 1-3, 6-8, and 10 in U.S. Pat. No. 9,777,963 (see duct heat exchangers 60 FIG. 1 and described with respect thereto, segments 106 in FIGS. 2-3 and 6-8 and described with respect thereto, segment 800 in FIG. 10 and described with respect thereto), or combinations thereof. Each of the above patents is incorporated herein by reference fully for all purposes.

In an extension of the concepts disclosed hereinabove, also provided herein is a heat exchanger that can provide for significant improvements in the performance and efficiency in aeronautical gas turbine engines. The heat exchanger discussed below, when combined with the concepts discussed above, can provide for improvements related to a desired noise reduction as well as heat transfer efficiency under various flight conditions.

In particular, the heat exchanger discussed hereinbelow includes a heat exchanger core, a header having a header manifold, and a transition portion that provides fluid communication between the heat exchanger core and the header manifold. The transition portion includes a transition tube extending between the header and the heat exchanger core, a header junction where the transition tube joins the header, and a splitting junction that splits the transition tube into the plurality of heat exchange tubes. The header junction can define elliptical inlet apertures, a large filleted joint, a junction thickness that is greater than a header wall thickness, or a combination thereof.

The integration of the header junction, transition tube, and splitting junction as described hereinbelow directly contributes to the overall efficiency of the heat exchanger during one or more engine operating conditions discussed herein. For example, the inlet apertures and large filleted joints at the header junction may enhance the flow dynamics of a thermal fluid through the heat exchanger, especially during high power operating conditions like takeoff and climb. Such a configuration may also allow for use of a high pressure thermal fluid, further increasing heat exchanger efficiency. This arrangement for a heat exchanger offers favorable advantages, however, it may suffer from not being inherently capable of reducing air-induced noise sufficiently. It is desirable to arrive at a heat exchanger that increases the transmission loss without introducing unfavorable pressure drops or inefficiencies in the design.

By applying the principles of the Operational Acoustic Reduction Ratio (OARR) discussed hereinabove to a heat transfer section of the heat exchanger presently introduced and described further hereinbelow, acoustic noise attenuation properties are improved during certain operating conditions of the gas turbine engine incorporating such a heat exchanger. In particular, the header configuration lends itself to adapting to a desired acoustic length to achieve a desired acoustic transmission loss during the operating condition of interest, such as high power operating condition like takeoff and climb where community noise is of particular concern. For example, the parallel flow of the heat exchanger tubes extending off the header, and the use of a high pressure thermal fluid, allow for the heat transfer section(s) of heat exchanger described herein below to adapt to a desired acoustic length for the particular application.

In addition to resulting in a heat exchanger having improved heat transfer efficiency and noise attenuation properties, incorporating these considerations into the initial design phase of the heat exchanger, as suggested hereinabove, reduces the need for iterative redesigns and aligns with the objective of establishing design requirements that account for engine architecture constraints, including heat transfer fluid pressure (and source), desired acoustic transmission loss, and heat transfer requirements.

Referring now to the drawings, FIG. 26 is a schematic cross-sectional view of a gas turbine engine 10 in accordance with another exemplary embodiment of the present disclosure. The exemplary gas turbine engine 10 of FIG. 26 may be configured in substantially the same manner as the exemplary gas turbine engine 10 of FIG. 1. The same or similar numbers may refer to the same or similar parts.

In particular, referring generally to FIGS. 26 through 29, a heat exchanger assembly 500 will be described according to an exemplary embodiment of the present subject matter. Heat exchanger assembly 500 may be used to transfer heat between two or more fluids in any suitable application. For example, as illustrated in FIGS. 26 through 28, heat exchanger assembly 500 is positioned within bypass airflow passage 48 and includes a plurality of fluid supply lines 502 and return lines 504 that are coupled to a heated fluid supply, such as a compressor bleed port 506. In this manner, for example, hot, compressed air may be bled off of HP compressor 24 and passed through heat exchanger assembly 500 where it is cooled by first portion of air 78 flowing through bypass airflow passage 48. The cooled air may then be recirculated into turbomachine 16 through return lines 504 or used for any other suitable purpose.

As illustrated herein, heat exchanger assembly 500 is an air cooling air heat exchanger configured for transferring heat between a hot stream and a cool stream of air within the gas turbine engine 10. However, it should be appreciated that heat exchanger assembly 500 can be configured for receiving any suitable number and type of fluids for use in the heat transfer process, examples of which are described herein.

Moreover, FIG. 26 illustrates an exemplary embodiment of heat exchanger assembly 500 for the purpose of explaining its general operation, but the size, shape, and configuration of heat exchanger assembly 500 is not intended to limit the scope of the present subject matter. For example, the size, shape, number, and configuration of fluid passageways may be varied while remaining within the scope of the present subject matter.

In general, the exemplary embodiments of heat exchanger assembly 500 described herein may be manufactured or formed using any suitable process. However, in accordance with several aspects of the present subject matter, heat exchanger assembly 500 may be formed using an additive-manufacturing process, such as a 3-D printing process. The use of such a process may allow heat exchanger assembly 500 to be formed integrally, as a single monolithic component, or as any suitable number of sub-components. In particular, the manufacturing process may allow heat exchanger assembly 500 to be integrally formed and include a variety of features not possible when using prior manufacturing methods. For example, the additive manufacturing methods described herein enable the manufacture of heat exchangers having unique features, configurations, thicknesses, materials, densities, fluid passageways, headers, and mounting structures not possible using prior manufacturing methods. Some of these novel features are described herein.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral subcomponents. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets, laser jets, and binder jets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form or combinations thereof. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as need depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer which corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

Notably, in exemplary embodiments, several features of the components described herein were previously not possible due to manufacturing restraints. However, the present inventors have advantageously utilized current advances in additive manufacturing techniques to develop exemplary embodiments of such components generally in accordance with the present disclosure. While the present disclosure is not limited to the use of additive manufacturing to form these components generally, additive manufacturing does provide a variety of manufacturing advantages, including ease of manufacturing, reduced cost, greater accuracy, etc.

In this regard, utilizing additive manufacturing methods, even multi-part components may be formed as a single piece of continuous metal, and may thus include fewer subcomponents and/or joints compared to prior designs. The integral formation of these multi-part components through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above enable much more complex and intricate shapes and contours of the components described herein. For example, such components may include thin additively manufactured layers and unique fluid passageways and manifolds with integral mounting features. In addition, the additive manufacturing process enables the manufacture of a single component having different materials such that different portions of the component may exhibit different performance characteristics. The successive, additive nature of the manufacturing process enables the construction of these novel features. As a result, the components described herein may exhibit improved functionality and reliability.

Referring now specifically to FIGS. 28 and 29, heat exchanger assembly 500 will be described in more detail according to an exemplary embodiment of the present subject matter. Heat exchanger assembly 500 generally includes a plurality of heat exchanger segments, referred to herein collectively as heat exchanger 508. The heat exchanger 508 can be positioned within a substantially annular duct of the gas turbine engine 10 (e.g., of the fan assembly (such as a bypass flowpath 48), of the turbomachine 16 (such as a third stream; see, e.g., fan duct 172 in FIG. 2)) and extends substantially continuously along the circumferential direction C. As illustrated, heat exchanger assembly 500 includes four heat segments that extend around substantially an entire circumference of turbomachine 16. However, according to alternative embodiments, any suitable number and size of segments may be used depending on the application.

Briefly, the heat exchanger 508 further includes a heat transfer section defining an acoustic length ($L_i$) such that an Operational Acoustic Reduction Ratio (OARR) is greater than or equal to 0.75 to achieve a desired effective transmission loss at an operating condition. In such a manner, the heat exchanger 508 shown can achieve the desired effective transmission loss at the operating condition despite a potential reduction in size facilitated by the improved efficiency of the heat exchanger 508 discussed herein.

Heat exchanger assembly 500 generally defines an axial direction A, a radial direction R, and a circumferential direction C which correspond to the similar directions of gas turbine engine 10 when heat exchanger assembly 500 is installed therein. For clarity, not all portions of heat exchanger assembly 500 are illustrated in each of the figures, and modifications and variations may be made to heat exchanger assembly 500 while remaining within the scope of the present subject matter.

Each segment of the heat exchanger 508 is placed in fluid communication with one or more supply lines 502 and one or more return lines 504 for circulating a heat exchange fluid (also referred to herein as a thermal fluid) through the heat exchanger 508. As explained briefly above, according to an exemplary embodiment supply lines 502 may be fluidly coupled to a heated fluid supply for supplying a flow of heat exchange fluid, e.g., such as to HP compressor 24 via bleed port 506 (see, e.g., FIG. 26) for supplying a flow of hot, compressed air. The flow of heat exchange fluid passes through heat exchanger 508 where it is cooled before being discharged via return lines 504.

Each segment of the heat exchanger 508 generally includes a heat exchanger core 510 including a plurality of heat exchange tubes 512. According to the illustrated embodiment, heat exchanger 508 also includes a plurality of support brackets 514 for supporting heat exchange tubes 512. Heat exchange tubes 512 may be sized, positioned, and oriented in any suitable manner within heat exchanger core 510. For example, according to the embodiment illustrated in FIGS. 28 and 29, heat exchange tubes 512 are arcuate and extend along the circumferential direction C. In addition, heat exchange tubes 512 are spaced apart to define arcuate passageways through which a second flow of heat exchange fluid may flow, e.g., such as first portion of air 78 within bypass passageway 48.

By contrast, according to the embodiment illustrated in FIGS. 33 and 34, heat exchanger core 510 can include heat exchange tubes 512 that are formed into a lattice structure. More specifically, heat exchange tubes 512 can zig-zag along the circumferential direction C, e.g., may move inward and outward along the radial direction R to form a plurality of joints with adjacent rows of heat exchange tubes 512. By forming junctions between adjacent rows in this manner, a lightweight, but stiff lattice structure is provided which can eliminate the need for structural supports. In addition, the zig-zag structure and joints can maintain a turbulent flow of heat exchange fluid for improved thermal efficiency of heat exchanger 508.

Referring again to FIGS. 28 and 29, heat exchanger assembly 500 includes one or more header assemblies for providing fluid communication between the heat exchanger core 510 and the supply and return lines 502, 504. More specifically, for each segment of the heat exchanger 508, a supply header 516 provides fluid communication between supply lines 502 and an upstream end of each of the heat exchange tubes 512, while a return header 518 provides fluid communication between a downstream end of each of the heat exchange tubes 512 and return lines 504. In this manner, heat exchange fluid, e.g., compressed air bled off HP compressor 24, may be passed through heat exchanger core 510 to facilitate the heat transfer process.

Referring now generally to FIGS. 30 through 32, a header or header assembly 530 will be described according to an exemplary embodiment of the present subject matter. In general, header assembly 530 may be used to distribute a heat exchange fluid to a plurality of heat exchange tubes in any suitable application. For example, as described herein, header assembly 530 may be supply header 516 or return header 518 for circulating heat exchange fluid within heat exchange tubes 512 of heat exchanger core 510. Although described below in this context, it should be appreciated the header assembly 530 may be used in any other suitable heat exchanger or application.

As illustrated, header assembly 530 includes a first barrel 532 that extends along the axial direction A and defines a first manifold 534 in fluid communication with a first plurality of heat exchange tubes 512. In addition, header assembly includes a second barrel 536 that extends along the axial direction A and defines a second manifold 538 in fluid communication with a second plurality of heat exchange tubes 512. In addition, header assembly 530 includes an inlet manifold 540 in fluid communication with first manifold 534 and second manifold 538, e.g., to provide fluid communication between supply line 502 and manifolds 534, 538. The flow of heat exchange fluid may be distributed throughout manifolds 534, 538 and to heat exchange tubes 512. Downstream of heat exchanger core 510, a return header 518 may be configured in the same manner as header assembly 530 for returning the flow of heat exchange fluid via return line 504.

In general heat exchanger core 510 and header assemblies 530 may be sized, positioned, and oriented in any suitable manner for achieving the desired thermal performance while fitting within the restricted space available within bypass airflow passage 48. According to the illustrated embodiment, heat exchange tubes 512 are stacked in a plurality of rows along the radial direction R and a plurality of columns along the axial direction A to maximize the tube surface area for heat transfer. In addition, each of the plurality of rows of heat exchange tubes 512 extends from first barrel 532 or second barrel 536 substantially along the circumferential direction C. In this manner, heat exchanger core 510 can be curved to correspond to the shape of the bypass airflow passage 48 (or other annular passage) such that the heat exchange process can be improved.

According to the illustrated embodiment, first barrel 532 and second barrel 536 each have a substantially circular cross section. A circular cross section may be desirable, for example, to withstand the stresses experienced within header assembly 530 due to the high pressure bleed air from HP compressor 24. Because the circular cross section is structurally efficient, less material may be used to form barrels 532, 536, resulting in a lighter weight heat exchanger assembly 500.

Notably, conventional heat exchangers using single chamber headers having circular cross sections may experience joint failures or leaks where the heat exchange tubes are joined with the headers, e.g., due to the angle at which the tube intersects the header. To overcome such issues, these conventional headers often require bending of the heat exchanger tubes, the formation of oversized joints, excessive brazing of the joints, or result in other manufacturing challenges. Alternatively, a D-shaped header could be used, but this also results in a heavy, weight inefficient structure and excessive braze lengths.

According to the illustrated embodiment, header assembly 530 includes a dual-barrel configuration which rectifies many issues associated with single barrel headers. In this regard, first barrel 532 and second barrel 536 are stacked or positioned adjacent to each other along the radial direction R. Such a configuration provides several advantages to a conventional single chamber header. For example, for a given envelope and header assembly 530 size, a dual-barrel configuration can accommodate the same number or more heat exchange tubes 512 with less resulting stress and simplified manufacturing. More specifically, whereas a single barrel header requires sharp joints, excessive brazing, or tube bending procedures, first barrel 532 and second barrel 536 can be coupled to the same number of tubes (or more) with fewer manufacturing difficulties and stress concentrations. Therefore, the dual barrel configuration as shown in FIGS. 30 through 32 provides improved stress capabilities and thermal performance while reducing assembly times and costs.

The heat exchanger 508 depicted further includes a septum 544 positioned between first barrel 532 and second barrel 536. In general, septum 544 extends along the axial direction A along an entire length of first barrel 532 and second barrel 536, at least partially defining and separating first manifold 534 and second manifold 538. As illustrated in FIG. 31, septum 544 also extends into inlet manifold 540 for splitting a flow of heated fluid from the heated fluid supply. In addition, septum 544 may be positioned and contoured to split, scoop, and/or direct the flow of heated fluid into first manifold 534 and second manifold 538 in the desired proportions.

More specifically, for example, an end 546 of septum 544 divides inlet manifold 540 into a first inlet 548 having a first flow area and being adjacent first manifold 534 and a second inlet 550 having a second flow area adjacent second manifold 538. Notably, inlet manifold 540 is curved and the flow of heated fluid may have a tendency to flow into second manifold 538 as a result. Thus, according to the exemplary embodiment, end 546 of septum 544 is offset from a midpoint of inlet manifold 540 along the radial direction R, e.g., such that the first flow area of first inlet 548 is different (e.g., greater) than the second flow area of second inlet 550. This may be desirable, for example, to compensate for the tendency of the momentum of the flow of heated fluid to cause a higher portion of the flow to travel into the second manifold 538.

In this manner, septum 544 generally divides the flow of heat exchange fluid passing to the first plurality of heat exchange tubes 512 and the second plurality of heat exchange tubes 512. However, according to the illustrated embodiment, septum 544 further defines one or more apertures 552 (see FIGS. 32 and 35) providing fluid communication between first manifold 534 and second manifold 538. Apertures 552 may be sized and positioned in any suitable manner for achieving the desired flow control and pressure distribution of the heat exchange fluid. In addition, although a single, flat septum 544 is illustrated herein, it should be appreciated that according to alternative embodiments, more than one septum 544 may be included having any suitable shape.

Header assembly 530 is described above only for explaining aspects of the present subject matter. It should be appreciated that modifications and variations may be made to header assembly 530 while remaining within the scope of the present subject matter. For example, according to another exemplary embodiment, header assembly 530 may include a third barrel stacked in the same manner as the first two barrels and extending along the axial direction A to define a third manifold in fluid communication with at least one of the plurality of heat exchange tubes. In addition, additional septums may be included, additional heat exchange tubes may be coupled to header assembly 530, and other variations may be implemented as well.

Referring now generally to FIGS. 33 through 40, another heat exchanger 560 is described according to an exemplary embodiment of the present subject matter. Heat exchanger

560 may be similar to heat exchanger 508 in many respects and may be used within heat exchanger assembly 500. According to the illustrated embodiment, heat exchanger 560 generally defines a lateral direction L, a vertical direction V, and a transverse direction T. Although a straight segment of heat exchanger 560 is illustrated in FIG. 33 according to such a coordinate system, it should be appreciated that according to an exemplary embodiment, heat exchanger is arcuate such that it may extend circumferentially within and fill bypass passageway 48 for improved thermal performance. In addition, it should be appreciated that the various features and configurations of heat exchangers 508 and 560 are interchangeable according to various exemplary embodiments. Due to similarity between the embodiments, similar reference numerals will be used to refer to like components.

For example, the heat exchanger 560 can be positioned within a substantially annular duct of a gas turbine engine (e.g., of the fan assembly (such as a bypass flowpath), of the turbomachine (such as a third stream)) and can extend substantially continuously along a circumferential direction of a gas turbine engine incorporating the heat exchanger 560. The heat exchanger 560 further includes a heat transfer section defining an acoustic length (not labeled) such that an Operational Acoustic Reduction Ratio (OARR) is greater than or equal to 0.75 to achieve a desired effective transmission loss at an operating condition. In such a manner, the heat exchanger 560 shown can achieve the desired effective transmission loss at the operating condition despite a potential reduction in size facilitated by the improved efficiency of the heat exchanger 560 discussed herein.

As illustrated in FIG. 33, heat exchanger core 510 includes a plurality of heat exchange tubes 512 positioned between two header assemblies, or headers 562. Each header 562 extends along the transverse direction T and defines a header manifold 564. Similar to header assembly 530, header 562 may be a dual-barrel header having two manifolds split by a septum defining apertures for flow equalization. However, those details will be omitted here for brevity. As best shown in FIGS. 35 and 36, header 562 defines a header wall thickness 566 that is generally uniform except where header 562 interfaces with heat exchanger core 510, as described below.

Referring now generally to FIGS. 34 through 36, heat exchanger 560 includes a transition portion 570 that provides fluid communication between heat exchanger core 510 and header manifold 564. More specifically, transition portion 570 generally includes a transition tube 572 that extends between header 562 and heat exchanger core 510. For example, according to the illustrated embodiment, transition tube 572 extends from header 562 at an exit angle 574. According to the illustrated embodiment, exit angle 574 is 90 degrees or substantially normal to header 562. However, exit angle 574 may be other suitable angles according to alternative embodiments.

Heat exchanger 560 further includes a header junction 580 where transition tube 572 joins header 562. Header junction 580 is typically formed to minimize stresses at the location where transition tube 572 meets header 562 and reduce the flow restriction or drag on the flow of heat exchange fluid as it passes into transition tube 572. According to the illustrated embodiment, header junction 580 defines a junction thickness 582 that is an average thickness measured along a direction normal to header 562 proximate transition tube 572. For example, according to an exemplary embodiment, junction thickness 582 may be measured from inlet aperture 590 (described below) to a top of fillet 584

(also described below). Alternatively, junction thickness 582 may be measured along transition tube 572 from a bottom of header junction 580 to the beginning portion of fillet 584. According to exemplary embodiments, junction thickness 582 is greater than header wall thickness 566. As illustrated in FIG. 36, junction thickness 582 is approximately twice as large as header wall thickness 566.

In addition, header junction 580 may define a fillet 584 of any radius suitable for reducing joint stress concentrations and ensuring the rigidity of heat exchanger 560 within the limited space available on header 562. For example, fillet 584 may be defined between an outer surface of header 562 and transition tube 572 and may have a fillet radius to transition tube 572 diameter ratio (r/D) ranging between 0.15 and 0.5. For example, according to the illustrated embodiment, the fillet radius to transition tube diameter ratio (r/D) is approximately 0.35. As an example, one embodiment may include a fillet 584 having a radius of greater than 0.125 millimeters, greater than ten 0.25 millimeters, or greater than 1.25 millimeters.

Notably, heat exchanger 560 may include a plurality of transition tubes 572 positioned adjacent each other along the transverse direction T, e.g., to maximize the number of heat exchange tubes 512 and heat transfer capability of heat exchanger 560. However, stacking a plurality of circular transition tubes 572 immediately adjacent each other can result in stress concentrations and the potential for leaks at header junction 580. For example, a web 586 which is defined between adjacent transition tubes 572 becomes very small when circular transition tubes 572 are stacked in close proximity, resulting in structural deficiencies.

Therefore, using the additive manufacturing techniques described herein, header junction 580 defines a plurality of inlet apertures 590, each inlet aperture 590 having an elongated or non-circular cross section. For example, inlet apertures 590 define an elliptical cross section as shown in FIGS. 35, 38, and 40. Downstream of inlet aperture 590, header junction 580 slowly and smoothly transitions from an elliptical cross section to a circular cross section proximate transition tubes 572. In this manner, a web thickness 592 which is defined between adjacent transition tubes 572 along the transverse direction T is increased. For example, according to the illustrated embodiment, the ratio of web thickness 592 to transition tube 572 diameter (t/D) is approximately 0.4. This t/D ratio typically ranges between 0.15 and 0.6. According to one exemplary embodiment, the web thickness 592 is approximately 2 millimeters or larger. Notably, by defining an inlet aperture 590 having an elliptical cross section, more heat exchange tubes 512 can be stacked along the transverse direction T without causing stress concentrations.

According to exemplary embodiments, the elliptical cross section proximate inlet aperture 590 defines a first cross sectional area and the circular cross section of transition tube 572 defines a second cross sectional area. Notably, the first cross sectional area is substantially equivalent to the second cross sectional area. This enables a smooth flow transition between header manifold 564 and transition tube 572 while maximizing the number of heat exchange tubes 512 that can fit on a single header 562. Such a construction also ensures there is no overall flow rate restriction through header junction 580 or transition portion 570. Furthermore, if desired, the area at inlet aperture 590 can be increased by further elongating the elliptical cross-section to effectively nozzle the flow from header manifold 564 into transition tube 572.

Transition portion 570 of heat exchanger 560 may further include a splitting junction 594 where transition tube 572 splits into the plurality of heat exchange tubes 512. For example, according to the illustrated embodiment, transition tube 572 is divided into four heat exchange tubes 512 at splitting junction 594. Each heat exchange tube 512 may have a circular cross section, so circular transition tube 572 may split into four smaller, circular, heat exchange tubes 512. According to an exemplary embodiment, the total cross sectional area of the transition tube 572 is identical to the sum of the cross sectional areas of the heat exchanger tubes 512.

According to exemplary embodiments, heat exchanger 560 may include additional features for improving its thermal performance. For example, as illustrated in FIG. 33, heat exchanger 508 can include a heat shield 596 which is positioned adjacent heat exchange tubes 512 and extends along the transverse direction T. Heat shield 596 can be configured for urging the flow of bypass air through heat exchanger core 510 and protecting outer nacelle 44 from overheating. Furthermore, heat exchanger 560 can include a flow scoop (not shown) which is generally configured for capturing and guiding a portion of air through heat exchanger core 510 to improve heat transfer efficiency. Other features may be included according to alternative embodiments.

It should be appreciated that heat exchanger assembly 500 and headers 530, 562 are described herein only for the purpose of explaining aspects of the present subject matter. In this regard, headers 530 and 562 are used herein to describe exemplary configurations, constructions, and methods of manufacturing headers. It should be appreciated that the additive manufacturing techniques discussed herein may be used to manufacture other headers for use in any suitable heat exchanger, for any suitable purpose, and in any suitable industry. Thus, the exemplary components and methods described herein are used only to illustrate exemplary aspects of the present subject matter and are not intended to limit the scope of the present disclosure in any manner.

Now that the construction and configuration of heat exchanger assembly 500 according to an exemplary embodiment of the present subject matter has been presented, an exemplary method 600 for manufacturing a header assembly and an exemplary method 700 of manufacturing a heat exchanger will be described. Method 600 can be used by a manufacturer to form headers 530 or 562, or any other suitable header assembly. Similarly, method 700 can be used by a manufacturer to form heat exchanger 508 or 560, or any other suitable heat exchanger. It should be appreciated that the exemplary methods 600, 700 are discussed herein only to describe exemplary aspects of the present subject matter, and are not intended to be limiting.

Referring now to FIG. 41, method 600 includes, at step 610, depositing a layer of additive material on a bed of an additive manufacturing machine. Step 620 includes selectively directing energy from an energy source onto the layer of additive material to fuse a portion of the additive material and form a header assembly. According to an exemplary embodiment, the header assembly may be similar to header assembly 530 or header 562 as described above. For example, the header assembly may include a first barrel and a second barrel extending along a transverse direction and defining a first and second manifold, the second barrel being positioned adjacent the first barrel along the vertical direction. A septum may be positioned between the first barrel and the second barrel and an inlet manifold may be in fluid communication with the first manifold and the second manifold. Other configurations of the header assembly formed by method 600 are possible and within the scope of the present subject matter.

Referring now to FIG. 42, method 700 includes, at step 710, depositing a layer of additive material on a bed of an additive manufacturing machine. Step 720 includes selectively directing energy from an energy source onto the layer of additive material to fuse a portion of the additive material and form a heat exchanger. According to an exemplary embodiment, the heat exchanger may be similar to heat exchanger 508 or 560 as described above. For example, the heat exchanger can include a heat exchanger core comprising a plurality of heat exchange tubes; a header defining a header manifold and a header wall thickness; and a transition portion. The transition portion may include a transition tube extending between the header and the heat exchanger core; a header junction where the transition tube joins the header, the header junction defining a junction thickness that is greater than the header wall thickness; and a splitting junction where the transition tube splits into the plurality of heat exchange tubes. Other configurations of the heat exchanger formed by method 700 are possible and within the scope of the present subject matter.

FIGS. 41 and 42 depict steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of methods 600, 700 are explained using heat exchanger assembly 500 as an example, it should be appreciated that these methods may be applied to manufacture any suitable heat exchangers.

An additively manufactured heat exchanger and a method for manufacturing that heat exchanger and its components are described above. Notably, the heat exchanger and headers may generally include performance-enhancing geometries and improved tube/header interfaces that enhance the structural and thermal performance while improving reliability. The practical implementations of such features are facilitated by an additive manufacturing process, as described herein. These features may be introduced during the design of the heat exchangers and headers, such that they may be easily integrated into the design during the build process at little or no additional cost. Moreover, the entire heat exchanger, including the headers, the heat exchanger core, and other components can be formed integrally as a single monolithic component.

For example, as described above, according to an exemplary embodiment, first barrel 532, second barrel 536, septum 544, and inlet manifold 540 are integrally formed as a single monolithic component, e.g., using one or more additive manufacturing processes as described herein. In addition, according to exemplary embodiments, heat exchanger core 510, headers 530, 562, transition portions 570, and other components of heat exchanger assembly 500 are integrally formed as a single monolithic component using the additive manufacturing techniques described herein.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A gas turbine engine defining a centerline and a circumferential direction, the gas turbine engine comprising: a turbomachine comprising a compressor section, a combustion section, and a turbine section arranged in serial flow order; a rotor assembly driven by the turbomachine and operable at a first blade passing frequency ($f_1$) greater than or equal to 600 hertz and less than or equal to 12,500 hertz during a high power operating condition, the rotor assembly, the turbomachine, or both comprising a substantially annular duct relative to the centerline of the gas turbine engine, the substantially annular duct defining a flowpath; a heat exchanger positioned within the annular duct and extending substantially continuously along the circumferential direction, the heat exchanger comprising a first material defining a heat exchange surface exposed to the flowpath, wherein the first material defines a heat exchange coefficient and wherein the heat exchange surface defines a surface area (A), wherein a product of the heat exchange coefficient and the surface area, UA, is between 7500 British thermal units per hour per degrees Fahrenheit (Btu/(hr-° F.)) and 45000 Btu/(hr-° F.); wherein an effective transmission loss (ETL) for the heat exchanger positioned within the annular duct is between 5 decibels and 1 decibels for a high power operating condition, wherein ETL equals $$C_1 e^{-C_2\left(\frac{EOC-UA}{C_3}\right)};$$

wherein when the operating condition is the high power operating condition, $C_1$ equals 21.02, $C_2$ equals 0.027, $C_3$ equals 107, and EOC is between 50,347 and 12,587; wherein the heat exchanger comprises a heat transfer section defining an acoustic length ($L_i$), and wherein an Operational Acoustic Reduction Ratio (OARR) is greater than or equal to 0.75 to achieve the ETL at the high power operating condition, the OARR equal to:

$$\left(\sin\left(\frac{2\times\pi\times f_1}{a_1}\times L_i\right)\right)^2$$

wherein $a_1$ is equal to 13,200 inches per second during the high power operating condition.

The gas turbine engine of one or more of these clauses, wherein $$\left(\sin\left(\frac{2\times\pi\times f_1}{a_1}\times L_i\right)\right)^2$$

is equal to 1.

The gas turbine engine of one or more of these clauses, wherein the heat transfer section defines a HX flow area ($A_{HX}$), wherein the annular duct defines a duct flow area ($A_d$) upstream of the heat exchanger, and wherein a ratio of the HX flow area ($A_{HX}$) to the duct flow area ($A_d$) is greater than 1.

The gas turbine engine of one or more of these clauses, wherein the rotor assembly is operable at a second blade passing frequency ($f_2$) during a low power operating condition, wherein the heat transfer section is a first heat transfer section and the acoustic length is a first acoustic length, wherein the heat exchanger further comprises a second heat transfer section defining a second acoustic length ($L_{i,2}$), wherein $$\left(\sin\left(\frac{2\times\pi\times f_2}{a_2}\times L_{i,2}\right)\right)^2$$

is greater than or equal to 0.75, and $a_2$ is equal to 12,900 inches per second during the low power operating condition.

The gas turbine engine of one or more of these clauses, wherein the second blade passing frequency ($f_2$) is greater than or equal to 300 hertz and less than or equal to 6,300 hertz.

The gas turbine engine of one or more of these clauses, wherein the rotor assembly is operable at a third blade passing frequency ($f_3$) during a medium power operating condition, wherein the heat exchanger further comprises a third heat transfer section defining a third acoustic length ($L_{i,3}$), wherein $$\left(\sin\left(\frac{2\times\pi\times f_3}{a_3}\times L_{i,3}\right)\right)^2$$

is greater than or equal to 0.75, and $a_3$ is equal to 11,640 inches per second during the medium power operating condition.

The gas turbine engine of one or more of these clauses, wherein the third blade passing frequency ($f_3$) is greater than the second blade passing frequency ($f_2$) and less than the first blade passing frequency ($f_1$).

The gas turbine engine of one or more of these clauses, wherein when the operating condition is a low power operating condition, $C_1$ equals 19.22, $C_2$ equals 0.222, $C_3$ equals 956.3, and EOC is between 41,467 and 19,965.

The gas turbine engine of one or more of these clauses, wherein the gas turbine engine defines a mass flowrate through the heat exchanger during the low power operating condition less than or equal to 50 lbm/s, and wherein ETL equals:

$$19.22e^{-0.222\left(\frac{EOC-UA}{956.3}\right)};$$

wherein EOC is between 41,467 and 19,965.

The gas turbine engine of one or more of these clauses, wherein when the operating condition is a medium power operating condition, $C_1$ equals 19.64, $C_2$ equals 0.67, $C_3$ equals 298, and EOC is between 52,809 and 16,677.

The gas turbine engine of one or more of these clauses, wherein the gas turbine engine defines a mass flowrate through the heat exchanger during the high power operating condition greater than or equal to 150 pound mass per second (lbm/s) and less than or equal to 300 lbm/s, and wherein ETL equals:

$$21.02e^{-0.027\left(\frac{EOC-UA}{107}\right)};$$

wherein EOC is between 50,347 and 12,587.

The gas turbine engine of one or more of these clauses, wherein the heat exchanger defines an overall length between 3 inches and 15 inches and a porosity between 20% and 80%.

The gas turbine engine of one or more of these clauses, wherein the overall length of the heat exchanger is between 4 inches and 9 inches.

The gas turbine engine of one or more of these clauses, wherein the heat exchanger defines a pressure drop of 15% or less during operation of the gas turbine engine.

The gas turbine engine of one or more of these clauses, wherein the annular duct is a third stream defined by the turbomachine and including an inlet, wherein the compressor section comprises a fan located upstream of the inlet of the third stream, wherein the blade passing frequency is of the mid-fan, and wherein the heat exchanger is positioned within the third stream.

The gas turbine engine of one or more of these clauses, wherein the rotor assembly of the gas turbine engine is configured as an unducted rotor assembly comprising a single stage of rotor blades.

The gas turbine engine of one or more of these clauses, wherein the rotor assembly of the gas turbine engine is configured as a ducted rotor assembly.

The gas turbine engine of one or more of these clauses, wherein the heat exchanger extends substantially continuously within the flowpath.

The gas turbine engine of one or more of these clauses, wherein the flowpath is a turbomachine flowpath, and wherein the duct is positioned at least in part in the compressor section, the combustion section, the turbine section, or a combination thereof.

The gas turbine engine of one or more of these clauses, wherein $$\left(\sin\left(\frac{2\times\pi\times f_1}{a_1}\times L_i\right)\right)^2$$

is less than or equal to 0.25.

A gas turbine engine defining a centerline and a circumferential direction, the gas turbine engine comprising: a turbomachine comprising a compressor section, a combustion section, and a turbine section arranged in serial flow order; a rotor assembly driven by the turbomachine and operable at a first blade passing frequency ($f_1$) greater than or equal to 600 hertz and less than or equal to 12,500 hertz during a high power operating condition, the rotor assembly, the turbomachine, or both comprising a substantially annular duct relative to the centerline of the gas turbine engine, the substantially annular duct defining a flowpath; a heat exchanger positioned within the annular duct and extending substantially continuously along the circumferential direction, wherein an effective transmission loss (ETL) for the heat exchanger positioned within the annular duct is between 5 decibels and 1 decibels for a high power operating condition, and wherein the heat exchanger comprises a heat transfer section defining an acoustic length ($L_i$), and wherein an Operational Acoustic Reduction Ratio (OARR) is greater than or equal to 0.75 to achieve the ETL at the high power operating condition, the OARR equal to:

$$\left(\sin\left(\frac{2\times\pi\times f_1}{a_1}\times L_i\right)\right)^2$$

wherein $a_1$ is equal to 13,200 inches per second during the high power operating condition.

A method of operating a gas turbine engine gas turbine engine defining a centerline and a circumferential direction, the method comprising:

operating a rotor assembly of the gas turbine engine driven by a turbomachine gas turbine engine and at a first blade passing frequency ($f_1$) greater than or equal to 600 hertz and less than or equal to 12,500 hertz during a high power operating condition; the rotor assembly, the turbomachine, or both comprising a substantially annular duct relative to the centerline of the gas turbine engine, the substantially annular duct defining a flowpath;

operating a heat exchanger positioned within the annular duct and extending substantially continuously along the circumferential direction, the heat exchanger comprising a first material defining a heat exchange surface exposed to the flowpath, wherein the first material defines a heat exchange coefficient and wherein the heat exchange surface defines a surface area (A), wherein a product of the heat exchange coefficient and the surface area, UA, is between 7500 British thermal units per hour per degrees Fahrenheit (Btu/(hr-° F.)) and 45000 Btu/(hr-° F.);

providing an effective transmission loss (ETL) for the heat exchanger positioned within the annular duct between 5 decibels and 1 decibels for the high power operating condition, wherein ETL equals $$C_1 e^{-C_2\left(\frac{EOC-UA}{C_3}\right)};$$

wherein when the operating condition is the high power operating condition, $C_1$ equals 21.02, $C_2$ equals 0.027, $C_3$ equals 107, and EOC is between 50,347 and 12,587; wherein the heat exchanger comprises a heat transfer section defining an acoustic length ($L_i$), and wherein an Operational Acoustic Reduction Ratio (OARR) is greater than or equal to 0.75 to achieve the ETL at the high power operating condition, the OARR equal to:

$$\left(\sin\left(\frac{2\times\pi\times f_1}{a_1}\times L_i\right)\right)^2$$

wherein $a_1$ is equal to 13,200 inches per second during the high power operating condition.

A gas turbine engine defining a centerline and a circumferential direction, the gas turbine engine comprising: a turbomachine comprising a compressor section, a combustion section, and a turbine section arranged in serial flow order; a rotor assembly driven by the turbomachine, the rotor assembly, the turbomachine, or both comprising a substantially annular duct relative to the centerline of the gas turbine engine, the substantially annular duct defining a flowpath; a heat exchanger positioned within the annular duct and extending substantially continuously along the circumferential direction, the heat exchanger comprising a first material defining a heat exchange surface exposed to the flowpath, wherein the first material defines a heat exchange coefficient and wherein the heat exchange surface defines a surface area (A), wherein a product of the heat exchange coefficient and the surface area, UA, is between 7500 British thermal units per hour per degrees Fahrenheit (Btu/(hr-° F.)) and 45000

Btu/(hr-° F.); wherein an effective transmission loss (ETL) for the heat exchanger positioned within the annular duct is between 5 decibels and 1 decibels for an operating condition, the operating condition being one of a low power operating condition, a medium power operating condition, or a high power operating condition, wherein ETL equals $$C_1 e^{-C_2\left(\frac{EOC-UA}{C_3}\right)};$$

wherein when the operating condition is the low power operating condition, $C_1$ equals 19.22, $C_2$ equals 0.222, $C_3$ equals 956.3, and EOC is between 41,467 and 19,965; wherein when the operating condition is the medium power operating condition, $C_1$ equals 19.64, $C_2$ equals 0.67, $C_3$ equals 298, and EOC is between 52,809 and 16,677; and wherein when the operating condition is the high power operating condition, $C_1$ equals 21.02, $C_2$ equals 0.027, $C_3$ equals 107, and EOC is between 50,347 and 12,587.

The gas turbine engine of one or more of these clauses, wherein the heat exchanger defines a length between 3 inches and 15 inches and a porosity between 20% and 80%, wherein the gas turbine engine defines a blade passing frequency within the turbomachine, the rotor assembly, or both between 600 Hz and 12.5 Khz during the operating condition.

The gas turbine engine of one or more of these clauses, wherein the length of the heat exchanger is between 4 inches and 9 inches.

The gas turbine engine of one or more of these clauses, wherein the heat exchanger defines a pressure drop of 15% or less during operation of the gas turbine engine.

The gas turbine engine of one or more of these clauses, wherein the gas turbine engine defines a mass flowrate through the heat exchanger during the low power operating condition less than or equal to 50 lbm/s, and wherein ETL equals:

$$19.22e^{-0.222\left(\frac{EOC-UA}{956.3}\right)};$$

wherein EOC is between 41,467 and 19,965.

The gas turbine engine of one or more of these clauses, wherein the gas turbine engine defines a mass flowrate through the heat exchanger during the medium power operating condition greater than or equal to 50 pound mass per second (lbm/s) and less than or equal to 150 lbm/s, and wherein ETL equals:

$$19.64e^{-0.67\left(\frac{EOC-UA}{298}\right)};$$

wherein EOC is between 52,809 and 16,677.

The gas turbine engine of one or more of these clauses, wherein the gas turbine engine defines a mass flowrate through the heat exchanger during the high power operating condition greater than or equal to 150 pound mass per second (lbm/s) and less than or equal to 300 lbm/s, and wherein ETL equals:

$$21.02e^{-0.027\left(\frac{EOC-UA}{107}\right)};$$

wherein EOC is between 50,347 and 12,587.

The gas turbine engine of one or more of these clauses, wherein the annular duct is a third stream defined by the turbomachine and including an inlet, wherein the compressor section comprises a fan located upstream of the inlet of the third stream, wherein the gas turbine engine defines a blade passing frequency within the turbomachine, wherein the blade passing frequency is of the mid-fan, and wherein the heat exchanger is positioned within the third stream.

The gas turbine engine of one or more of these clauses, wherein the rotor assembly of the gas turbine engine is configured as an unducted rotor assembly comprising a single stage of rotor blades.

The gas turbine engine of one or more of these clauses, wherein the single stage of rotor blades defines a blade diameter greater than or equal to 10 feet and less than or equal to 28 feet, optionally less than 18 feet, optionally less than 15 feet.

The gas turbine engine of one or more of these clauses, wherein the heat exchanger has one of the following architectures: fin-based, pin-fin, tube, tube-shell, tube-sheet, counter-flow, or a combination thereof.

The gas turbine engine of one or more of these clauses, wherein the rotor assembly of the gas turbine engine is configured as a ducted rotor assembly.

The gas turbine engine of one or more of these clauses, wherein the heat exchanger extends substantially continuously within the flowpath.

The gas turbine engine of one or more of these clauses, wherein the flowpath is a turbomachine flowpath, and wherein the duct is positioned at least in part in the compressor section, the combustion section, the turbine section, or a combination thereof.

The gas turbine engine of one or more of these clauses, wherein the heat exchanger is a waste heat recovery heat exchanger.

The gas turbine engine of one or more of these clauses, wherein the rotor assembly defines a blade passing frequency between 600 Hz and 12.5 Khz during the operating condition, and wherein the heat exchanger is located downstream of the rotor assembly.

The gas turbine engine of one or more of these clauses, wherein the gas turbine engine defines a blade passing frequency within the turbomachine between 600 Hz and 12.5 Khz during the operating condition, and wherein the heat exchanger is located within the turbomachine.

The gas turbine engine of one or more of these clauses, wherein the heat exchanger has the ETL of between 5 decibels and 1 decibel during the operating condition.

A gas turbine engine defining a centerline and a circumferential direction, the gas turbine engine comprising: a turbomachine comprising a compressor section, a combustion section, and a turbine section arranged in serial flow order; a rotor assembly driven by the turbomachine, the rotor assembly, the turbomachine, or both comprising a substantially annular duct relative to the centerline of the gas turbine engine, the annular duct defining a flowpath; a heat exchanger positioned within the annular duct and extending substantially continuously along the circumferential direction, the heat exchanger defining a length between 3 inches and 15 inches and a porosity between 20% and 80%, the heat exchanger comprising a first material defining a heat exchange surface exposed to the flowpath, wherein the first material defines a heat exchange coefficient and wherein the heat exchange surface defines a surface area (A), wherein a product of the heat exchange coefficient and the surface area, UA, is between 7500 British thermal units per hour per degrees Fahrenheit (Btu/(hr-° F.)) and 45000 Btu/(hr-° F.), wherein the gas turbine engine defines a blade passing frequency within the turbomachine, the rotor assembly, or both between 600 kHz and 12.5 Khz during an operating condition, and wherein the heat exchanger has an effective transmission loss (ETL) of between 5 decibels and 1 decibel for the operating condition.

The gas turbine engine of one or more of these clauses, wherein ETL equals:

$$C_1 e^{-C_2\left(\frac{X-UA}{C_3}\right)};$$

wherein when the operating condition is a low power operating condition, $C_1$ equals 19.22, $C_2$ equals 0.222, $C_3$ equals 956.3, and EOC is between 41,467 and 19,965; wherein when the operating condition is a medium power operating condition, $C_1$ equals 19.64, $C_2$ equals 0.67, $C_3$ equals 298, and EOC is between 52,809 and 16,677; and wherein when the operating condition is a high power operating condition, $C_1$ equals 21.02, $C_2$ equals 0.027, $C_3$ equals 107, and EOC is between 50,347 and 12,587.

The gas turbine engine of one or more of these clauses, wherein UA is greater than 7500 Btu/(hr-° F.) and less than 45000 Btu/(hr-° F.), such as greater than 10000 Btu/(hr-° F.) and less than 35000 Btu/(hr-° F.) when the operating condition is a low power operating condition, such as greater than 14000 Btu/(hr-° F.) and less than 5000 Btu/(hr-° F.) when the operating condition is a medium power operating condition, or greater than 15000 Btu/(hr-° F.) and less than 44000 Btu/(hr-° F.) when the operating condition is a high power operating condition.

The gas turbine engine of one or more of these clauses, wherein the pressure drop is less than 15%, such as less than 10%, such as less than 8%, such as greater than 1%.

The gas turbine engine of one or more of these clauses, wherein the pressure drop is less than or equal to about 5%, such as less than or equal to about 2.5% when the operating condition is a low power operating condition.

The gas turbine engine of one or more of these clauses, wherein the pressure drop is less than or equal to about 15% when the operating condition is a medium power operating condition.

The gas turbine engine of one or more of these clauses, wherein the pressure drop is less than or equal to about 15%, wherein the ETL is between 1 and 3 dB, and wherein the operating condition is a high power operating condition.

The gas turbine engine of one or more of these clauses, wherein the length of the heat exchanger is between 3 inches and 15 inches, such as between 4 inches and 9 inches.

The gas turbine engine of one or more of these clauses, wherein the porosity of the heat exchanger is 20% to 80%, such as 30% to 55%.

A gas turbine engine defining a centerline, a radial direction, and a circumferential direction, the gas turbine engine comprising: a turbomachine comprising a compressor section, a combustion section, and a turbine section arranged in serial flow order; a rotor assembly driven by or incorporated into the turbomachine and operable at a blade passing frequency (f) greater than or equal to 300 hertz and less than or equal to 12,500 hertz during an operating condition, the gas turbine engine comprising a substantially annular duct relative to the centerline, the substantially annular duct defining a flowpath and a duct height along the radial direction; and a heat exchanger positioned within the substantially annular duct and extending substantially continuously along the circumferential direction, the heat exchanger defining a heat exchanger height equal to at least 10% of the duct height; wherein an effective transmission loss (ETL) for the heat exchanger positioned within the substantially annular duct is between 5 decibels and 1 decibels for the operating condition; wherein the heat exchanger comprises a heat transfer section defining an acoustic length ($L_i$), and wherein an Operational Acoustic Reduction Ratio (OARR) is greater than or equal to 0.75 to achieve the ETL at the operating condition, the OARR equal to:

$$\left(\sin\left(\frac{2 \times \pi \times f}{a} \times L_i\right)\right)^2$$

wherein $\alpha$ is greater than or equal to 11,600 inches per second and less than or equal to 30,924 inches per second during the operating condition.

The gas turbine engine of one or more of these clauses, wherein the operating condition is a high power operating condition, wherein the blade passing frequency (f) is a first blade passing frequency ($f_1$) greater than or equal to 600 hertz and less than or equal to 12,500 hertz during the high power operating condition, and wherein a is a first speed of sound $a_1$ greater than or equal to 13,200 inches per second and less than or equal to 25,360 inches per second during the high power operating condition, and wherein OARR is equal to:

$$\left(\sin\left(\frac{2 \times \pi \times f_1}{a_1} \times L_i\right)\right)^2.$$

The gas turbine engine of one or more of these clauses, wherein the heat exchanger is positioned in a cold location of the gas turbine engine, and wherein $a_1$ is $a_{1,Cold}$ and is equal to 24,528 inches per second.

The gas turbine engine of one or more of these clauses, wherein the rotor assembly is operable at a second blade passing frequency ($f_2$) during a low power operating condition, wherein the heat transfer section is a first heat transfer section and the acoustic length is a first acoustic length, wherein the heat exchanger further comprises a second heat transfer section defining a second acoustic length ($L_{i,2}$), wherein $$\left(\sin\left(\frac{2 \times \pi \times f_2}{a_2} \times L_{i,2}\right)\right)^2$$

is greater than or equal to 0.75, and $a_2$ is greater than or equal to 12,900 inches per second and less than or equal to 24,756 inches per second during the low power operating condition.

The gas turbine engine of one or more of these clauses, wherein the second blade passing frequency ($f_2$) is greater than or equal to 300 hertz and less than or equal to 6,300 hertz.

The gas turbine engine of one or more of these clauses, wherein the rotor assembly is operable at a third blade passing frequency ($f_3$) during a medium power operating condition, wherein the heat exchanger further comprises a third heat transfer section defining a third acoustic length ($L_{i,3}$), wherein $$\left(\sin\left(\frac{2 \times \pi \times f_3}{a_3} \times L_{i,3}\right)\right)^2$$

is greater than or equal to 0.75, and $a_3$ is greater than or equal to 11,640 inches per second and less than or equal to 30,924 inches per second during the medium power operating condition.

The gas turbine engine of one or more of these clauses, wherein the third blade passing frequency ($f_3$) is greater than or equal to 500 hertz and less than or equal to 12,500 hertz, wherein the third blade passing frequency ($f_3$) is greater than the second blade passing frequency ($f_2$) and less than the first blade passing frequency ($f_1$).

The gas turbine engine of one or more of these clauses, wherein $$\left(\sin\left(\frac{2 \times \pi \times f}{a} \times L_i\right)\right)^2$$

is equal to 1.

The gas turbine engine of one or more of these clauses, wherein the heat transfer section defines a HX flow area ($A_{HX}$), wherein the substantially annular defines a duct flow area ($A_d$) upstream of the heat exchanger, and wherein a ratio of the HX flow area ($A_{HX}$) to the duct flow area ($A_d$) is greater than 1.

The gas turbine engine of one or more of these clauses, wherein the substantially annular duct comprises spaced-apart peripheral walls extending between an inlet and an outlet and defining a flowpath, wherein the flowpath includes a diverging portion downstream of the inlet, in which a flow area is greater than a flow area at the inlet, and wherein the heat exchanger comprises: a plurality of spaced-apart fins disposed in the flowpath, each of the fins having opposed side walls extending between an upstream leading edge and a downstream trailing edge, wherein the fins divide at least the diverging portion of the flowpath into a plurality of side-by-side flow passages; and a heat transfer structure disposed within at least one of the fins.

The gas turbine engine of one or more of these clauses, wherein the leading edges of the fins are staggered relative to a direction of flow through the flowpath such that a flow area blockage attributable to frontal area of the fins is offset by a corresponding increase of flow area in the flowpath within the divergent portion.

The gas turbine engine of one or more of these clauses, wherein the peripheral walls define a belly downstream of the inlet at which a flow area of the flowpath is at a maximum, and wherein the flowpath includes a converging portion downstream of the diverging portion.

The gas turbine engine of one or more of these clauses, wherein the peripheral walls and the fins are configured such that a total open flow area between the peripheral walls continuously increases from the inlet to the belly.

The gas turbine engine of one or more of these clauses, wherein a flow area of each of flow passages increases in a downstream direction, and the flow passages have equal diffusion rates.

The gas turbine engine of one or more of these clauses, wherein the fins are configured to turn a flow passing through the flowpath in at least one plane.

The gas turbine engine of one or more of these clauses, wherein the heat exchanger defines an overall length between 3 inches and 15 inches and a porosity between 20% and 80%.

The gas turbine engine of one or more of these clauses, wherein the heat exchanger defines a pressure drop of 15% or less during operation of the gas turbine engine.

The gas turbine engine of one or more of these clauses, wherein the substantially annular duct is a third stream defined by the turbomachine and including an inlet, wherein the compressor section comprises a mid-fan located upstream of the inlet of the third stream, wherein the blade passing frequency is of the mid-fan, and wherein the heat exchanger is positioned within the third stream.

The gas turbine engine of one or more of these clauses, wherein the rotor assembly of the gas turbine engine is configured as an unducted rotor assembly comprising a single stage of rotor blades.

The gas turbine engine of one or more of these clauses, wherein the blade passing frequency (f) greater than or equal to 2,500 hertz and less than or equal to 5,000 hertz during the operating condition, wherein the operating condition is a high power operating condition, and wherein a is equal to 13,200 inches per second during the high power operating condition.

A gas turbine engine defining a centerline, a radial direction, and a circumferential direction, the gas turbine engine comprising: a turbomachine comprising a compressor section, a combustion section, and a turbine section arranged in serial flow order; a rotor assembly driven by or incorporated into the turbomachine and operable at a blade passing frequency (f) greater than or equal to 300 hertz and less than or equal to 12,500 hertz during an operating condition, the gas turbine engine comprising a substantially annular duct relative to the centerline of the gas turbine engine, the substantially annular duct defining a flowpath and a duct height along the radial direction; and a heat exchanger positioned within the substantially annular duct and extending substantially continuously along the circumferential direction, the heat exchanger defining a heat exchanger height equal to at least 10% of the duct height; wherein an effective transmission loss (ETL) for the heat exchanger positioned within the substantially annular duct is between 5 decibels and 1 decibels for the operating condition; wherein the heat exchanger comprises a heat transfer section defining an acoustic length ($L_i$), and wherein an Operational Acoustic Reduction Ratio (OARR) is greater than or equal to 0.75 to achieve the ETL at the operating condition, the OARR equal to:

$$\left(\sin\left(\frac{2\times\pi\times f}{a}\times L_i\right)\right)^2$$

wherein α is greater than or equal to 11,600 inches per second and less than or equal to 30,924 inches per second during the operating condition; wherein the heat exchanger comprises a heat exchanger core, a header having a header manifold, and a transition portion, the transition portion providing fluid communication between the heat exchanger core and the header manifold.

The gas turbine engine of one or more of these clauses, wherein the header defines a header wall thickness, and wherein the transition portion comprises: a transition tube extending between the header and the heat exchanger core; and a header junction where the transition tube joins the header, the header junction defining a junction thickness that is greater than the header wall thickness.

The gas turbine engine of one or more of these clauses, wherein the heat exchanger defines a lateral direction and a transverse direction, and wherein the header extends along the transverse direction.

The gas turbine engine of one or more of these clauses, wherein the header junction defines an inlet aperture that has a non-circular cross section and transitions into a circular cross section proximate the transition tube.

The gas turbine engine of one or more of these clauses, wherein the non-circular cross section defines a first cross sectional area and the circular cross section defines a second cross sectional area, the first cross sectional area being substantially equivalent to the second cross sectional area.

The gas turbine engine of one or more of these clauses, wherein the cross section of the inlet aperture is elongated or elliptical.

The gas turbine engine of one or more of these clauses, wherein the transition portion further comprises: a splitting junction where the transition tube splits into a plurality of heat exchange tubes.

The gas turbine engine of one or more of these clauses, wherein the plurality of heat exchange tubes comprise four heat exchange tubes each defining a circular cross section.

The gas turbine engine of one or more of these clauses, wherein the transition tube extends from the header at an exit angle, the exit angle being substantially normal to the header.

The gas turbine engine of one or more of these clauses, wherein the header junction defines a fillet between the header and the transition tube, the fillet defining a fillet radius to transition tube diameter ratio (r/D) of greater than 0.15.

The gas turbine engine of one or more of these clauses, wherein the fillet radius to transition tube diameter ratio (r/D) is approximately 0.35.

The gas turbine engine of one or more of these clauses, wherein the header further comprises: a first barrel extending along an axial direction of the gas turbine engine and defining a first manifold in fluid communication with a first plurality of heat exchange tubes; a second barrel extending along the axial direction and defining a second manifold in fluid communication with a second plurality of heat exchange tubes, the second barrel being positioned adjacent the first barrel along the radial direction; and a septum positioned between the first barrel and the second barrel and extending along the axial direction to at least partially define the first manifold and the second manifold.

The gas turbine engine of one or more of these clauses, further comprising: an inlet manifold in fluid communication with the first manifold and the second manifold, wherein the septum extends into the inlet manifold for splitting a flow of heated fluid from a heated fluid supply.

The gas turbine engine of one or more of these clauses, wherein an end of the septum divides the inlet manifold into a first flow area adjacent the first manifold and a second flow area adjacent the second manifold, the first flow area being different than the second flow area.

We claim:

1. A gas turbine engine defining a centerline, a radial direction, and a circumferential direction, the gas turbine engine comprising:
   a turbomachine comprising a compressor section, a combustion section, and a turbine section arranged in serial flow order;
   a rotor assembly driven by or incorporated into the turbomachine and operable at a blade passing frequency (f) greater than or equal to 300 hertz and less than or equal to 12,500 hertz during an operating condition of the gas turbine engine, the gas turbine engine comprising a substantially annular duct relative to the centerline of the gas turbine engine, the substantially annular duct defining a flowpath and a duct height along the radial direction; and a heat exchanger positioned within the substantially annular duct and extending substantially continuously along the circumferential direction, the heat exchanger defining a heat exchanger height equal to at least 10% of the duct height;

wherein an effective transmission loss (ETL) for the heat exchanger positioned within the substantially annular duct is between 5 decibels and 1 decibels for the operating condition;

wherein the heat exchanger comprises a heat transfer section defining an acoustic length ($L_i$), and wherein an Operational Acoustic Reduction Ratio (OARR) is greater than or equal to 0.75 to achieve the ETL at the operating condition, the OARR equal to:

$$\left( \sin\left( \frac{2 \times \pi \times f}{a} \times L_i \right) \right)^2$$

wherein $\alpha$ is representative of a speed of sound through the location of the gas turbine engine during the operating condition and is greater than or equal to 11,600 inches per second and less than or equal to 30,924 inches per second during the operating condition;

wherein the heat exchanger comprises a heat exchanger core, a header having a header manifold, and a transition portion, the transition portion providing fluid communication between the heat exchanger core and the header manifold.

2. The gas turbine engine of claim 1, wherein the operating condition is a high power operating condition, wherein the blade passing frequency (f) is a first blade passing frequency ($f_1$) greater than or equal to 600 hertz and less than or equal to 12,500 hertz during the high power operating condition, and wherein $a_{Hot}$ is a first speed of sound $a_{1,Hot}$ equal to 25,360 inches per second during the high power operating condition, and wherein OARR is equal to:

$$\left( \sin\left( \frac{2 \times \pi \times f_1}{a_{1,Hot}} \times L_i \right) \right)^2.$$

3. The gas turbine engine of claim 2, wherein the rotor assembly is operable at a second blade passing frequency ($f_2$) during a low power operating condition, wherein the heat transfer section is a first heat transfer section and the acoustic length is a first acoustic length, wherein the heat exchanger further comprises a second heat transfer section defining a second acoustic length ($L_{i,2}$), wherein $$\left( \sin\left( \frac{2 \times \pi \times f_2}{a_{2,Hot}} \times L_{i,2} \right) \right)^2$$

is greater than or equal to 0.75, and $a_{2,Hot}$ is equal to 24,756 inches per second during the low power operating condition.

4. The gas turbine engine of claim 3, wherein the second blade passing frequency ($f_2$) is greater than or equal to 300 hertz and less than or equal to 6,300 hertz.

5. The gas turbine engine of claim 3, wherein the rotor assembly is operable at a third blade passing frequency ($f_3$) during a medium power operating condition, wherein the heat exchanger further comprises a third heat transfer section defining a third acoustic length ($L_{i,3}$), wherein $$\left( \sin\left( \frac{2 \times \pi \times f_3}{a_{3,Hot}} \times L_{i,3} \right) \right)^2$$

is greater than or equal to 0.75, and $a_{3,Hot}$ is equal to 30,924 inches per second during the medium power operating condition.

6. The gas turbine engine of claim 5, wherein the third blade passing frequency ($f_3$) is greater than or equal to 500 hertz and less than or equal to 12,500 hertz, wherein the third blade passing frequency ($f_3$) is greater than the second blade passing frequency ($f_2$) and less than the first blade passing frequency ($f_1$).

7. The gas turbine engine of claim 1, wherein sin $$\left( \sin\left( \frac{2 \times \pi \times f}{a_{Hot}} \times L_i \right) \right)^2$$

is equal to 1.

8. The gas turbine engine of claim 1, wherein the heat exchanger defines an overall length between 3 inches and 15 inches and a porosity between 20% and 80%.

9. The gas turbine engine of claim 8, wherein the overall length of the heat exchanger is between 4 inches and 9 inches.

10. The gas turbine engine of claim 1, wherein the header defines a header wall thickness, and wherein the transition portion comprises:

a transition tube extending between the header and the heat exchanger core; and a header junction where the transition tube joins the header, the header junction defining a junction thickness that is greater than the header wall thickness.

11. The gas turbine engine of claim 10, wherein the heat exchanger defines a lateral direction and a transverse direction, and wherein the header extends along the transverse direction.

12. The gas turbine engine of claim 10, wherein the header junction defines an inlet aperture that has a non-circular cross section and transitions into a circular cross section proximate the transition tube.

13. The gas turbine engine of claim 12, wherein the non-circular cross section defines a first cross sectional area and the circular cross section defines a second cross sectional area, the first cross sectional area being substantially equivalent to the second cross sectional area.

14. The gas turbine engine of claim 12, wherein the cross section of the inlet aperture is elongated or elliptical.

15. The gas turbine engine of claim 10, wherein the transition portion further comprises:

a splitting junction where the transition tube splits into a plurality of heat exchange tubes.

16. The gas turbine engine of claim 15, wherein the plurality of heat exchange tubes comprise four heat exchange tubes each defining a circular cross section.

17. The gas turbine engine of claim 10, wherein the transition tube extends from the header at an exit angle, the exit angle being substantially normal to the header.

18. The gas turbine engine of claim 10, wherein the header junction defines a fillet between the header and the transition tube, the fillet defining a fillet radius to transition tube diameter ratio (r/D) of greater than 0.15.

19. The gas turbine engine of claim 18, wherein the fillet radius to transition tube diameter ratio (r/D) is approximately 0.35.

20. The gas turbine engine of claim 1, wherein the header further comprises:

a first barrel extending along an axial direction of the gas turbine engine and defining a first manifold in fluid communication with a first plurality of heat exchange tubes;

a second barrel extending along the axial direction and defining a second manifold in fluid communication with a second plurality of heat exchange tubes, the second barrel being positioned adjacent the first barrel along the radial direction; and a septum positioned between the first barrel and the second barrel and extending along the axial direction to at least partially define the first manifold and the second manifold.

\* \* \* \* \*